(12) United States Patent
Wallace et al.

(10) Patent No.: US 7,691,503 B2
(45) Date of Patent: Apr. 6, 2010

(54) MODULAR FUEL CELL POWER SYSTEM, AND TECHNIQUE FOR CONTROLLING AND/OR OPERATING SAME

(75) Inventors: Andrew Paul Wallace, Davis, CA (US); Muralidharan P. Arikara, Folsom, CA (US); Rodney Sparks, Sacramento, CA (US)

(73) Assignee: Jadoo Power Systems, Inc., Folsom, CA (US)

(*) Notice: Subject to any disclaimer, the term of this patent is extended or adjusted under 35 U.S.C. 154(b) by 651 days.

(21) Appl. No.: 11/581,963

(22) Filed: Oct. 17, 2006

(65) Prior Publication Data

US 2007/0037026 A1 Feb. 15, 2007

Related U.S. Application Data

(62) Division of application No. 11/340,158, filed on Jan. 26, 2006.

(60) Provisional application No. 60/662,020, filed on Mar. 15, 2005.

(51) Int. Cl.
*H01M 8/24* (2006.01)
*H01M 8/04* (2006.01)
*H01M 8/00* (2006.01)

(52) U.S. Cl. ............... 429/12; 429/22; 429/38

(58) Field of Classification Search ............ None
See application file for complete search history.

(56) References Cited

U.S. PATENT DOCUMENTS

| | | | |
|---|---|---|---|
| 3,629,075 A | 12/1971 | Gutbier | |
| 4,310,605 A | 1/1982 | Early et al. | |
| 4,436,793 A | 3/1984 | Adlhart | |
| 4,883,724 A | 11/1989 | Yamamoto | |
| 5,683,828 A | 11/1997 | Spear et al. | |
| 5,858,567 A | 1/1999 | Spear et al. | |
| 5,863,671 A | 1/1999 | Spear et al. | |
| 5,932,365 A | 8/1999 | Lin et al. | |
| 5,962,155 A | 10/1999 | Kuranaka et al. | |
| 6,028,414 A * | 2/2000 | Chouinard et al. | 320/110 |

(Continued)

OTHER PUBLICATIONS

G2 Fuel Cell Charger, Preliminary Product Datasheet, Angstrom Power Incorporated, 2 pages, 2005.

(Continued)

*Primary Examiner*—Dah-Wei D Yuan
*Assistant Examiner*—Katherine Turner
(74) *Attorney, Agent, or Firm*—Venable LLP; Ralph P. Albrecht; Cameron H. Tousi

(57) ABSTRACT

The present inventions relate to power systems (for example, fuel cell power systems) and architectures having an integration plane to incorporate various technology modules therein including, for example, one or more fuel cell stacks, fuel storage containers/tanks (for example, hydrogen, methanol and/or hydrogen containing compounds or substances from which hydrogen can be extracted on demand (e.g., a hydride)), power unit having a power management unit to provide a conditioned and/or regulated electrical power using electrical power provided by a fuel cell, fuel cartridge having one or more fuel storage containers/tanks and electrical circuitry to monitor and/or store one or more parameters of the fuel storage container(s)/tank(s), supercapacitors, batteries, and/or electrical or electronic devices such as mobile communications (for example, phones and/or modems), data processor circuitry, and/or monitoring or surveillance device (for example, a imaging sensing device (for example, camera) and/or audio sensing device).

35 Claims, 73 Drawing Sheets

U.S. PATENT DOCUMENTS

| | | | |
|---|---|---|---|
| 6,051,331 | A | 4/2000 | Spear et al. |
| 6,057,051 | A | 5/2000 | Uchida et al. |
| 6,093,500 | A | 7/2000 | Margiott et al. |
| 6,110,611 | A | 8/2000 | Stühler et al. |
| 6,387,556 | B1 * | 5/2002 | Fuglevand et al. ............ 429/22 |
| 6,544,679 | B1 * | 4/2003 | Petillo et al. .................. 429/34 |
| 6,577,026 | B1 | 6/2003 | Faller et al. |
| 6,686,079 | B2 | 2/2004 | Zhang et al. |
| 6,738,692 | B2 | 5/2004 | Schienbein et al. |
| 6,835,481 | B2 | 12/2004 | Dickman et al. |
| 6,989,207 | B2 * | 1/2006 | Austin et al. .................. 429/13 |
| 6,989,651 | B1 | 1/2006 | Arikara et al. |
| 6,992,460 | B1 | 1/2006 | Arikara et al. |
| 7,011,768 | B2 | 3/2006 | Jensen et al. |
| 7,169,489 | B2 | 1/2007 | Redmond |
| 7,399,325 | B1 | 7/2008 | Redmond |
| 2001/0049038 | A1 | 12/2001 | Dickman et al. |
| 2001/0053465 | A1 * | 12/2001 | Fuglevand ..................... 429/9 |
| 2002/0031692 | A1 | 3/2002 | Fuglevand et al. |
| 2002/0155339 | A1 | 10/2002 | Rudolfovich et al. |
| 2003/0036806 | A1 | 2/2003 | Schienbein et al. |
| 2003/0234010 | A1 | 12/2003 | Redmond |
| 2004/0016769 | A1 | 1/2004 | Redmond |
| 2004/0023094 | A1 | 2/2004 | Hatayama et al. |
| 2004/0046526 | A1 | 3/2004 | Richards |
| 2004/0065171 | A1 | 4/2004 | Hearley et al. |
| 2004/0067403 | A1 | 4/2004 | Walsh et al. |
| 2004/0094134 | A1 | 5/2004 | Redmond et al. |
| 2004/0219398 | A1 | 11/2004 | Calhoon |
| 2005/0162122 | A1 | 7/2005 | Dunn et al. |
| 2005/0233180 | A1 | 10/2005 | DeSorbo |

OTHER PUBLICATIONS

P1 Portable Refueling Cartridge, Preliminary Product Datasheet, Angstrom Power Incorporated, 2 pages, 2005.

R1 Refueling Station, Preliminary Product Datasheet, Angstrom Power Incorporated. 2 pages, 2005.

Advanced Contact Technology, Modular Connector, Fuel Cell Magazine, 1 page, Sep. 2005.

Multi-Contact Plug In, e-Catalogue, 15 pages, Mar. 2005.

Office Action issued on Dec. 15, 2009 in U.S. Appl. No. 11/581,983.

Data processing entry, The Penguin English Dictionary, 2007, [online], [retrieved on Dec. 8, 2009], Retrieved from Credoreference using Internet <URL:http://www.credoreference.com/entry/penguineng/data_processing>.

* cited by examiner

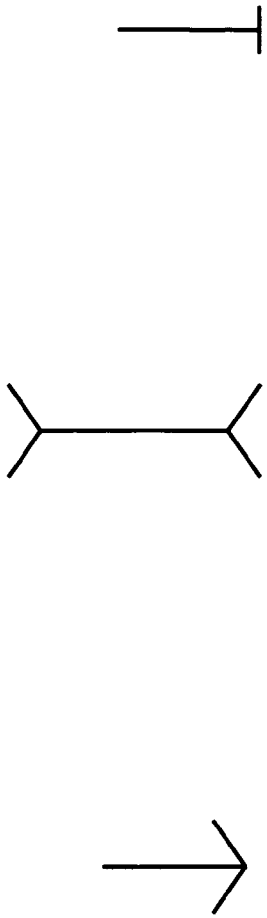
FIGURE 1B
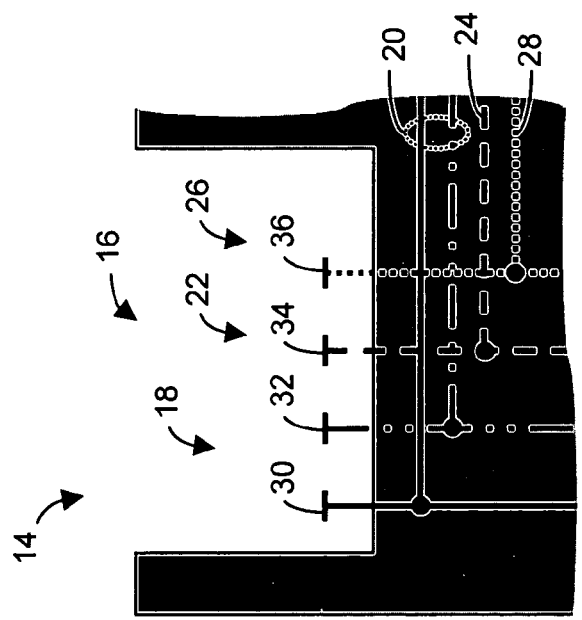
FIGURE 3A  FIGURE 3B  FIGURE 3C  FIGURE 3D

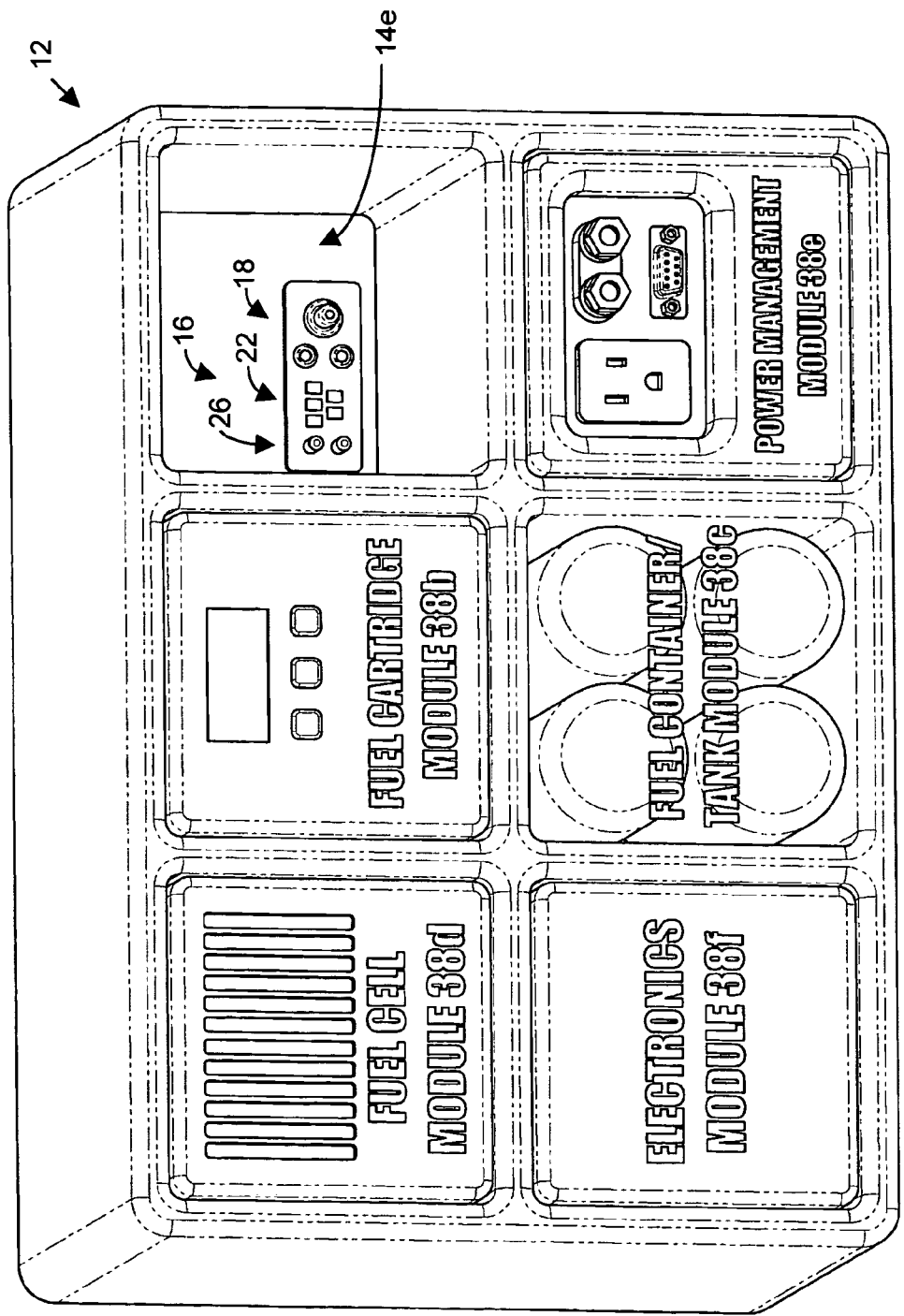

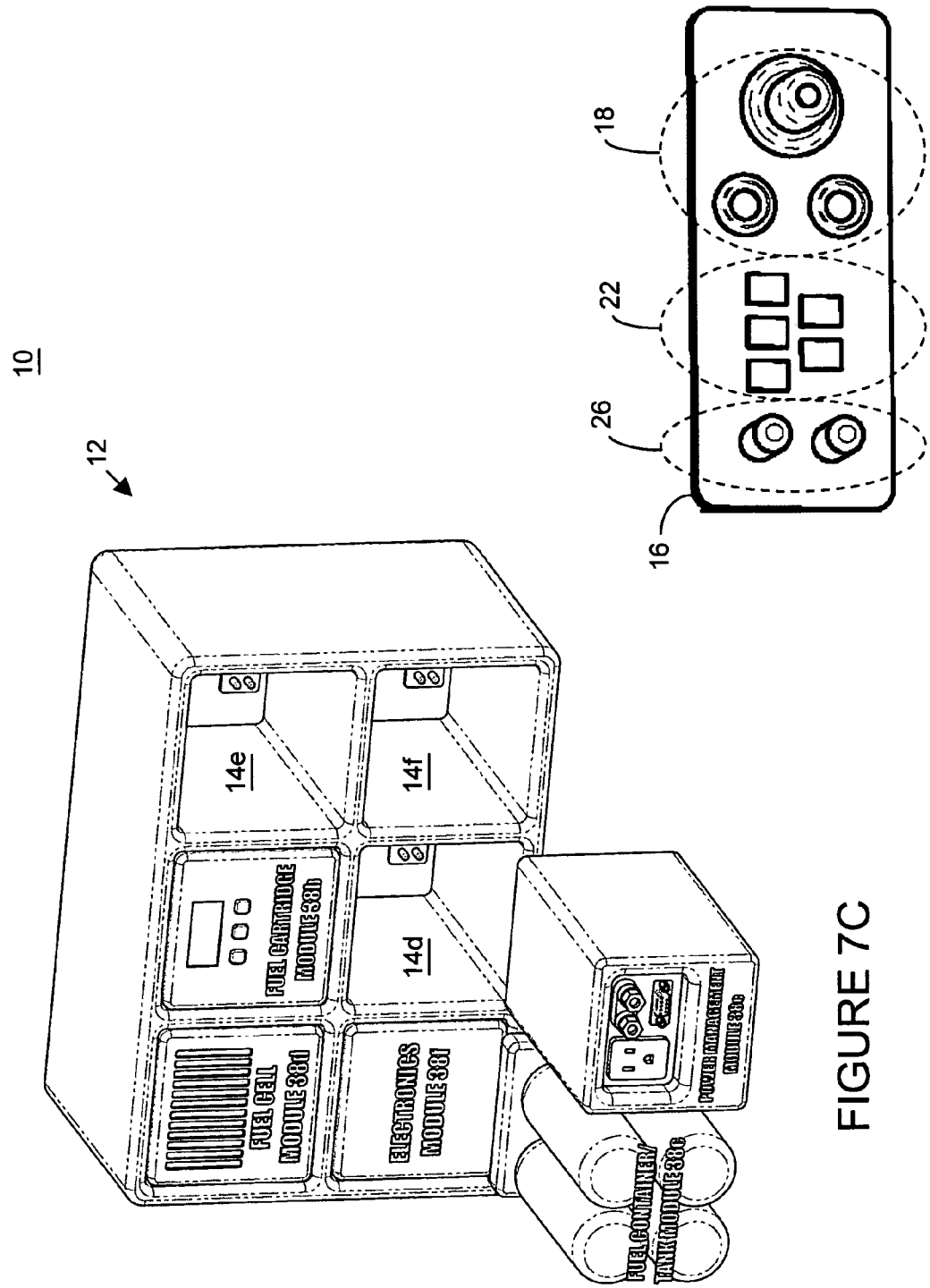

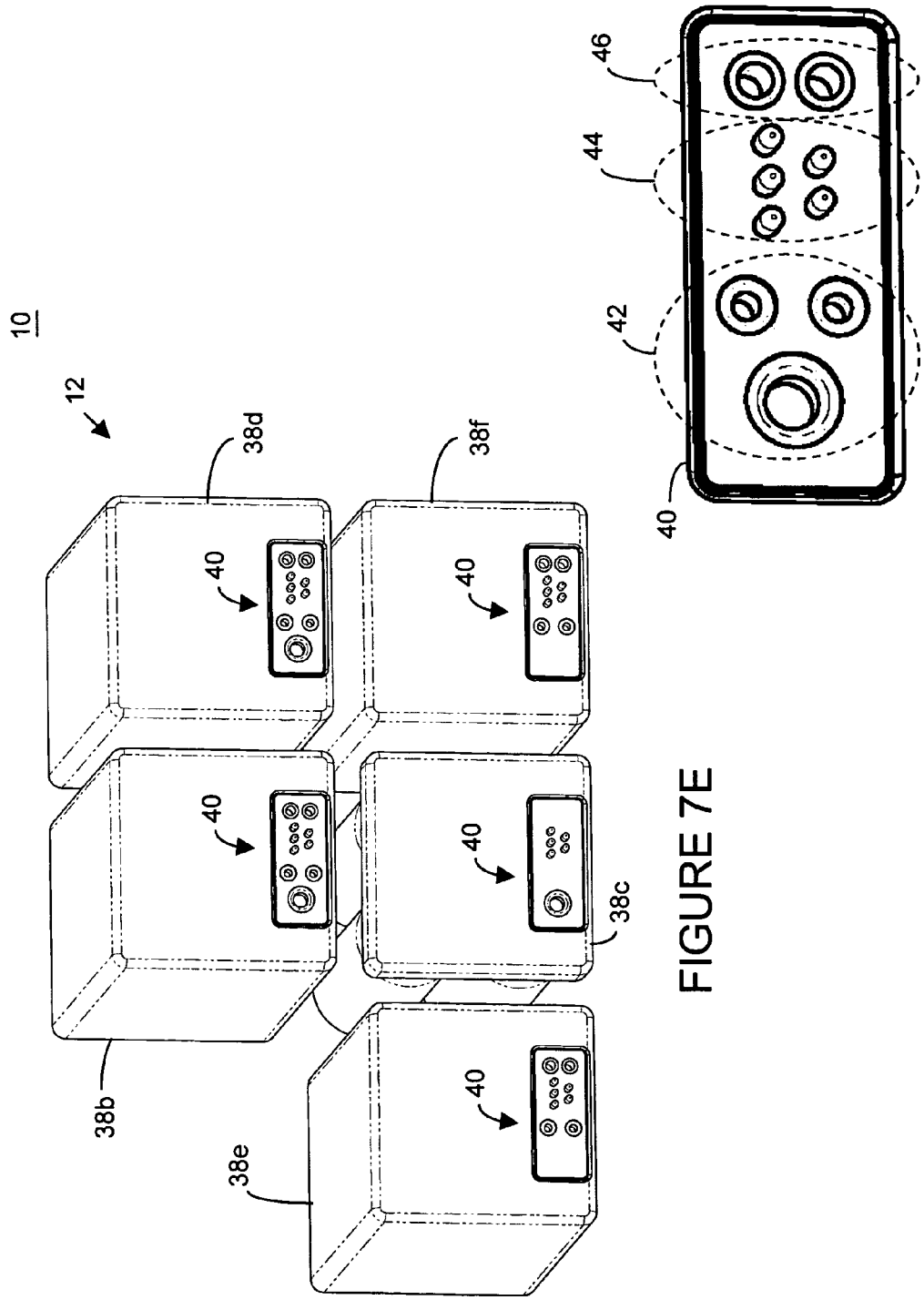

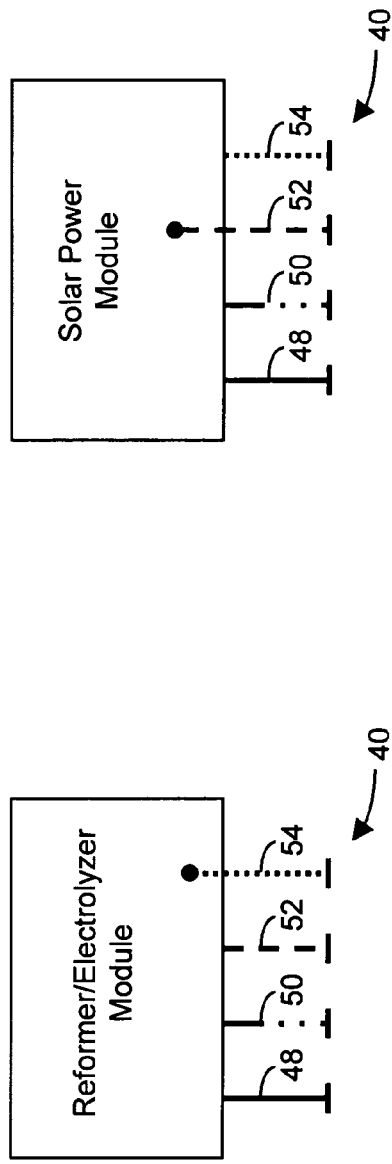
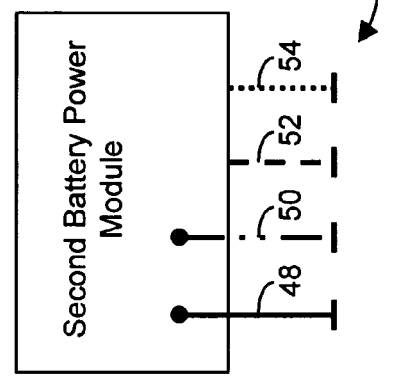
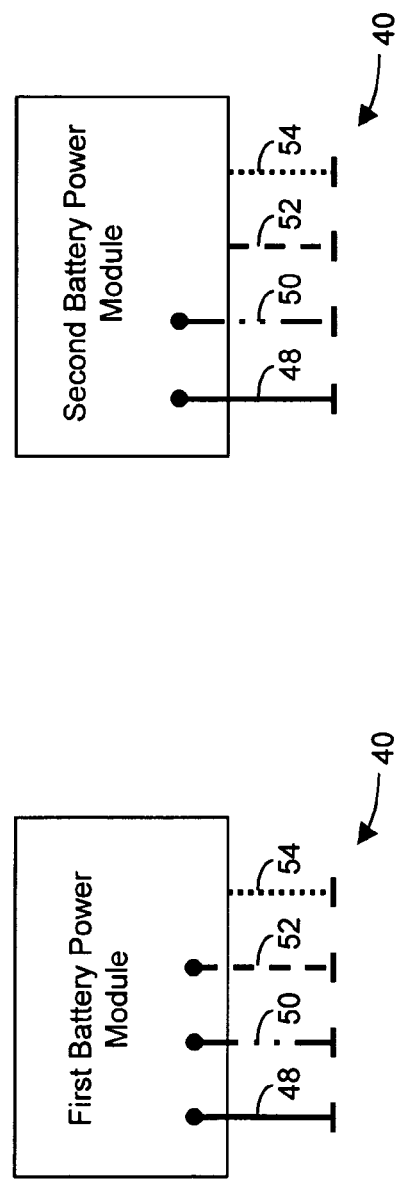

MODULAR FUEL CELL POWER SYSTEM, AND TECHNIQUE FOR CONTROLLING AND/OR OPERATING SAME

CROSS-REFERENCE TO RELATED APPLICATIONS

This application is a divisional of application Ser. No. 11/340,158, filed Jan. 26, 2006. This application, and the '158 application, claim priority to U.S. Provisional Application Ser. No. 60/662/020, entitled "Modular Fuel Cell Power System", filed Mar. 15, 2005. The contents of the '158 application and the '020 application are incorporated by reference herein in their entirety.

BACKGROUND OF THE INVENTION

There are many inventions described and illustrated herein; in one aspect, the present inventions relate to power systems, and techniques for controlling and/or operating such systems. More particularly, in one aspect, to a modular fuel cell power systems and architectures (for example, fuel cell systems based on hydrogen and/or methanol), as well as components, elements and/or subsystems therefor that create, provide and/or facilitate an integration plane to incorporate various technologies.

Generally, fuel cell power systems may be employed to provide a portable source of electrical power. Fuel cell power systems typically include a source of fuel, a power generation unit, and power conditioning unit that are interconnected in a fixed manner. (See, for example, U.S. Patent Application Publication 2004/0067403). The source of fuel may be, for example, hydrogen, hydrogen rich gas, hydrogen containing compound or a substance from which hydrogen can be extracted on demand (i.e., a hydride storage cartridge).

The fuel cell power system employs the power generation unit to generate electrical power from the fuel. The power generation unit may include a fuel cell stack having an anode end for splitting hydrogen atoms into electrons and protons, a current bearing portion providing a pathway for the electrons, a medium such as a proton exchange membrane providing a pathway for the protons, and a cathode end for rejoining the electrons and protons into water molecules in the presence of oxygen. (See, for example, U.S. Pat. Nos. 5,683,828; 5,858,567; 5,863,671; and 6,051,331).

The power conditioning unit is connected to the power generation unit to condition the electrical power generated by the power generation unit and to provide an output power having suitable characteristics. The power conditioning unit is typically connected to an external power consumption device such as, for example, camera equipment, cell and satellite phone modems, microwave communication devices and computers. Typically, the power conditioning unit is connected directly to the consumption device via a unique-type connector.

SUMMARY OF THE INVENTION

There are many inventions described and illustrated herein as well as many aspects and embodiments of those inventions. In a first principal aspect, the present inventions include a fuel cell system comprising an integration plane, comprising (a) fluid bus, (b) an electrical bus, (c) a power management bus, and (d) a plurality of module bays. Each module bay including a fluid interface coupled to the fluid bus, an electrical interface coupled to the electrical bus, and a power management interface coupled to the power management bus. The fluid interface of each module bay is the same type of interface, the electrical interface of each module bay is the same type of interface, and power management interface of each module bay is the same type interface.

The fuel cell system further includes a resident processor, disposed on the integration plane and coupled to the electrical bus, to control at least one technology module which is capable of being disposed in, and connected to one or more interfaces of, one of the plurality of module bays.

In one embodiment, the fuel cell system includes a first technology module, which includes a hydrogen fuel cell stack to generate unconditioned electrical power using hydrogen. The first technology module is disposed in a first module bay of the plurality of module bays of the integration plane and connected to (i) the fluid bus of the integration plane via the fluid interface of the first module bay and (ii) the power management bus of the integration plane via the power management interface of the first module bay. The fuel cell system of this embodiment may include a resident power management unit, disposed on the integration plane and coupled to the power management bus, to generate conditioned electrical power from the unconditioned electrical power generated by the first technology module.

The fuel cell system may also include a second technology module, which includes power management circuitry to generate conditioned electrical power from the unconditioned electrical power generated by the first technology module. The second technology module is disposed in a second module bay of the plurality of module bays of the integration plane and connected to the power management bus of the integration plane via the power management interface of the second module bay. A third technology module, which includes a supply of hydrogen to provide hydrogen to the first technology module, may be disposed in a third module bay of the plurality of module bays of the integration plane and connected to the fluid bus via the fluid interface of the third module bay. Indeed, a fourth technology module, disposed in a fourth module bay of the plurality of module bays of the integration plane and connected to the electrical bus of the integration plane via the electrical interface of the fourth module bay, uses the conditioned electrical power generated by the second technology module.

In one embodiment, the fuel cell system includes an external electrical interface, disposed on the integration plane and coupled to the electrical bus of the integration plane. In another embodiment, the fuel cell system includes an external fluid interface, disposed on the integration plane and coupled to the fluid bus of the integration plane.

The fuel cell system of this aspect of the invention may include a first technology module, which includes a hydrogen fuel cell stack to generate unconditioned electrical power using hydrogen, disposed in a first module bay of the plurality of module bays of the integration plane and connected to (i) the fluid bus of the integration plane via the fluid interface of the first module bay and (ii) the power management bus of the integration plane via the power management interface of the first module bay. The fuel cell system may also include a second technology module, which includes a hydrogen fuel cell stack to generate unconditioned electrical power using hydrogen, disposed in a second module bay of the plurality of module bays of the integration plane and connected to (i) the fluid bus of the integration plane via the fluid interface of the second module bay and (ii) the power management bus of the integration plane via the power management interface of the second module bay. The resident processor enables the second technology module based on at least one predetermined event (for example, a need for additional electrical power, an operational failure of the first technology module, and a removal of the first technology module from the first module bay of the integration plane).

In another embodiment, the fuel cell system of this aspect of the invention may include a first technology module, which includes a hydrogen fuel cell stack to generate unconditioned electrical power, using hydrogen, on the power management bus, disposed in a first module bay of the plurality of module bays of the integration plane and connected to (i) the fluid bus of the integration plane via the fluid interface of the first module bay and (ii) the power management bus of the integration plane via the power management interface of the first module bay. In addition, a second technology module, which includes a battery or an ultra-capacitor to provide electrical power on the power management bus, may be disposed in a second module bay of the plurality of module bays of the integration plane and connected to the power management bus of the integration plane via the power management interface of the second module bay.

Further, a third technology module, which includes power management circuitry to generate conditioned electrical power from the unconditioned electrical power, may be disposed in a third module bay of the plurality of module bays of the integration plane and connected to the power management bus of the integration plane via the power management interface of the third module bay. A fourth technology module, which includes a supply of hydrogen to provide hydrogen to the first technology module, may be disposed in a fourth module bay of the plurality of module bays of the integration plane and connected to the fluid bus via the fluid interface of the fourth module bay.

In another aspect, the present invention is a fuel cell system comprising an integration plane, comprising (a) fluid bus, (b) an electrical bus, (c) a power management bus, and (d) a plurality of module bays. Each module bay including a fluid interface coupled to the fluid bus, an electrical interface coupled to the electrical bus, and a power management interface coupled to the power management bus. The fluid interface of each module bay is the same type of interface, the electrical interface of each module bay is the same type of interface, and power management interface of each module bay is the same type interface.

The fuel cell system further includes (1) a resident processor, disposed on the integration plane and coupled to the electrical bus, and (2) a resident power management unit, disposed on the integration plane and coupled to the power management bus, to generate conditioned electrical power from unconditioned electrical power on the power management bus.

In one embodiment, the fuel cell system includes a first technology module, which includes a hydrogen fuel cell stack to generate unconditioned electrical power using hydrogen. The first technology module is disposed in a first module bay of the plurality of module bays of the integration plane and connected to (i) the fluid bus of the integration plane via the fluid interface of the first module bay and (ii) the power management bus of the integration plane via the power management interface of the first module bay. A second technology module, which includes a supply of hydrogen to provide hydrogen to the first technology module, may be disposed in a second module bay of the plurality of module bays of the integration plane and connected to the fluid bus via the fluid interface of the second module bay. Further, a third technology module, having electrical circuitry which is connected to the electrical bus to use the conditioned electrical power generated by the resident power management unit, may be disposed in one of the plurality of module bays of the integration plane.

In one embodiment, the fuel cell system may include a first technology module, which includes a hydrogen fuel cell stack to generate unconditioned electrical power using hydrogen, disposed in a first module bay of the plurality of module bays of the integration plane and connected to (i) the fluid bus of the integration plane via the fluid interface of the first module bay and (ii) the power management bus of the integration plane via the power management interface of the first module bay. The fuel cell system of this embodiment may also include a second technology module, which includes a hydrogen fuel cell stack to generate unconditioned electrical power using hydrogen, disposed in a second module bay of the plurality of module bays of the integration plane and connected to (i) the fluid bus of the integration plane via the fluid interface of the second module bay and (ii) the power management bus of the integration plane via the power management interface of the second module bay. The resident processor may enable the second technology module based on at least one predetermined event (for example, a need for additional electrical power, an operational failure of the first technology module, and a removal of the first technology module from the first module bay of the integration plane).

In another embodiment, the fuel cell system includes a first technology module, which includes a hydrogen fuel cell stack to generate unconditioned electrical power, using hydrogen, on the power management bus, disposed in a first module bay of the plurality of module bays of the integration plane and connected to (i) the fluid bus of the integration plane via the fluid interface of the first module bay and (ii) the power management bus of the integration plane via the power management interface of the first module bay. The fuel cell system of this embodiment may also include a second technology module, which includes a battery or an ultra-capacitor to provide electrical power on the power management bus, disposed in a second module bay of the plurality of module bays of the integration plane and connected to the power management bus of the integration plane via the power management interface of the second module bay.

The fuel cell system of this embodiment may also include a third technology module, which includes power management circuitry to generate conditioned electrical power from the unconditioned electrical power, disposed in a third module bay of the plurality of module bays of the integration plane and connected to the power management bus of the integration plane via the power management interface of the third module bay. Indeed, a fourth technology module, which includes a supply of hydrogen to provide hydrogen to the first technology module, may be disposed in a fourth module bay of the plurality of module bays of the integration plane and connected to the fluid bus via the fluid interface of the fourth module bay.

In another aspect, the present invention is a fuel cell system comprising an integration plane, comprising (a) fluid bus, (b) an electrical bus, (c) a power management bus, and (d) a plurality of module bays. Each module bay includes a fluid interface coupled to the fluid bus, an electrical interface coupled to the electrical bus, and a power management interface coupled to the power management bus. The fluid interface of each module bay is the same type of interface, the electrical interface of each module bay is the same type of interface, and power management interface of each module bay is the same type interface.

The fuel cell system further includes a resident power management unit, disposed on the integration plane and coupled to the power management bus, to generate conditioned electrical power from unconditioned electrical power on the power management bus.

In one embodiment, the fuel cell system includes a first technology module, which includes a hydrogen fuel cell stack to generate unconditioned electrical power using hydrogen. The first technology module is disposed in a first module bay of the plurality of module bays of the integration plane and connected to (i) the fluid bus of the integration plane via the fluid interface of the first module bay and (ii) the power management bus of the integration plane via the power management interface of the first module bay. A second technology module, which includes a supply of hydrogen to provide hydrogen to the first technology module, may be disposed in a second module bay of the plurality of module bays of the integration plane and connected to the fluid bus via the fluid interface of the second module bay.

The fuel cell system of this embodiment may also include a third technology module having electrical circuitry to use the conditioned electrical power generated by the resident power management unit. The third technology module may be disposed in a third module bay of the plurality of module bays of the integration plane and connected to the electrical bus via the electrical interface of the third module bay,.

In another embodiment, the fuel cell system includes a first technology module, which includes a hydrogen fuel cell stack to generate unconditioned electrical power using hydrogen, disposed in a first module bay of the plurality of module bays of the integration plane and connected to (i) the fluid bus of the integration plane via the fluid interface of the first module bay and (ii) the power management bus of the integration plane via the power management interface of the first module bay. The fuel cell system of this embodiment may include a second technology module, which includes a processor to control at least one technology module when disposed in one of the plurality of module bays, disposed in a second module bay of the plurality of module bays of the integration plane and connected to the electrical bus of the integration plane via the electrical interface of the second module bay.

Indeed, the fuel cell system of this embodiment may also include a third technology module, which includes a hydrogen fuel cell stack to generate unconditioned electrical power using hydrogen, disposed in a third module bay of the plurality of module bays of the integration plane and connected to (i) the fluid bus of the integration plane via the fluid interface of the third module bay and (ii) the power management bus of the integration plane via the power management interface of the third module bay. The second technology module may enable the third technology module based on at least one predetermined event (for example, a need for additional electrical power, an operational failure of the first technology module, and a removal of the first technology module from the first module bay of the integration plane).

In another embodiment, the fuel cell system may include a first technology module, which includes a hydrogen fuel cell stack to generate unconditioned electrical power, using hydrogen, on the power management bus, disposed in a first module bay of the plurality of module bays of the integration plane and connected to (i) the fluid bus of the integration plane via the fluid interface of the first module bay and (ii) the power management bus of the integration plane via the power management interface of the first module bay. A second technology module, which includes a battery or an ultra-capacitor, may be disposed in a second module bay of the plurality of module bays of the integration plane and connected to the power management bus of the integration plane via the power management interface of the second module bay, to provide electrical power on the power management bus. Moreover, a third technology module, which includes a supply of hydrogen to provide hydrogen to the first technology module, may be disposed in a third module bay of the plurality of module bays of the integration plane and connected to the fluid bus via the fluid interface of the third module bay.

In another principal aspect, the inventions relate to a modular fuel cell system architecture that creates, provides or facilitates an integration plane to incorporate various technologies. The integration plane, in one aspect, includes a system controller or control system (with appropriate firmware). The integration plane may also include a fluid manifold, data bus, control bus and/or one or more power buses to, among other things, provide or facilitate an integration plane to incorporate the various technologies.

In conjunction with the integration plane, the present inventions may include individual subsystems, for example, one or more fuel cell stacks, hydrogen storage, hydrogen generator, super-capacitors, batteries, cell phone modems, satellite phone modems, microwave communication devices, that may interface to the "backplane" of the integration plane as "standardized" modules.

Each subsystem module may have an interface (for example, a common/uniform electrical contact or optical type) and/or protocol that couples, interfaces and/or mates to an interface (which may be standardized) on the integration plane. Each subsystem module may include appropriate circuitry that stores, includes, maintains and/or holds the identity and/or characteristics of the subsystem module or device. Control algorithm software, where necessary, to interface with the subsystem module may be provided to the integration plane (or one or more subsystem modules connected thereto) via an external or source or may be "downloaded" from the subsystem module itself when the subsystem is incorporated into the integration plane (and/or interconnected with other subsystem modules connected to the integration plane, for example, a controller subsystem that controls one or more operations relating to the integration plane).

Where the integration plane includes a resident controller (or control system), subsystem modules that are incorporated into the integration plane may communicate (directly or indirectly) with the resident controller or control system (having an appropriately programmed processor or controller) and inform the control system of its "presence" and, in certain embodiments, its capability(ies) and/or characteristics. The control system may, based on a determination of the one or more subsystem modules coupled or connected to control system, assess and/or determine (among other things) the output of the power system and the mode of operation of the integration plane in order to, for example, accommodate the one or more subsystem modules.

Notably, the control system may also include a user programmable interface that allows for further customization of the system related to, for example, operation of one or more subsystems, and/or redundancy and reliability of the system. In addition, the system may include an audio or visual interface to facilitate user or operator access to one or more components of the system and/or operation (for example, the control system or subsystem module). In this way, the user or operator may, among other things, have easy access to any data provided by and/or to the system.

Further, the system may be designed to allow for "hot swap" of modules during operation. In this way, the system may be configured or re-configured without "disabling" the integration plane or one or more subsystems connected thereto. As such, the system capabilities and characteristics may be changed, modified, configured and/or re-configured "on the go".

The invention, in addition to the architecture, may also include the control algorithms associated with each of these devices or subsystems. For example, in the above cases the addition of a cell phone module will allow a user or operator to remotely contact the system via a telecommunications in order to interface with the system.

Notably, the present inventions may be employed in connection with or as an element/component of the fuel cell management systems, techniques, structures and/or configurations described and illustrated in non-provisional U.S. patent application "Fuel Cell Power and Management System, and Technique for Controlling and/or Operating Same", filed on Jan. 14, 2005 and assigned Ser. No. 11/036,240. The entire contents of the above-referenced patent application, including, for example, the inventions, features, attributes, architectures, configurations, materials, techniques and advantages described and illustrated therein, are hereby incorporated by reference herein.

Again, there are many inventions, and aspects of the inventions, described and illustrated herein. This Summary of the Inventions is not exhaustive of the scope of the present inventions. Moreover, this Summary of the Inventions is not intended to be limiting of the inventions and should not be interpreted in that manner. While certain embodiments have been described and/or outlined in this Summary of the Inventions, it should be understood that the present inventions are not limited to such embodiments, description and/or outline, nor are the claims limited in such a manner. Indeed, many others embodiments, which may be different from and/or similar to, the embodiments presented in this Summary, will be apparent from the description, illustrations and claims, which follow. In addition, although various features, attributes and advantages have been described in this Summary of the Inventions and/or are apparent in light thereof, it should be understood that such features, attributes and advantages are not required whether in one, some or all of the embodiments of the present inventions and, indeed, need not be present in any of the embodiments of the present inventions.

BRIEF DESCRIPTION OF THE DRAWINGS

In the course of the detailed description to follow, reference will be made to the attached drawings. These drawings show different aspects of the present inventions and, where appropriate, reference numerals illustrating like structures, components, materials and/or elements in different figures are labeled similarly. It is understood that various combinations of the structures, components, materials and/or elements, other than those specifically shown, are contemplated and are within the scope of the present invention.

FIG. 1B is a block diagram representation of one of the plurality of module bays of the integration plane of FIG. 1A;

FIGS. 3A-3C illustrate fluid or electrical flow at the interface of the integration plane including unidirectional (FIGS. 3A and 3B) and bidirectional (FIG. 3C);

FIG. 3D illustrates fluid or electrical flow at the interface regardless of the manner or direction of fluid flow or electrical signal/current flow; accordingly, FIG. 3A-3C are illustrated generically herein as FIG. 3D;

FIGS. 7B-7D illustrate an exemplary system including an integration plane, having a plurality of module bays, a plurality of technology modules populating the module bays, as well as an exemplary module bay interface, according to an embodiment of an aspect of the present inventions;

FIGS. 7E and 7F illustrate a plurality of exemplary technology modules, as well as an exemplary technology module interface, according to an embodiment of an aspect of the present inventions;

FIG. 8A-8C are illustrated generically herein as FIG. 8D;

FIG. 53A is a block diagram representation of an exemplary reformer/electrolyzer module including an interface to communicate with the fluid and electrical interfaces of a module bay of the integration plane (notably, in this exemplary embodiment, the power management interface is terminated);

FIG. 53B is a block diagram representation of an exemplary solar power module including an interface to communicate with the power management interface of a module bay of the integration plane (notably, in this exemplary embodiment, the fluid and electrical interfaces are terminated);

FIG. 53C is a block diagram representation of an exemplary batter power module including an interface to communicate with the power management interface of a module bay of the integration plane (notably, in this exemplary embodiment, the fluid and electrical interfaces are terminated);

FIG. 53D is a block diagram representation of an exemplary batter power module including an interface to communicate with the electrical and power management interfaces of a module bay of the integration plane (notably, in this exemplary embodiment, the fluid interface is terminated);

DETAILED DESCRIPTION

Figure 1A:
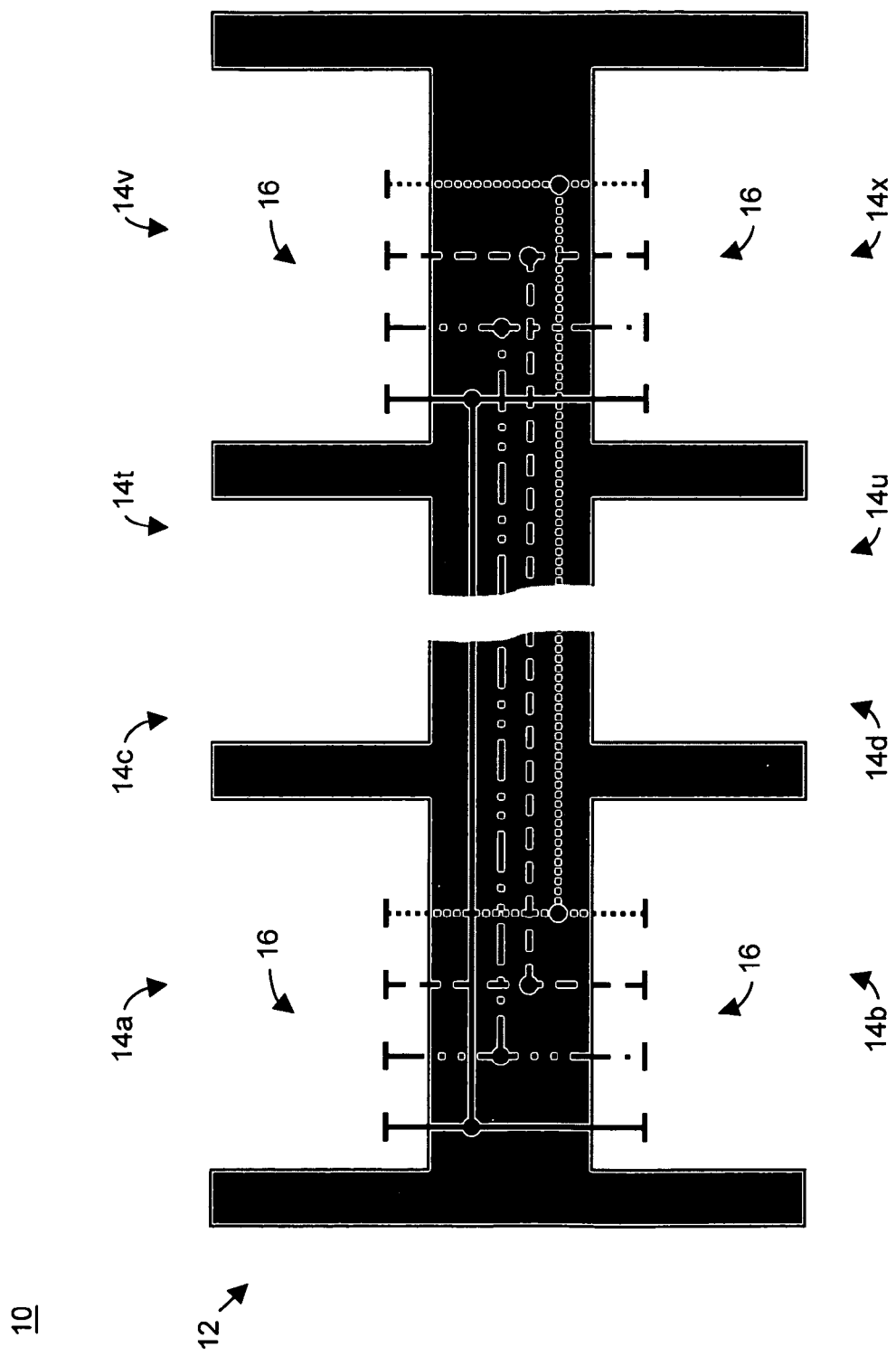
FIG. 1A is a block diagram representation of an exemplary integration plane, having a plurality of module bays and illustrating a plurality of fluid, power management and electrical buses, according to a first aspect of the present inventions.
Figure 2A:
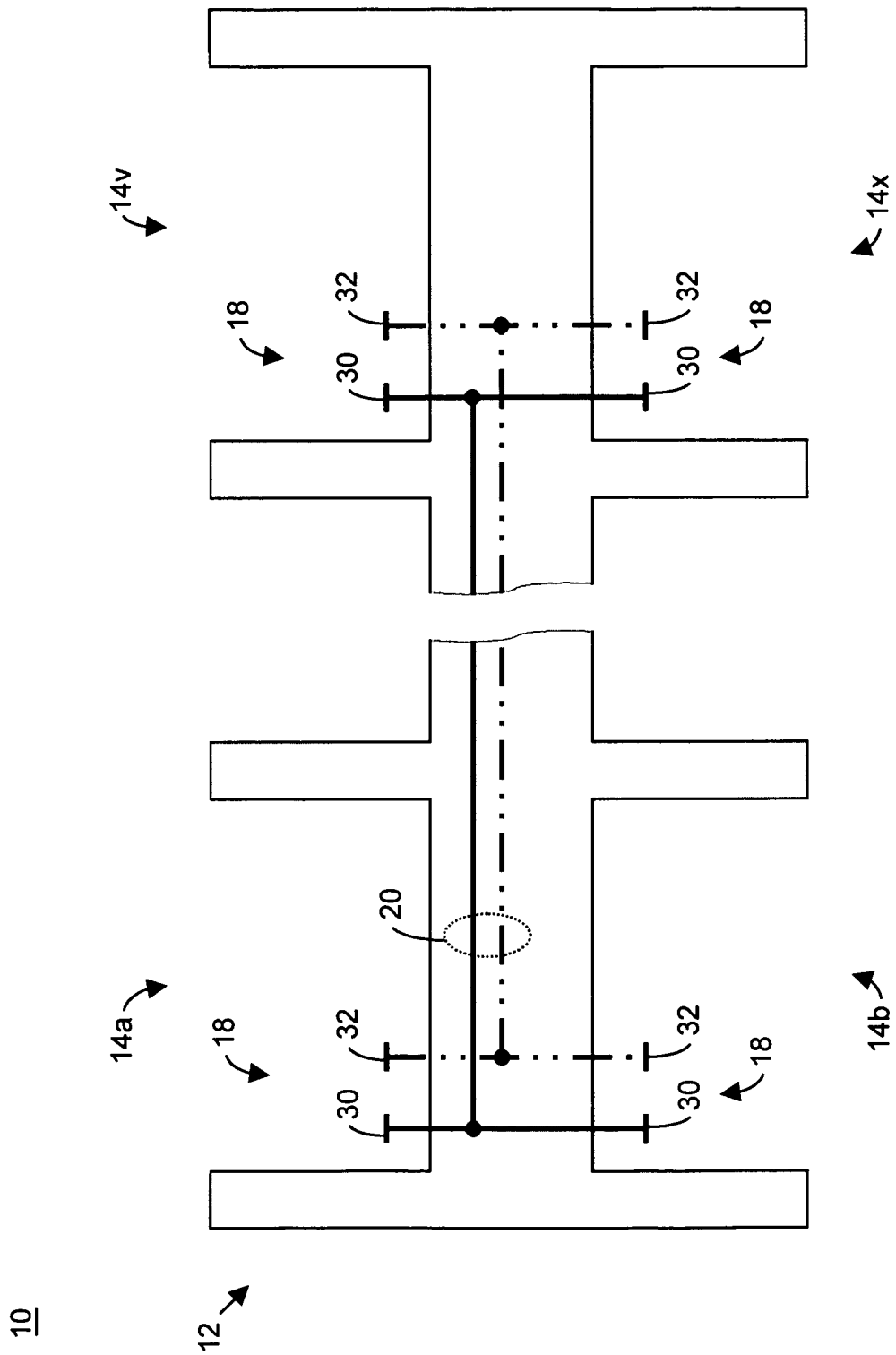
FIGS. 2A-2C are block diagram representations of the exemplary integration plane of FIG. 1A separately illustrating a fluid bus, power management bus and electrical bus, respectively.
Figure 2B:
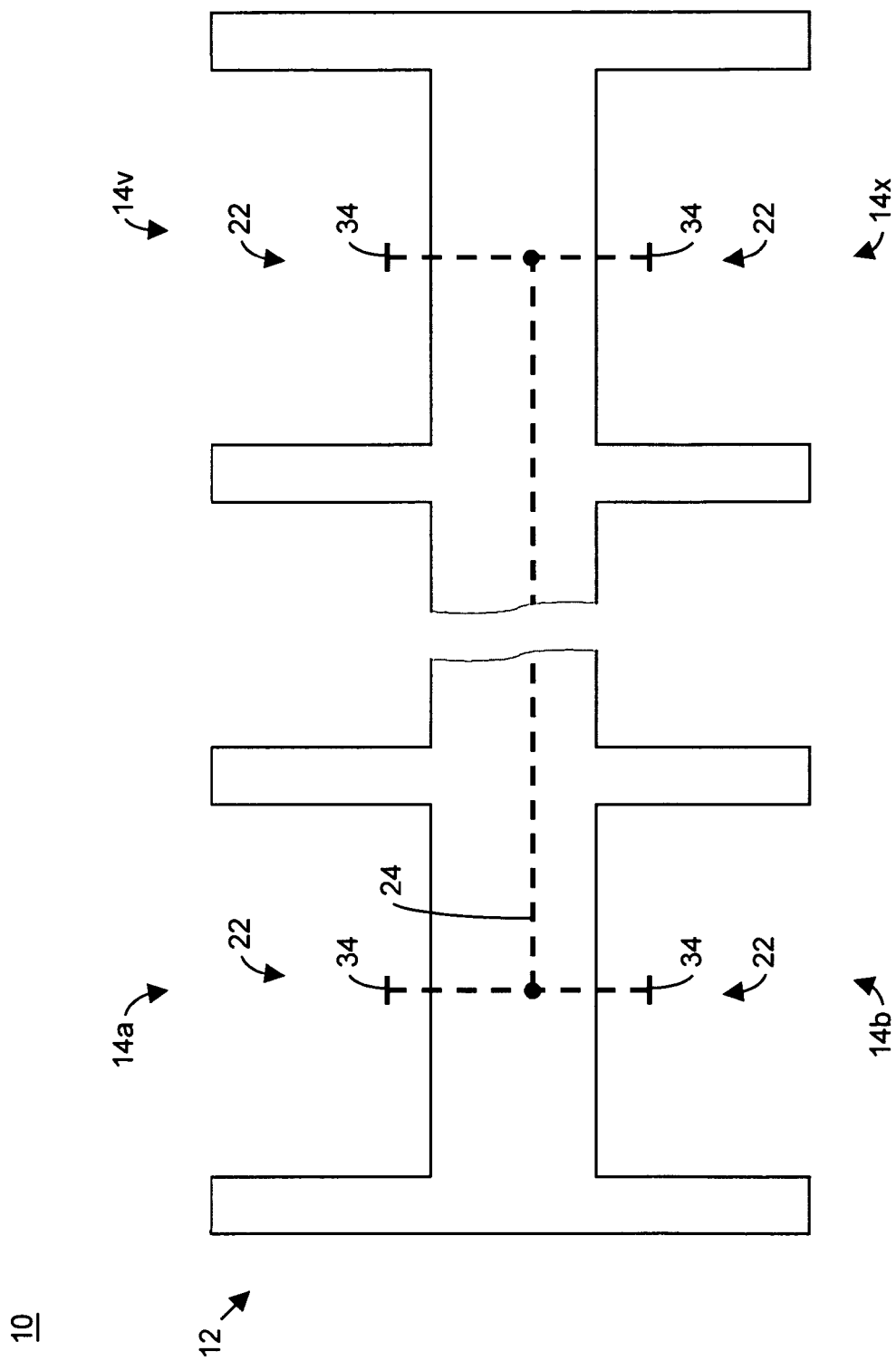
Figure 2C:
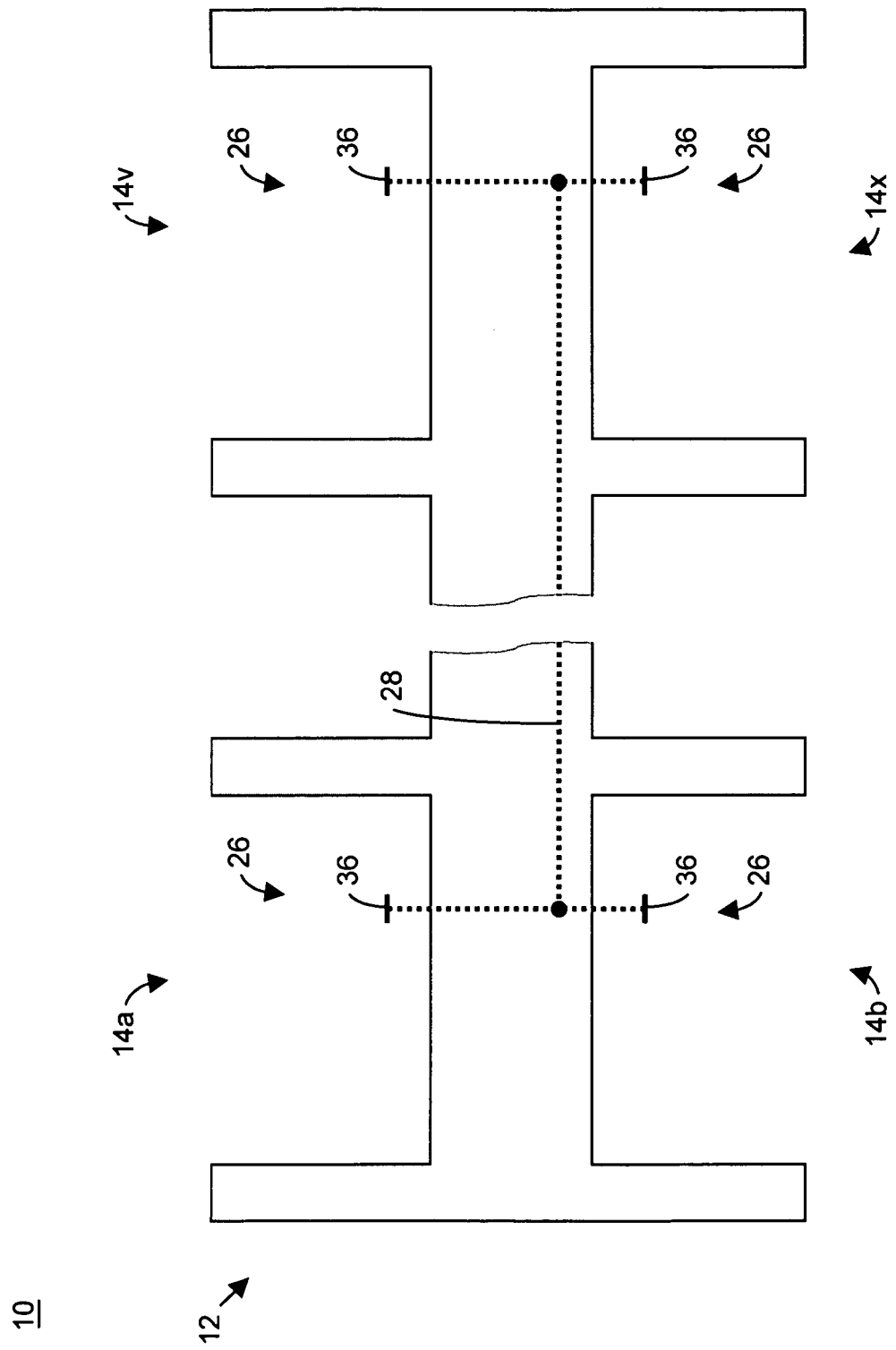

There are many inventions described and illustrated herein. In one aspect, the inventions relate to a power system (for example, fuel or solar cell system) and architecture having an integration plane to incorporate various technology modules therein including, for example, one or more power sources (for example, fuel cell stacks, solar cells (or the like), batteries), fuel storage containers/tanks (for example, hydrogen, methanol and/or hydrogen containing compounds or substances from which hydrogen can be extracted on demand (e.g., a hydride)), fuel reformer, power unit having a power management unit to provide a conditioned and/or regulated electrical power using electrical power provided by a fuel cell, fuel cartridge having one or more fuel storage containers/tanks and electrical circuitry to monitor and/or store one or more parameters of the fuel storage container(s)/tank(s), super-capacitors, batteries, and/or electrical or electronic devices such as mobile communications (for example, phones and/or modems), data processor circuitry, and/or monitoring or surveillance device (for example, a imaging sensing device (for example, camera) and/or audio sensing device).

The integration plane includes a plurality of module bays. Each module bay is designed and/or configured to receive a technology module and/or to interconnect with the interface of the technology module. In one embodiment, each module bay includes fluid, electrical and power management interfaces which are coupled to fluid and electrical buses, respectively, disposed on or in the integration plane. The fluid, electrical and power management interfaces may be uniform, common or standard interfaces (i.e., the interfaces and interface techniques which are common to a plurality of module bays of the interface plane). The fluid, electrical and power management interfaces of one or more module bays may include a unique fluid and/or electrical interface, for example, the interface may be designed for a particular technology module, or one of the fluid and/or electrical interfaces is omitted thereby providing a unique module bay for a particular technology module.

The fluid, electrical and power management buses may include one or more portions. In this regard, the fluid bus may include a fluid manifold architecture providing one or more fluid paths (for example, a plurality of input and output/exhaust paths). Notably, all fluid bus types, architectures and configurations, whether now known or later developed, are intended to fall within the scope of the present inventions.

The power management bus includes one or more electrical lines to provide unconditioned and/or unregulated power from, for example, a fuel cell, to a power unit or power management unit. The power unit or power management unit, in response, generates suitable electrical power (for example, conditioned and/or regulated power) on the electrical bus. Notably, all power management type bus architectures and configurations, whether now known or later developed, are intended to fall within the scope of the present inventions.

The electrical bus may include an electrical power portion, a control portion and/or a data portion. Indeed, each portion of the electrical bus may include one or more sub-portions. For example, the power portion may include separate lines for predetermined voltages, currents and grounds/commons (for example, analog and digital grounds). Moreover, the electrical bus may include point-to-point, parallel, multiplexed and/or non-multiplexed architectures. Notably, all electrical bus types and architectures, whether now known or later developed, are intended to fall within the scope of the present inventions.

The fluid, power management and electrical buses may be routed to the module bays using a variety of schemes/architectures—all of which are intended to fall within the scope of the present inventions. For example, in one embodiment, the fluid, power management and electrical buses connect to the fluid and electrical interfaces of a plurality of, or all module bays of the integration plane. In this way, the integration plane facilitates fluid, power management and electrical communication between the technology modules connected to the fluid and electrical interfaces of the plurality of module bays. As such, each module bay of such an integration plane may receive, connect and provide fluid, power management, and/or electrical communication to any other module bay of the integration plane.

In another embodiment, the fluid, power management and electrical buses are routed and connected to fluid, power management and electrical interfaces of selected and/or predetermined module bay(s). In this way, the integration plane facilitates selected fluid, power management and/or electrical communication between predetermined technology modules connected to predetermined module bay(s). Indeed, the fluid, power management and electrical buses may be routed and connected to fluid, power management and electrical interfaces of selected and/or predetermined module bay(s) in a point-to-point architecture.

The technology modules may include uniform, common or standard fluid and electrical interfaces that interconnect with the fluid, power management and electrical interfaces of module bay. In this way, the technology module may be disposed in any module bay of the integration plane that includes a uniform, common or standard fluid, power management and electrical interfaces. That is, because the uniform nature of the fluid, power management and electrical interfaces, a technology module, regardless of the type (for example, fuel cell module, fuel storage module or electrical/electronic module) may populate any module bay of the integration plane that includes a common or standard fluid, power management and electrical interfaces.

In another embodiment, one or more of the technology modules include a unique interface that may be, for example, customized to the requirements and/or functionality of a given technology module. For example, a unique interface may omit one of the fluid, power management and/or electrical interfaces and/or may include a non-standard fluid, power management and/or electrical interface. In this regard, the unique interface may be specially designed for a particular technology module to facilitate communication with the integration plane, which includes a counterpart or associated specially designed unique interface, to "mate" with the unique interface of the technology module.

In certain embodiments, the integration plane may include resident technology fixedly incorporated into or onto, or embedded on the integration plane, for example, a resident system processor, controller or control system (having appropriate firmware), resident power management unit, and/or resident fuel cell technology. The fluid and/or electrical buses disposed on or in the integration plane may be routed to and/or through the resident technology. For example, a resident system processor may be fixedly secured to the integration plane and coupled to the electrical bus in order to manage and/or control the use of the bus (for example, the data and/or control portion of the electrical bus) by one or more electronic modules that are disposed in module bay(s) of the integration plane. In this way, the resident system processor may facilitate orderly use of the electrical bus and manage communication between a plurality of electronic modules that are disposed in module bay(s) of the integration plane.

Further, where the integration plane includes resident power management unit, the fuel cells may provide "raw" electrical power (for example, unconditioned and/or unregulated electrical power) to the resident power management unit which, in turn, provides conditioned and/or regulated power to the technology modules disposed in module bay(s) of the integration plane. In this way, the resident power management unit may be the primary unit that provides suitable electrical power to, for example, electronic modules that are connected to the power lines of the electrical bus.

Indeed, the integration plane may include a resident system processor and a resident power management unit. In this way, the module bays may be populated by one or more fuel cell stacks, fuel storage containers/tanks (for example, hydrogen or hydride), a "redundant" or secondary power management unit to provide fault-tolerant capabilities, fuel cartridge having one or more fuel storage containers/tanks and circuitry to monitor and/or store one or more parameters of the fuel storage container(s)/tank(s), super-capacitors, batteries, electrical or electronic devices such as, for example, mobile communications device (for example, a phone or modem) and/or a surveillance device, and/or a "primary" system processor to provide primary control/management for the integration plane or a "redundant" or secondary system processor to provide fault-tolerant capabilities in the event that the resident system processor becomes inoperative. Notably, all permutations and combinations of resident technologies and technology modules are intended to fall within the scope of the present inventions. However, for the sake of brevity, all such permutations and combinations are not discussed in detail herein.

In addition to the plurality of module bays, the integration plane may also include one or more external connectors, disposed on an outer surface of the integration plane, having an interface that facilitates fluid and/or electrical communication with an external unit (for example, a fuel source, fuel cell, power management unit, processor or controller unit, and/or a second integration plane). In this regard, where the external connector is a fluid type connector, the fluid bus of the integration plane may be connected to the external connector to facilitate communication with, for example, a fuel source connected to the external connector. In those circumstances where the external connector is an electrical type connector, one or more portions of the electrical bus (for example, the power portion of the electrical bus) may be routed to the external connector to facilitate communication with, for example, a power management unit or external electrical/electronic device (for example, a computer, mobile communication device, and/or monitoring or surveillance device (for example, a imaging sensing device and/or audio sensing device)) that employs electrical power produced, generated, conditioned and/or regulated via a resident unit on, or a technology module populating (i.e., disposed in) a module bay of the integration plane. The one or more external connectors may be located distant from the module bays and on the integration plane to permit relatively easy connection to the external unit. In this way, the physical dimensions of the external unit are less constrained by, for example, the architecture and physical dimensions/characteristics of the integration plane.

With reference to FIGS. 1A, 1B and 2A-C, in one embodiment, modular fuel cell power system 10 includes integration plane 12 having a plurality of module bays 14a-x. In this embodiment, each module bay 14 of integration plane 12 includes module bay interface 16 including, in this embodiment, fluid interface 18, which connects to fluid bus 20, electrical interface 22, which connects to electrical bus 24, and power management interface 26 which connects to power management bus 28. As discussed in detail below, module bay interface 16 engages a reciprocal or "mating" interface disposed on each technology module.

Notably, integration plane 12 may be fabricated from any material and/or employ any structure whether now known or later developed. For example, integration plane 12 may be fabricated from aluminum, plastic, carbon fiber or other light material, metal and/or composite. The structure may be designed to provide additional sturdiness, for example, a honeycomb structure may be employed to enhance the durability of the integration plane. Again, any material and/or structure, whether now known or later developed may be implemented to fabricate integration plane 12.

Further, integration plane 12 may be fabricated to any physical dimensions desired or suitable for the environment in which integration plane 12 is to be implemented. It may be advantageous, however, to provide physical dimensions that facilitate standardization of the size of module bay 14 and thereby standardization of the physical dimensions of the technology modules to populate bays 14. In this way, module bays 14 may receive and engage with a plurality of different types of technology modules.

Figure 4A:
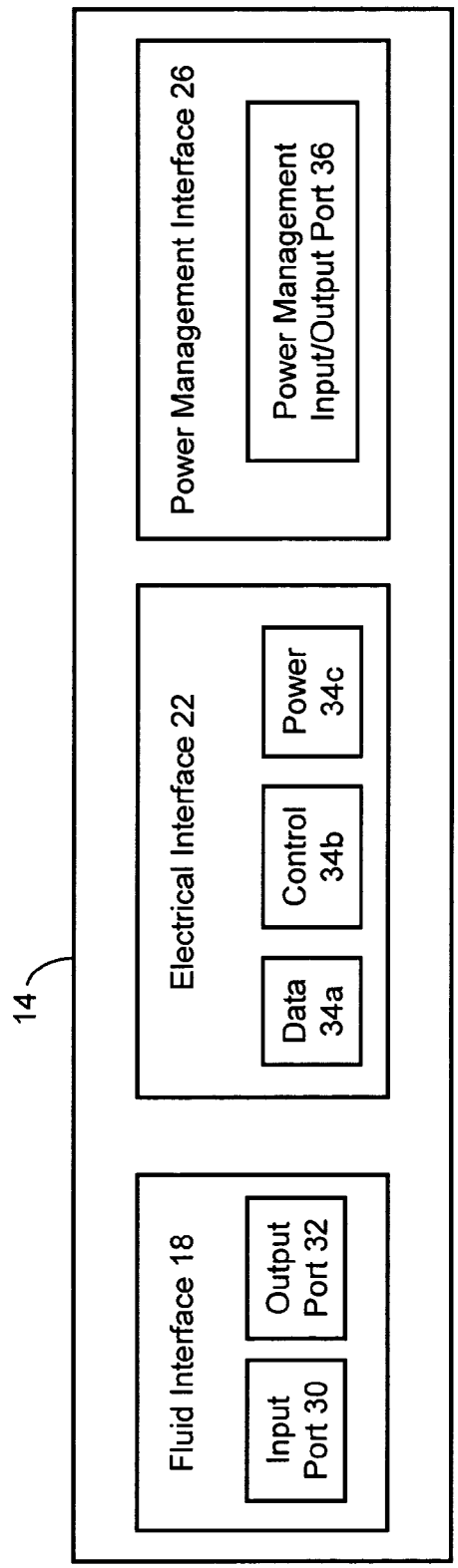
FIG. 4A is a block diagram representation of an embodiment of the interface of a module bay of the integration plane wherein the interface includes fluid interface, power management interface and electrical interface.

With reference to FIG. 4A, the layout or architecture of module bay interface 16, and the types of interfacing and connection techniques, structures and/or mechanisms of fluid interface 18, electrical interface 22, and power management interface 26, may be any form, type layout, structure, mechanism and/or configuration now known or later developed. It may be advantageous, however, that module bays 14 employ a uniform or standard layout of interface 16, and employ common, uniform or standard interfacing techniques, structures and/or mechanisms to enhance the flexibility of each module bay 14. In this regard, where the layout of module bay interface 16 and the types of interfacing techniques, structures and/or mechanisms are uniform, standardized or common, module bay 14 may receive and communicate with a plurality of different types of technology modules. Indeed, any module bay 14 having such features may receive, engage and communicate with any type of technology module having a reciprocal or "mating" interface disposed thereon.

Figure 4B:
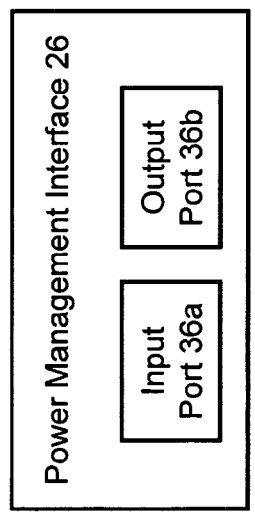
FIG. 4B is a block diagram representation of an embodiment of the power management interface of a module bay of the integration plane wherein the interface includes input and output ports.

With continued reference to FIG. 4A, in one embodiment, fluid interface 18 includes a plurality of ports, including input port 30 and output/exhaust port 32. As mentioned above, fluid interface 18 may employ any type, structure and/or mechanism of connector including quick connect/release mechanisms or screw-on type. Notably, fluid interface 18 may include more than one input port and/or output port to accommodate, for example, more than one fluid source. The fluid interface may employ any type, structure and/or mechanism, whether now known or later developed. (See, for example, FIGS. 4B, 7B and 7D).

For example, fluid interface 18 may employ any of the fluid interface embodiments described and illustrated in "Fuel Cell Power and Management System, and Technique for Controlling and/or Operating Same", filed on Jan. 14, 2005 and assigned Ser. No. 11/036,240. As mentioned above, the entire contents of the above-referenced patent application, including, for example, the inventions, embodiments, features, attributes, architectures, configurations, materials, techniques and advantages described and illustrated therein, are hereby incorporated by reference herein.

The electrical interface 22 may be wired, wireless and/or optical transmission techniques to provide communication between module bay 14 and a particular technology module. The electrical interface 22 may include one or more wired, wireless or optical "connectors" 34a-c to provide an electrical power portion, a control portion and/or a data portion, respectively, to one or more module bays 14. The connectors 34 may be an electrical connector that includes signal, power and ground pins or contacts, where signals are transmitted using proprietary or non-proprietary protocols. The connectors 34 may also be an optical connector (for example, an optical transmitter/receiver) that communicates signals using well-known techniques and protocols. Moreover, connectors 34 may be a wireless connector that also communications signals using well-known techniques and protocols.

Notably, there are many wireless technologies that may be implemented. For example, Radio Frequency (RF) based wireless communication technologies may be more suitable than other free-space techniques because such techniques provide high data transfer rates but do not require the presence of a line of sight. Other suitable wireless technologies include, for example, infrared and free-space optical communications. Indeed, all such wireless communication techniques, whether now known or later developed, are intended to be within the scope of the present invention.

In one embodiment, wireless local area network technologies, for example, 802.11a/b/g, may be employed for the RF based wireless transmission. Indeed, in one embodiment, multiple channels of 802.11a/g (each channel supports 54 Mbps raw data rate) may be implemented to output data (for example, sensor data), and one channel of 802.11b (each channel supports 11 Mbps data rate) may be implemented to input data (for example, commands and/or configuration data). Moreover, implementing a configuration where there is short distance between antennas, the power consumption of these multiple channels may be significantly reduced without adversely affecting the communication quality.

Notably, all forms, techniques and/or types of electrical connectors, whether now known or later developed, are intended to fall within the scope of the present inventions. For example, electrical interface 22 and "connectors" 34a-c may employ any of the embodiments of the electrical interface and/or "connectors" described and illustrated in non-provisional U.S. patent application "Fuel Cell Power and Management System, and Technique for Controlling and/or Operating Same", filed on Jan. 14, 2005 and assigned Ser. No. 11/036,240.

Indeed, communication may be implemented using fluid bus 20 and/or power management interface 26. In this regard, in addition to or in lieu thereof, information which is representative of the type of module may be provided to integration plane 12 (or another technology module) via fluid bus 20 (for example, via the availability of a fluid, such as, for example, by an increase in pressure of the fluid in fluid bus 20) and/or power management interface 26 (for example, via an increase or decrease in the available unregulated power on interface 26). Similarly, the operational state of a given technology module may be controlled, adjusted and/or maintained using fluid bus 20 and/or power management interface 26 (in addition to or in lieu of electrical bus 24). Moreover, the communication of information may be implied (a change in a condition of interface 12 (for example, the availability of a fluid) and/or express (via the data communication via the data portion of electrical bus 24).

With continued reference to FIG. 4A, power management interface 26, in one embodiment, includes input/output connector 36 which, for example, receives unconditioned and/or unregulated electrical power from a fuel cell type technology module or provides such electrical power to a power unit module and/or a power management unit module connected to input/output connector 36. Notably, power management interface 26 may include more than one input/output port to facilitate input/output of more than one source of unconditioned and/or unregulated electrical power. All types of connectors for power management interface 26, whether now known or later developed, are intended to fall within the scope of the present inventions. For example, power management interface 26 may employ a quick connect/release mechanism to facilitate rapid connection of a fuel cell module, power unit module and/or power management unit module to the power management interface 26. The power management interface 26 may also employ any of the embodiments described and illustrated in non-provisional U.S. patent application "Fuel Cell Power and Management System, and Technique for Controlling and/or Operating Same", filed on Jan. 14, 2005 and assigned Ser. No. 11/036,240, which, as mentioned above, is incorporated by reference herein. Notably, input/output connector 36 may be provided as two separate connectors, for example, input connector 36a and output connector 36b. (See, for example, FIG. 4B).

The modular fuel cell power system of the present inventions further includes a plurality of technology modules including, for example, one or more fuel cell stacks, fuel storage containers/tanks (for example, hydrogen, methanol and/or hydrogen containing compounds or substances from which hydrogen can be extracted on demand (e.g., a hydride)), power unit having a power management unit to provide a conditioned and/or regulated electrical power using electrical power provided by a fuel cell, fuel cartridge having one or more fuel storage containers/tanks and electrical circuitry to monitor and/or store one or more parameters of the fuel storage container(s)/tank(s), super-capacitors, batteries, and/or electrical or electronic devices such as mobile communications (for example, phones and/or modems), data processor circuitry, and/or monitoring or surveillance device (for example, a imaging sensing device (for example, camera) and/or audio sensing device). In one embodiment, the technology modules are designed to be disposed in the module bay and communicate with predetermined portions of the module bay interface which are coupled to the fluid, electrical and/or power management buses of the integration plane.

Figure 5:
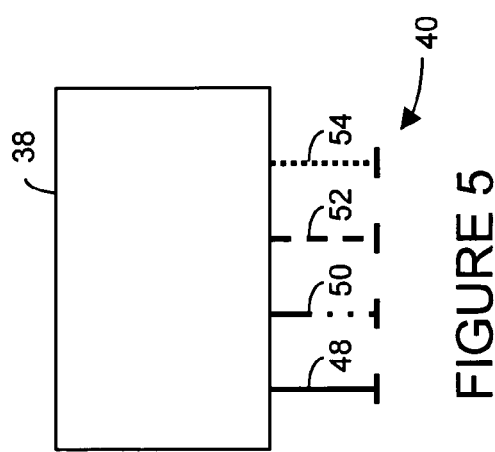
FIG. 5 is a block diagram representation of an exemplary embodiment of a technology module including an interface to communicate with the interface of a module bay of the integration plane.

With reference to FIG. 5, in one embodiment, technology module 38 (for example, a fuel cell, fuel storage tank, fuel cartridge, power management unit, power unit and electronics unit) includes technology module interface 40 that facilitates fluid, electrical and/or power management communications to an associated portion of module bay interface 16 of integration plane 12. In this regard, module interface 40 includes fluid interface 42, electrical interface 44, and power management interface 46, each having appropriate connectors for providing communication with fluid interface 18, electrical interface 22, and power management interface 26 of module bay interface 16 of integration plane 12. (See, for example, FIGS. 6H, 7E and 7F).

As mentioned above, the layout of module bay interface 16, and the types of interfacing and connection techniques, structures and/or mechanisms of fluid interface 18, electrical interface 22, and power management interface 26, may be any form, type layout, structure, mechanism and/or configuration now known or later developed. It may be advantageous, however, that module bays 14 employ a uniform, common or standard layout of interface 16, and employ uniform, common or standard interfacing techniques, structures and/or mechanisms to enhance the flexibility of each module bay 14. In this way, a plurality of different and/or diverse types of technology modules 38 may engage, populate and communicate with a plurality of module bays 14 of integration plane 12. Indeed, technology modules 38 having such features may receive, engage and communicate with any module bay 14 having a reciprocal or "mating" interface. (See, for example, FIG. 7C).

Figure 6A:
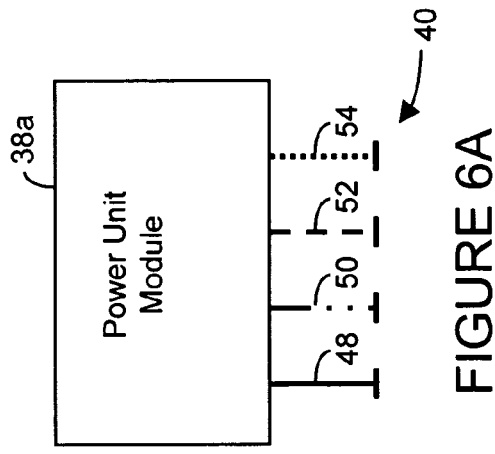
FIG. 6A is a block diagram representation of an exemplary power unit module including an interface to communicate with the fluid, power management and electrical interfaces of a module bay of the integration plane (notably, in this exemplary embodiment, all of the interfaces are employed by this exemplary power unit module (i.e., no interfaces are terminated))
Figure 6C:
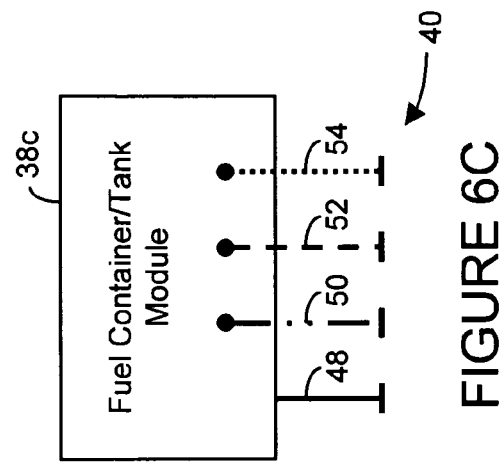
FIG. 6C is a block diagram representation of an exemplary fuel container/tank module including an interface to communicate with the fluid interface of a module bay of the integration plane (notably, in this exemplary embodiment, the electrical and power management interfaces are terminated)

Briefly, with reference to FIG. 6A, technology module may be power unit module 38a which, in response to a fluid (for example, hydrogen), generates conditioned and/or regulated electrical power. In this regard, power unit 38a includes a fuel cell mechanism to generate electrical power from fluid and power conditioning circuitry to provide a conditioned and/or regulated electrical power from the fuel cell. In the exemplary embodiment, power unit module 38a includes module interface 40 (fluid interface 42, electrical interface 44, and power management interface 46) providing communication with fluid interface 18, electrical interface 22, and power management interface 26 of module bay interface 16 of integration plane 12. The power unit module 38a may employ a conventional fuel cell mechanism/design and conventional power conditioning circuitry. Notably, however, all mechanisms, designs and/or types of fuel cells and power conditioning circuitry, whether now known or later developed, are intended to fall within the scope of the present inventions. For example, power unit module 38a may include the mechanisms, designs, types, features, functions and operation/control techniques of any embodiment of the power unit described and illustrated in non-provisional U.S. patent application "Fuel Cell Power and Management System, and Technique for Controlling and/or Operating Same", filed on Jan. 14, 2005 and assigned Ser. No. 11/036,240, which, as mentioned above, is incorporated by reference herein.

Figure 6B:
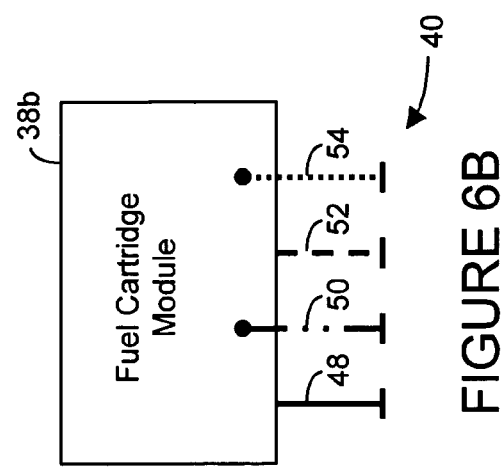
FIG. 6B is a block diagram representation of an exemplary fuel cartridge module including an interface to communicate with the fluid and electrical interfaces of a module bay of the integration plane (notably, in this exemplary embodiment, the power management interface is terminated)
Figure 6E:
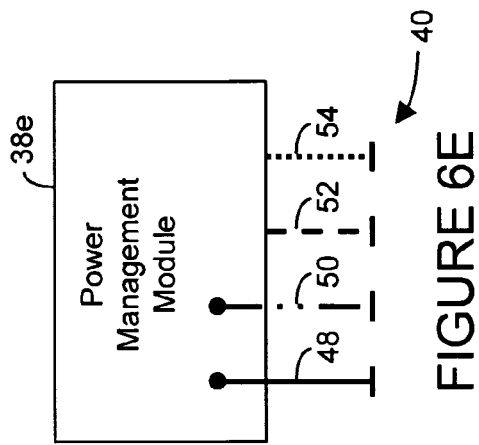
FIG. 6E is a block diagram representation of an exemplary power management module including an interface to communicate with the electrical and power management interfaces of a module bay of the integration plane (notably, in this exemplary embodiment, the fluid interface is terminated)
Figure 6G:
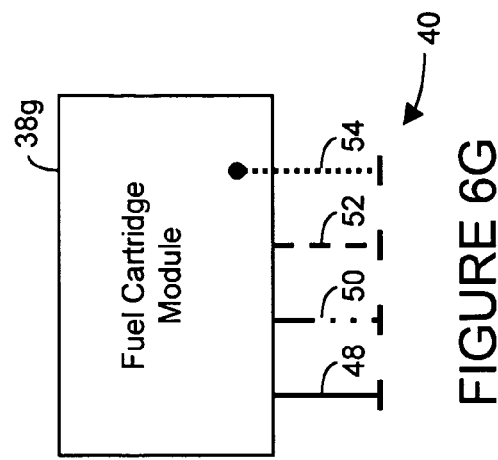
FIG. 6G is a block diagram representation of another exemplary fuel cartridge module including an interface to communicate with the fluid (input and exhaust ports) and electrical interfaces of a module bay of the integration plane (notably, in this exemplary embodiment, the power management interface is terminated)

With reference to FIGS. 6B and 6G, technology module may be fuel cartridge module 38b or 38g which provides a fuel (in the form of a fluid (whether in a gas or liquid form), for example, hydrogen) and may include electrical circuitry (for example, memory) to maintain, store and/or monitor one or more operating parameters (for example, state of fill) of the cartridge. For example, in one embodiment, fuel cartridge module 38a may include one or more of the mechanisms, designs, types, features, functions and operation/control techniques of any embodiment of the power unit described and illustrated in non-provisional patent application Ser. No. 11/036,240, filed Jan. 14, 2005, entitled "Fuel Cell Power and Management System, and Technique for Controlling and/or Operating Same", which (as mentioned above) is incorporated by reference herein in its entirety. Further, fuel cartridge module 38b may be any of the fuel cartridge embodiments described and illustrated in non-provisional patent application Ser. No. 11/036,240, filed Jan. 14, 2005, entitled "Fuel Cell Power and Management System, and Technique for Controlling and/or Operating Same".

Notably, in the exemplary embodiment of FIG. 6B, fuel cartridge module 38b includes module interface 40 (fluid interface 42, electrical interface 44, and power management interface 46) providing communication with input port 30a of fluid interface 18 and electrical interface 22 of module bay interface 16 of integration plane 12. As such, exhaust port 50, which connects to exhaust port 30b of fluid interface 18, and input/output connector 54 of power management interface 46 are not active connections and are illustrated with terminations.

In contrast, in the exemplary embodiment of FIG. 6G, fuel cartridge module 38g includes module interface 40 that provides communication with input port 30a and output port 30b of fluid interface 18 and electrical interface 22. Accordingly, input/output connector 54 of power management interface 46 is an inactive connection and is therefor illustrated with a termination.

With reference to FIG. 6C, technology module may be fuel container/tank 38c which stores a fuel (whether in gas, liquid or solid form). In the exemplary embodiment, fuel container/tank 38c includes interface 40 (fluid interface 42, electrical interface 44, and power management interface 46) that provides only fluid communication with module bay interface 16 of integration plane 12. As such, in this exemplary embodiment, electrical interface 44 and power management interface 46 are not active connections and are therefore illustrated with terminations.

Figure 6D:
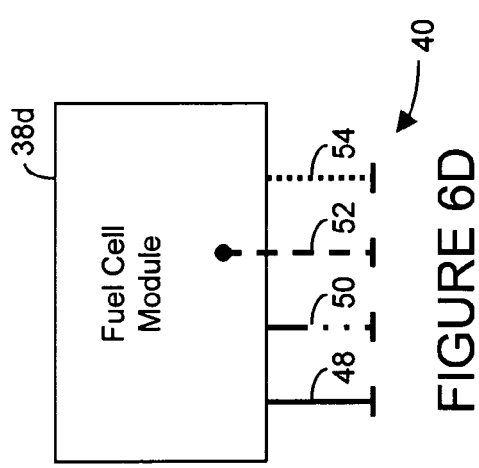
FIG. 6D is a block diagram representation of an exemplary fuel cell module including an interface to communicate with the fluid and power management interfaces of a module bay of the integration plane (notably, in this exemplary embodiment, the electrical interface is terminated)

With reference to FIG. 6D, technology module may be fuel cell 38d which receives a fuel (whether in gas or liquid form) and, in response, generates electrical power. The fuel cell module 38a may employ a conventional fuel cell mechanism/design. Indeed, fuel cell module 38a may employ any design and/or type of fuel cell, whether now known or later developed; all such designs and types are intended to fall within the scope of the present inventions.

With continued reference to FIG. 6D, in the exemplary embodiment, fuel cell 38d includes an active fluid interface 42 and an active power management interface 46, each of which are in communication with the corresponding portion of module bay interface 16 of integration plane 12. As such, in this exemplary embodiment, electrical interface 44 is inactive and is therefore illustrated with a termination.

With reference to FIG. 6E, technology module may be power management module 38e which, in response to unconditioned and/or unregulated electrical power provided on at power management interface 46, generates conditioned and/or regulated electrical power on electrical interface 44. The power management module 38e includes power conditioning circuitry to provide a conditioned and/or regulated electrical power. In the exemplary embodiment, power management module 38e includes an active electrical interface 44 and power management interface 46 in order to provide communication with electrical interface 22 and power management interface 26 of module bay interface 16 of integration plane 12. In this embodiment, fluid interface 42 of power management module 38e is inactive and, as such, has no components connected to fluid bus 20 of integration plane 12.

In another exemplary embodiment, fluid bus 20 may be employed by power management module 38e (and/or other modules 38) for other uses, for example, to provide or implement temperature control, adjustment and/or management techniques. In this regard, power management module 38e (and/or other modules 38) may include a fluid (for example, water or other coolant) based temperature adjustment and/or management techniques to adjust, control and/or maintain the temperature of the power management module 38e (and/or other modules 38) or portion(s) thereof. Any temperature control, adjustment and/or management technique, and apparatus to implement such technique, whether now known or later developed, is/are intended to fall within the scope of the present inventions.

The power management module 38e may employ a conventional circuitry and/or design. Notably, all circuitry, designs and/or types of power conditioning circuitry, whether now known or later developed, are intended to fall within the scope of the present inventions.

Figure 6F:
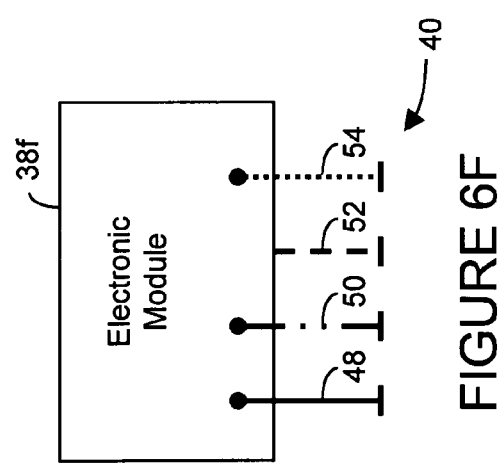
FIG. 6F is a block diagram representation of an exemplary electrical/electronics module including an interface to communicate with the electrical interface of a module bay of the integration plane (notably, in this exemplary embodiment, the fluid and power management interfaces are terminated)
Figure 6H:
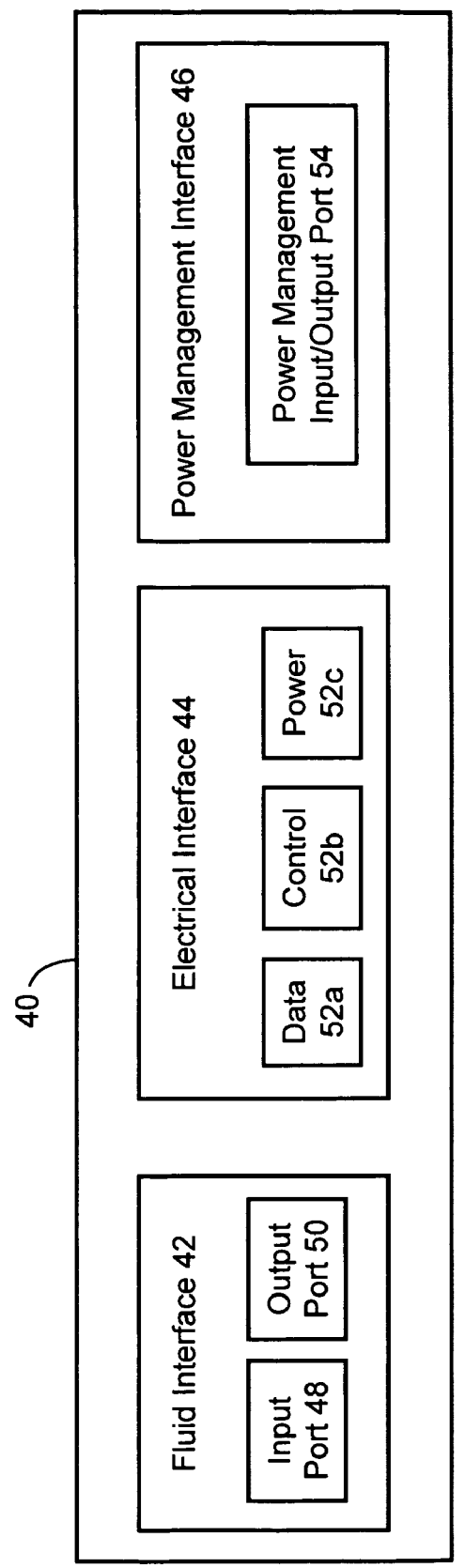
FIG. 6H is a block diagram representation of an embodiment of the interface of a technology module wherein the interface includes connectors for the fluid interface, power management interface and electrical interface.

With reference to FIG. 6F, technology module may be electronics or electrical module 38f (hereinafter collectively "electronic module 38f") which is representative of any electronic or electrical devices. For example, the electronic or electrical devices may provide for mobile communications (for example, phones and/or modems), and/or may include controller circuitry, data processor circuitry, and/or may provide for monitoring or surveillance device (for example, an imaging sensing device (for example, camera) and/or audio sensing device). In the exemplary embodiment, electronic module 38f includes interface 40 that provides communication with electrical interface 22 (and electrical bus 24) of module bay interface 16 of integration plane 12. As such, in this exemplary embodiment, fluid interface 42 and power management interface 46 are not active connections and are therefore illustrated with terminations. Notably, as mentioned above, electronic module 38f may be any type of electronic or electrical device that interfaces with at least one portion of the electrical bus 24 of integration plane 12.

In certain embodiments, electronic module 38f may function as a system controller and configure, manage and/or control integration plane 12 (and/or the modules connected thereto), and configure, manage and/or control the outputs, functions and/or operations of integration plane 12 (and/or modules 38 connected thereto). In this embodiment, electronic module 38f may receive data and/or communicate (directly or indirectly) with modules 38 connected to integration plane 12 and receive data which is representative of the type, requirement(s), capability(ies) and/or characteristic(s) of technology modules 38 connected to integration plane 12. The electronic module 38f may, based on the type, needs, requirements, capabilities and/or characteristics of the one or more modules 38 coupled or connected to integration plane 12, assess, determine and/or control (among other things) the functions, operations and/or outputs of modules 38.

For example, in one embodiment, the type, characteristics and/or amount power available for modules 38 may be configured, controlled and/or managed by electronic module 38f in order to, for example, accommodate one or more technology modules 38. Further, electronic module 38f may, based on the type, capabilities and/or characteristics of the one or more modules 38 coupled or connected to integration plane 12, configure one or more technology modules 38, for example, to be available and operative in the event one or more technology modules becomes inoperative (due to a failure or removal from integration plane 12). In this regard, electronic module 38f configures system 10 for redundancy. The configuration, control and/or management operations or functions performed by electronics module 38f are discussed in detail below.

Notably, electronic module 38f may also include a user or an operator interface that allows user interaction/programming as well as customization of system 10 related to, for example, operation of one or more modules 38, and/or redundancy in and reliability of system 10. In addition, electronic module 38f may include an audio or visual interface to facilitate communication of information pertaining to one or more modules 38 and/or the operation/status thereof or of integration plane 12 to a user or an operator. In this way, the user or operator may, among other things, have easy access to any data provided by and/or to system 10.

As mentioned above with respect to power management module 38e, electronics modules 38f may employ fluid bus to provide or implement temperature control, adjustment and/or management techniques. In this regard, electronics modules 38f may be include a fluid (for example, water or chemical coolant) based temperature adjustment and/or management techniques to adjust, control and/or maintain the temperature of the power management module 38e (and/or other modules 38) or portion(s) thereof. Any temperature control, adjustment and/or management technique, and apparatus to implement such technique, whether now known or later developed, is/are intended to fall within the scope of the present inventions.

It should be noted that technology module 38 may include a resident or "local" interface control circuitry to coordinate communication with and facilitate integration within the buses of integration plane 12. In this regard, in addition to or in lieu of a system controller (whether resident or not) for integration plane 12, each technology module 38 may include "local" interface control circuitry to coordinate with the "local" interface control circuitry of other technology modules 38 and/or a system controller (whether resident or not) of integration plane 12 to facilitate orderly communication with one or more of the buses of integration plane 12. For example, fuel cartridge module 38b, power management module 38e, a first electronic module 38f, and a second electronic module 38f may each include "local" interface control circuitry, coupled to the electrical interface of its respective module, to provide coordinated communication on electrical bus 24. In this way, the interface and/or control architectures are quite flexible. In short, any and all interface and/or control architectures of such interfaces and buses, whether now known or later developed, are intended to come within the scope of the present invention.

The layout of technology module interface 40, and the types of interfacing and connection techniques, structures and/or mechanisms of fluid interface 42, electrical interface 44, and power management interface 46, may be any form, type layout, structure, mechanism and/or configuration now known or later developed. It may be advantageous, however, that technology module interface 40 employ a uniform, common or standard layout, and employ uniform, common or standard interfacing techniques, structures and/or mechanisms to enhance the flexibility of module 38 relative to populating any module bay 14 having a reciprocal or "mating" interface. In this regard, where the layout of technology module interface 40 and the types of interfacing techniques, structures and/or mechanisms are uniform, standardized or common, technology module 38 may engage and/or communicate with a plurality of the module bays 14. Indeed, any type of technology module 38 having such features may receive, engage and communicate with any module bay 14 including a reciprocal or "mating" interface. For example, technology module interface 40 may employ any of the fluid, electrical and/or mechanical interfaces embodiments described and illustrated in "Fuel Cell Power and Management System, and Technique for Controlling and/or Operating Same", filed on Jan. 14, 2005 and assigned Ser. No. 11/036,240.

With reference to FIGS. 5 and 6A-6G, in one embodiment, fluid interface 42 includes a plurality of ports, including input port 48 and output/exhaust port 50. As mentioned above, fluid interface 42 may employ any type, structure and/or mechanism of connector including quick connect/release mechanisms or screw-on type. Notably, fluid interface 42 may include more than one input port and/or output port to accommodate, for example, more than one fluid source. The fluid interface may employ any type, structure and/or mechanism, whether now known or later developed.

The electrical interface 44 may be wired, wireless and/or optical transmission techniques to provide communication between technology module 38 and electrical interface 22 of module bay 14. The electrical interface 44 may include one or more wired, wireless or optical "connectors" to mate with connectors 34a-c of interface 22 of module bay 14 to provide an electrical power portion, a control portion and/or a data portion, respectively, to one or more module bays 14. As suggested above with respect to interface 22 of module bay 14, the connectors may be an electrical connector that includes signal, power and ground pins or contacts, where signals are transmitted using proprietary or non-proprietary protocols. The connectors may also be an optical connector (for example, an optical transmitter/receiver) that communicates signals using well-known techniques and protocols. Moreover, connectors may be a wireless connector that also communications signals using well-known techniques and protocols. The discussion above with respect to connectors 34a-c of interface 22 of module bay 14 is applicable to the connectors of interface 44 and for the sake of brevity will not be repeated. Notably, however, all forms, techniques and/or types of electrical connectors, whether now known or later developed, are intended to fall within the scope of the present inventions.

With continued reference to FIGS. 5 and 6A-6G, power management interface 46, in one embodiment, includes input/output connector which, for example, provides unconditioned and/or unregulated electrical power (for example, from fuel cell module 38d) or receives unconditioned and/or unregulated electrical power (for example, from power management module 38e) connected to input/output connector 36. Notably, power management interface 46 may include more than one input/output port to facilitate input/output of more than one source of unconditioned and/or unregulated electrical power. All types of connectors for power management interface 46, whether now known or later developed, are intended to fall within the scope of the present inventions. For example, as mentioned above with respect to interface 24 of module bay 14, power management interface 46 may employ a quick connect/release mechanism to facilitate rapid connection of a fuel cell module 38d, power unit module 38a and/or power management module 38e to the power management bus 26 of integration plane 12. Also, as mentioned above with respect to interface 24 of module bay 14, input/output connector may be provided as two separate connectors, for example, input connector and output connector. (See, for example, FIG. 4B).

With reference to FIGS. 7A-7D, in one embodiment, modular fuel cell power system 10 includes integration plane 12 having a plurality of module bays 14a-x, each having a uniform, standard or common interface 16 which is connected to corresponding portions of fluid bus 20, electrical bus 24 and power management bus 28. The modular fuel cell power system 10 further includes fuel container/tank module 38c, fuel cell module 38d, power management module 38e and electronic module 38f which are disposed in a corresponding module bay 14 of integration plane 12. Each module 38c-38f includes module interface 40 having a reciprocal or "mating" interface relative to module bay interface 16. Notably, in this embodiment, fuel container/tank module 38c, fuel cell module 38d, power management module 38e and electronic module 38f could populate any one of the module bays 14a-x.

In operation, fuel container/tank module 38c is connected to fuel cell module 38d via fluid bus 20. In this way, fuel cell module 38d generates electrical power using the fuel contained in and provided by fuel container/tank module 38c. The electrical power is provided on power management bus 28 to power management module 38e which, in response, generates conditioned and/or regulated electrical power. The power management module 38e supplies that electrical power on the power portion of electrical bus 24. The electronic module 38f employs the conditioned and/or regulated electrical power to operate the electronics and/or electrical circuitry contained therein.

Figure 7A:
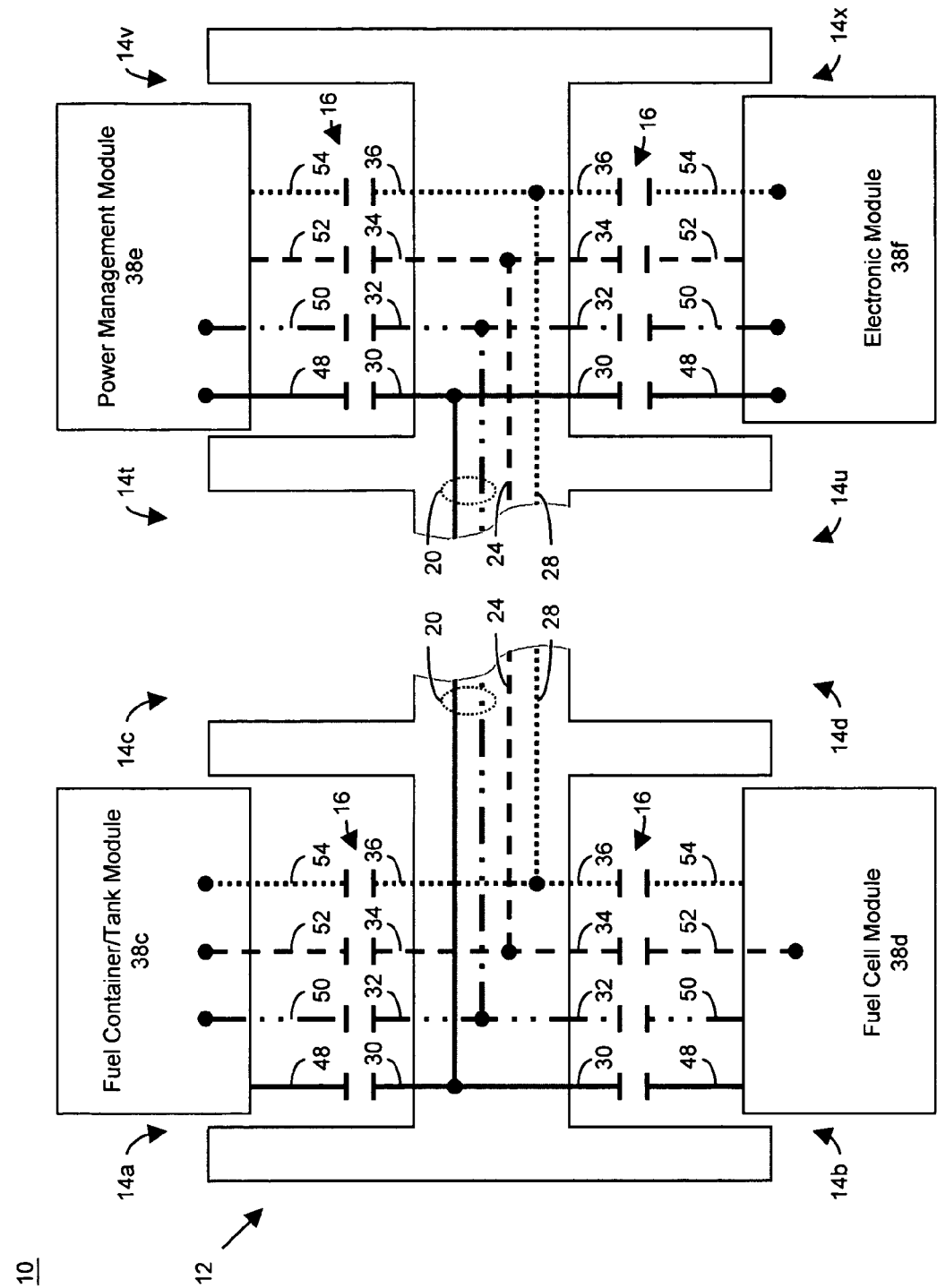
FIG. 7A is a block diagram representation of an exemplary fuel cell system including an integration plane, having a plurality of module bays, and a plurality of technology modules populating the module bays, according to an embodiment of an aspect of the present inventions.
Figure 8A:
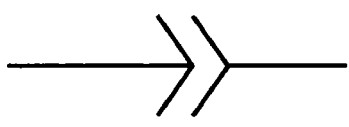
FIGS. 8A-8C illustrate fluid or electrical connection at the interface/connection of the integration plane and technology module including unidirectional (FIGS. 8A and 8B) and bidirectional (FIG. 8C)
Figure 8B:
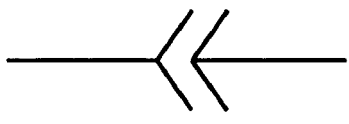
Figure 8C:
Figure 8D:
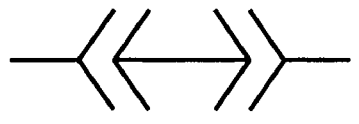
FIG. 8D illustrates fluid or electrical flow at the interface/connection of the integration plane and technology module regardless of the manner or direction of fluid flow or electrical signal/current flow; accordingly.

With continued reference to FIG. 7A, the characteristics (for example, ratings) of fuel container/tank module 38c, fuel cell module 38d, power management module 38e and electronic module 38f may be selected to accommodate a given environment, constraints and/or objectives of system 10 and/or one or more of the modules 38. For example, modules 38c-f may be selected such that fuel cell module 38d is a hydrogen based fuel cell that provides 30 W, and fuel container/tank module 38c stores hydrogen and includes a capacity of 300 Whrs. The power management module 38e may be designed to provide 24 VDC output. In this way, modular fuel cell power system 10 provides the following specifications:

| | |
|---|---|
| Power continuous | 30 W |
| Power peak | 230 W for 1 minute |
| Runtime at continuous power | 10 hours |
| Voltage of output | 24 VDC |

Where, for example, another fuel cell module 38d is added to system 10 (for example, in module bay 14c) or fuel cell module 38d is rated higher (i.e., provides more electrical power), modular fuel cell power system 10 may provide the following specifications:

| | |
|---|---|
| Power continuous | 60 W |
| Power peak | 260 W for 1 minute |
| Runtime at continuous power | 5 hours |
| Voltage of output | 24 VDC |

Notably, modular fuel cell power system 10 may include technology modules 38 that are "hot swappable". In this regard, technology module 38 may be added or removed from module bay 14 during operation of system 10 (or without interruption to the operation of system 10) thereby allowing "on the go" changes to the characteristics and/or configuration of modular fuel cell power system 10.

Figure 9A:
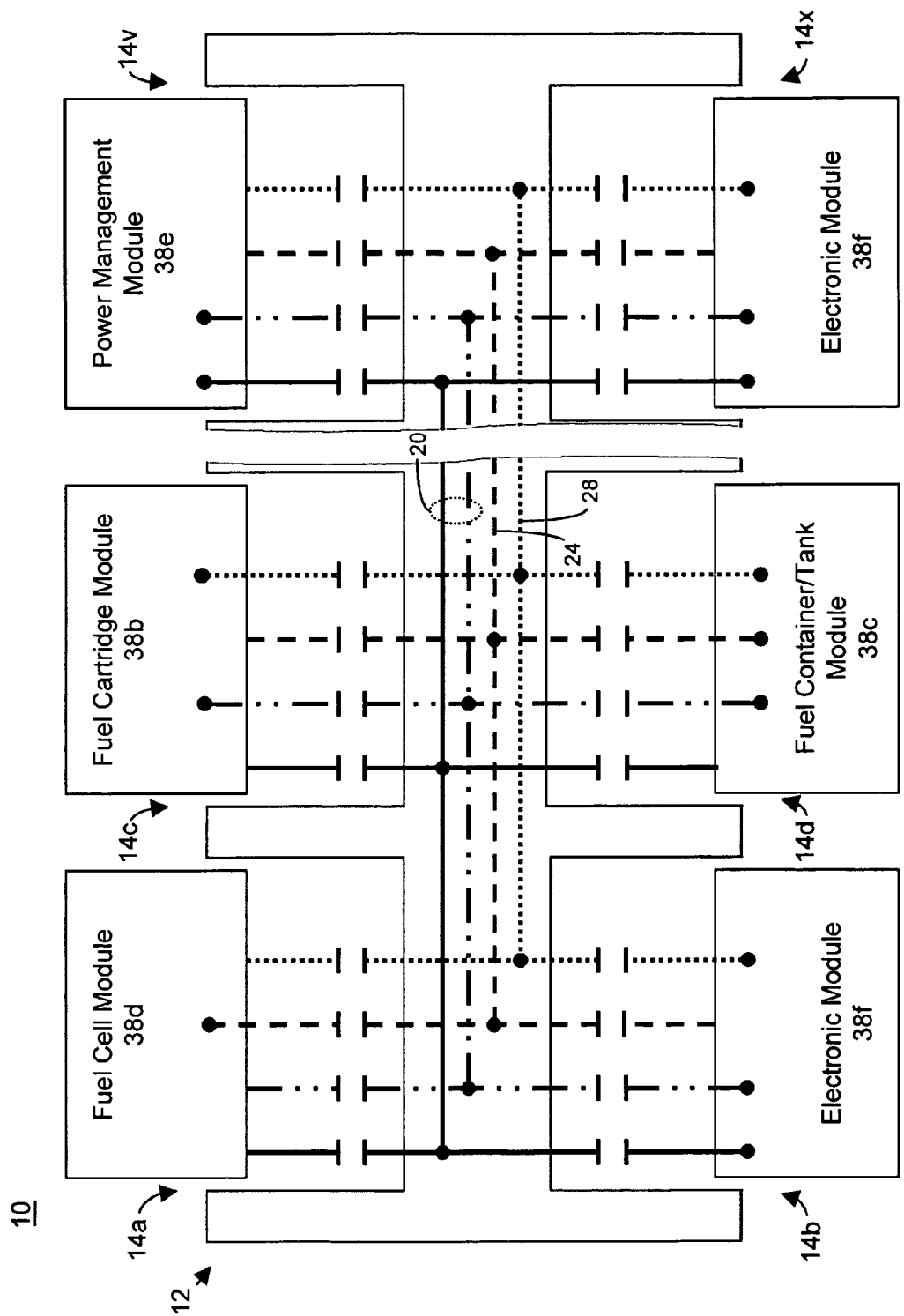
FIGS. 9A and 9B are block diagram representations of exemplary fuel cell systems including an integration plane, having a plurality of module bays, and a plurality of technology modules populating the module bays wherein the system includes modules that provide one or more of the same (or substantially the same) functions and/or provide a form of redundancy, according to exemplary embodiments of an aspect of the present inventions.
Figure 9B:
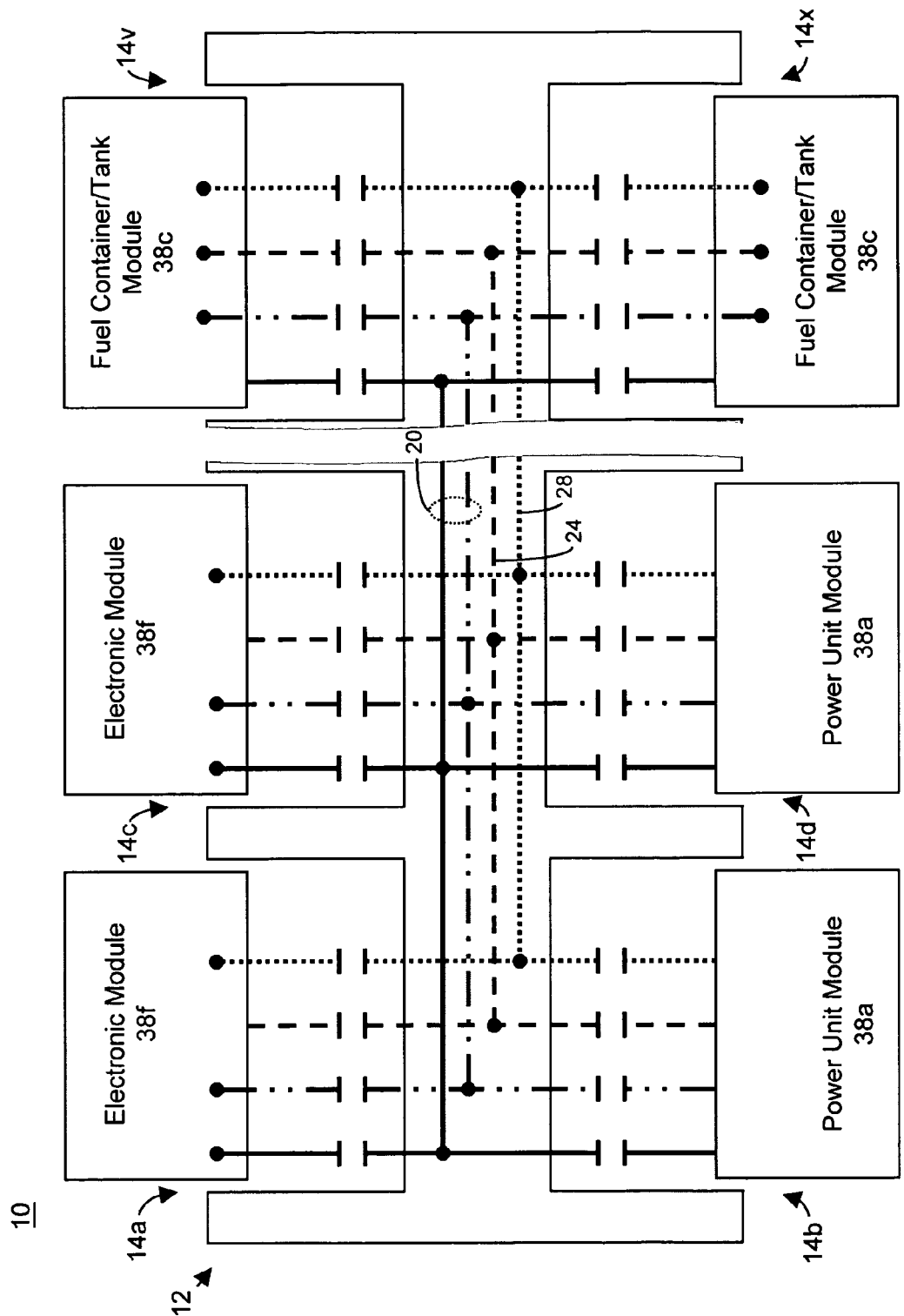
Figure 10:
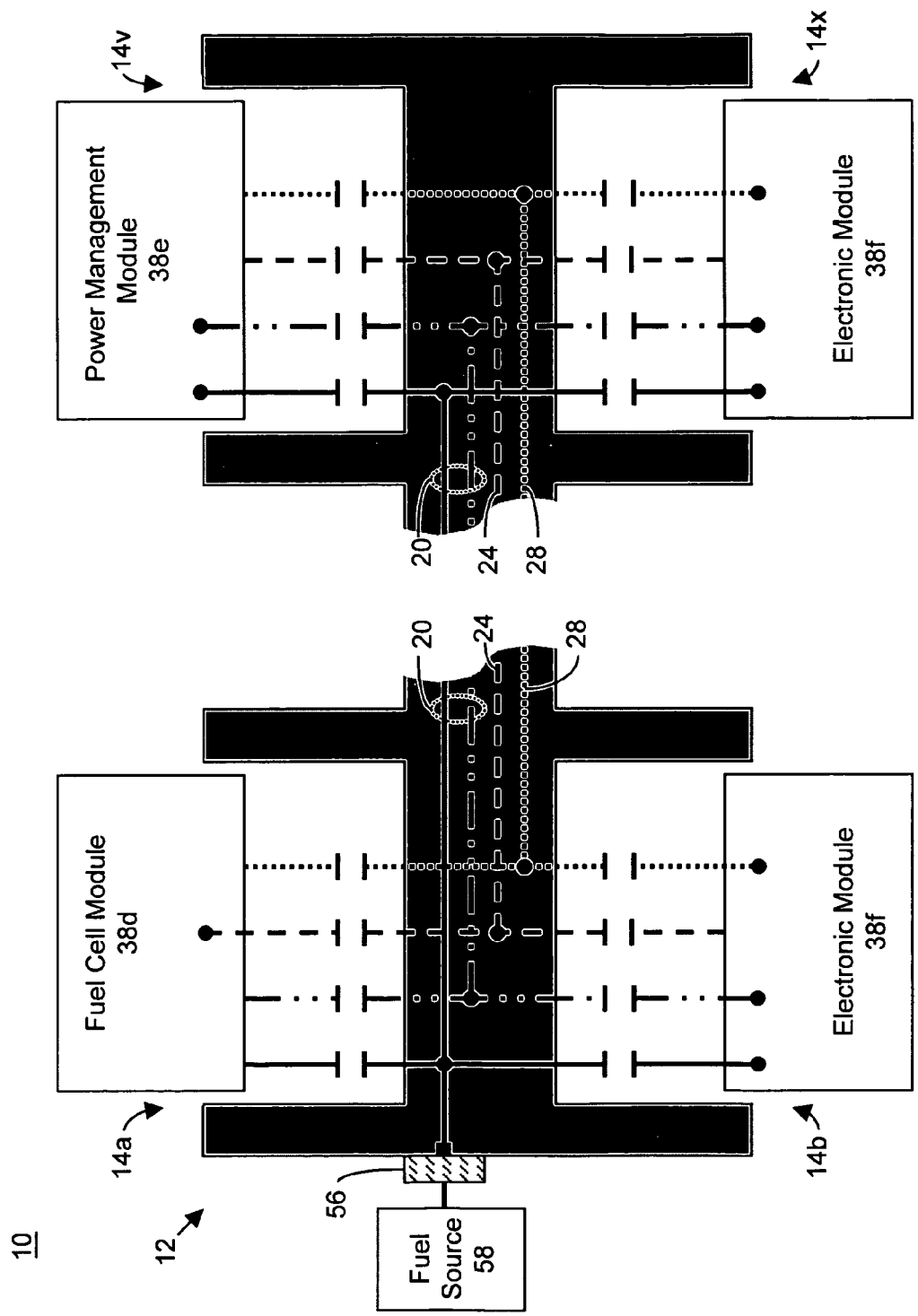
FIGS. 10-15 are block diagram representations of exemplary fuel cell systems including an integration plane, a plurality of technology modules populating the plurality of module bays of the integration plane, and an external connector that provides communication to one or more of the fluid, electrical and/or power management buses, according to exemplary embodiments of an aspect of the present inventions.
Figure 11:
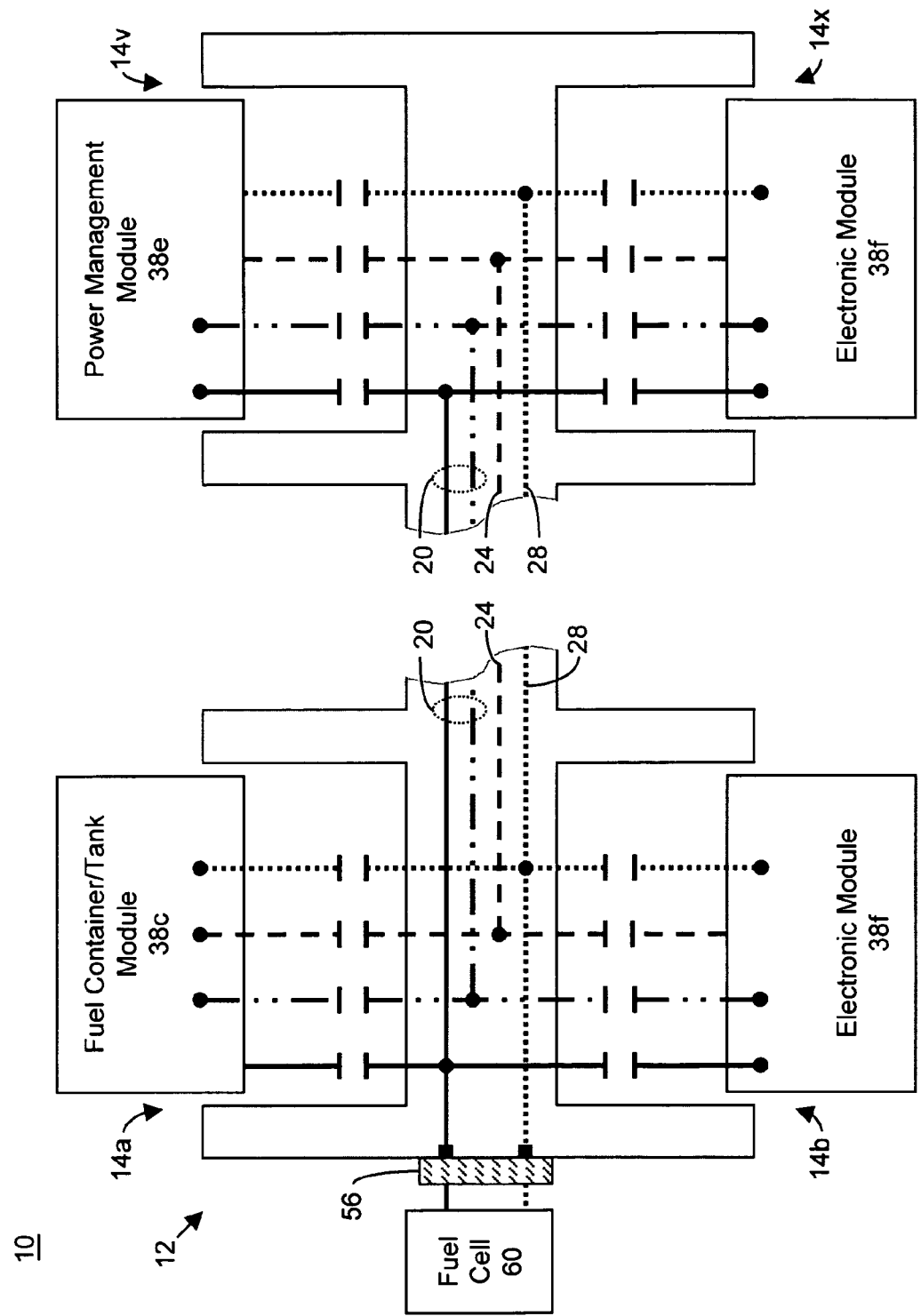
Figure 12:
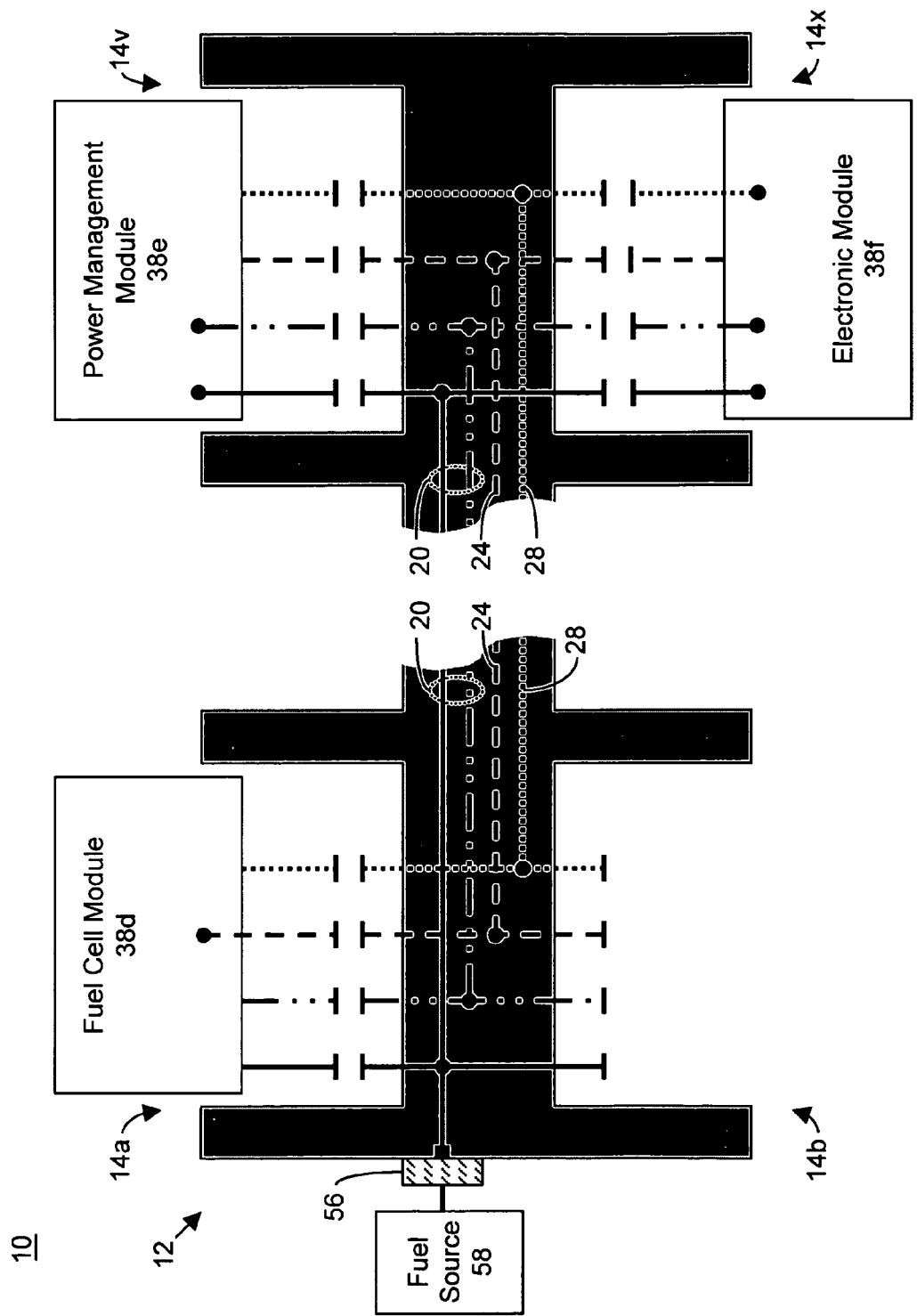

In one embodiment, modular fuel cell power system 10 may include technology modules 38 that perform at least one function that is the same or substantially the same. With reference to FIGS. 9A and 9B, in one exemplary embodiment, system 10 includes at least two technology modules that perform at least one function that is the same or substantially the same and/or provide a form of redundancy (in the event one or more modules become inoperative or are removed from integration plane 12). In the exemplary embodiment of FIG. 9A, fuel cartridge module 38b (disposed in module bay 14c) and fuel container/tank module 38c (disposed in module bay 14d) each supply fuel to fuel cell 38d via fluid bus 20.

In the exemplary embodiment of FIG. 9B, power unit module 38a, which is disposed in module bay 14b, performs the same function as power unit module 38a, which is disposed in module bay 14d. Under these circumstances, power unit modules 38a may provide for redundancy in the event that one of the power unit modules becomes inoperative or is removed. The power unit modules 38a may also provide a plurality of independently generated voltages/currents on power lines of electrical bus 24 of integration plane 12. In this regard, for example, electronic module 38f, disposed in module bay 14a, may require or employ different power characteristics from the power characteristics required or employed by electronic module 38f, disposed in module bay 14c.

The modular fuel cell power system 10 may include one or more external connectors to facilitate connection of one or more non-module technologies to the buses of the integration plane. With reference to FIGS. 10-15, in one exemplary embodiment, external connector 56 may provide communication between an external non-module technology and fluid bus 20, electrical bus 24, and/or power management bus 28. For example, modular fuel cell power system 10 may include external connector 56 that facilitates connection of fuel source 58 (for example, an external primary or a secondary compressed fuel source, for example, a "K" bottle size tank, a reformer, metal hydride cartridge, and/or an electrolyzer) to fluid bus 20 of integration plane 12. (See, for example, FIGS. 10, 12 and 14).

Figure 13:
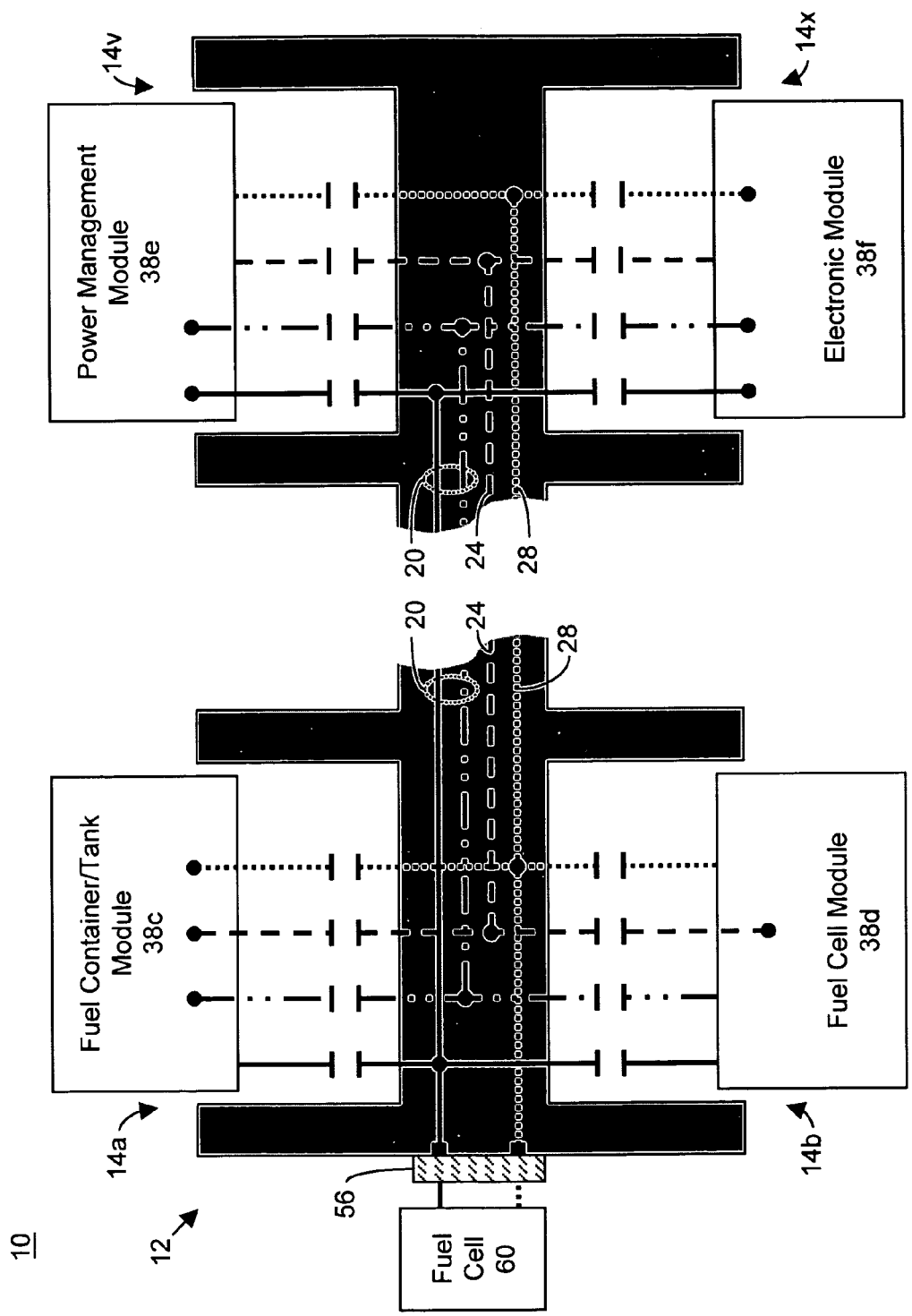
Figure 14:
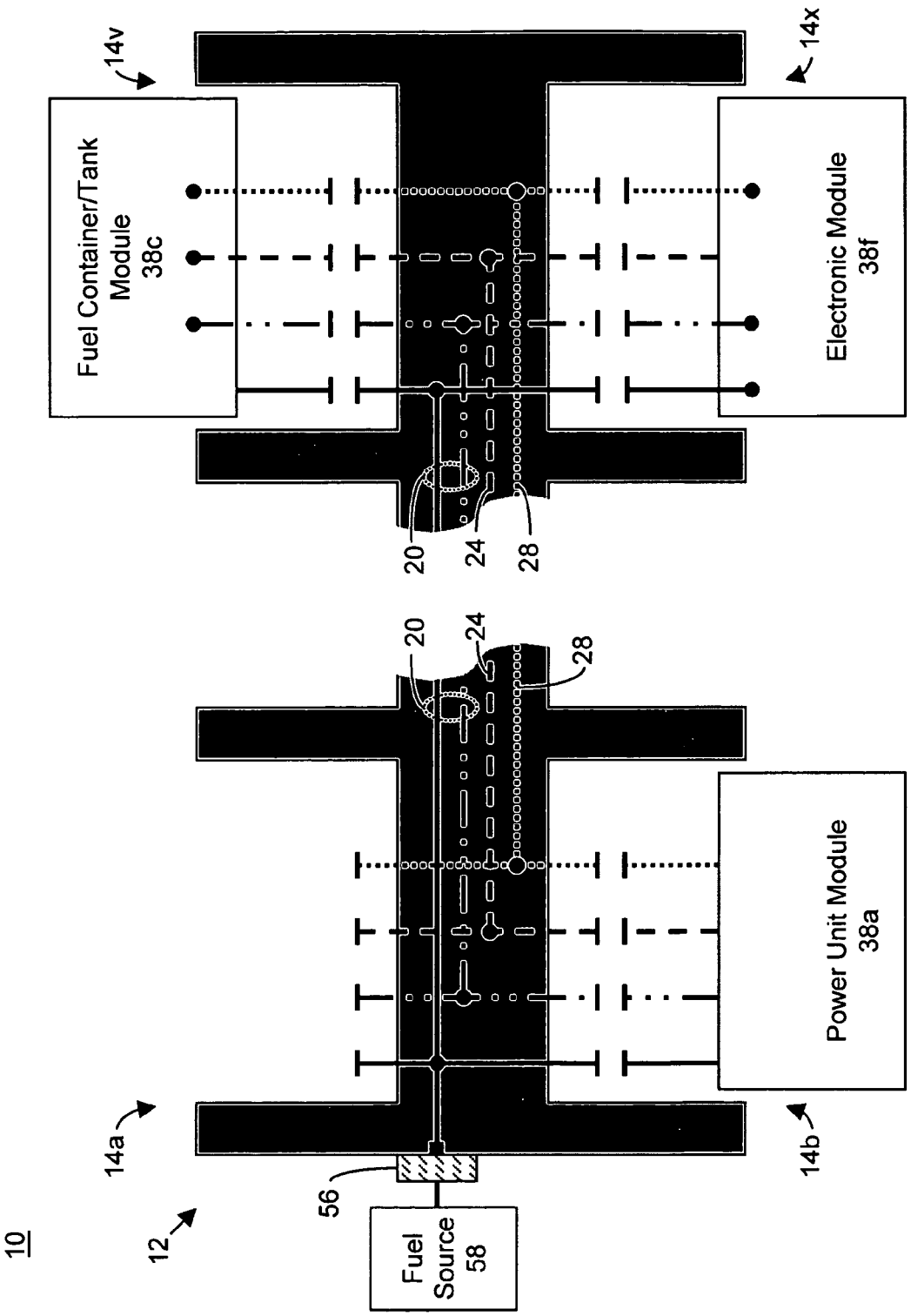
Figure 15:
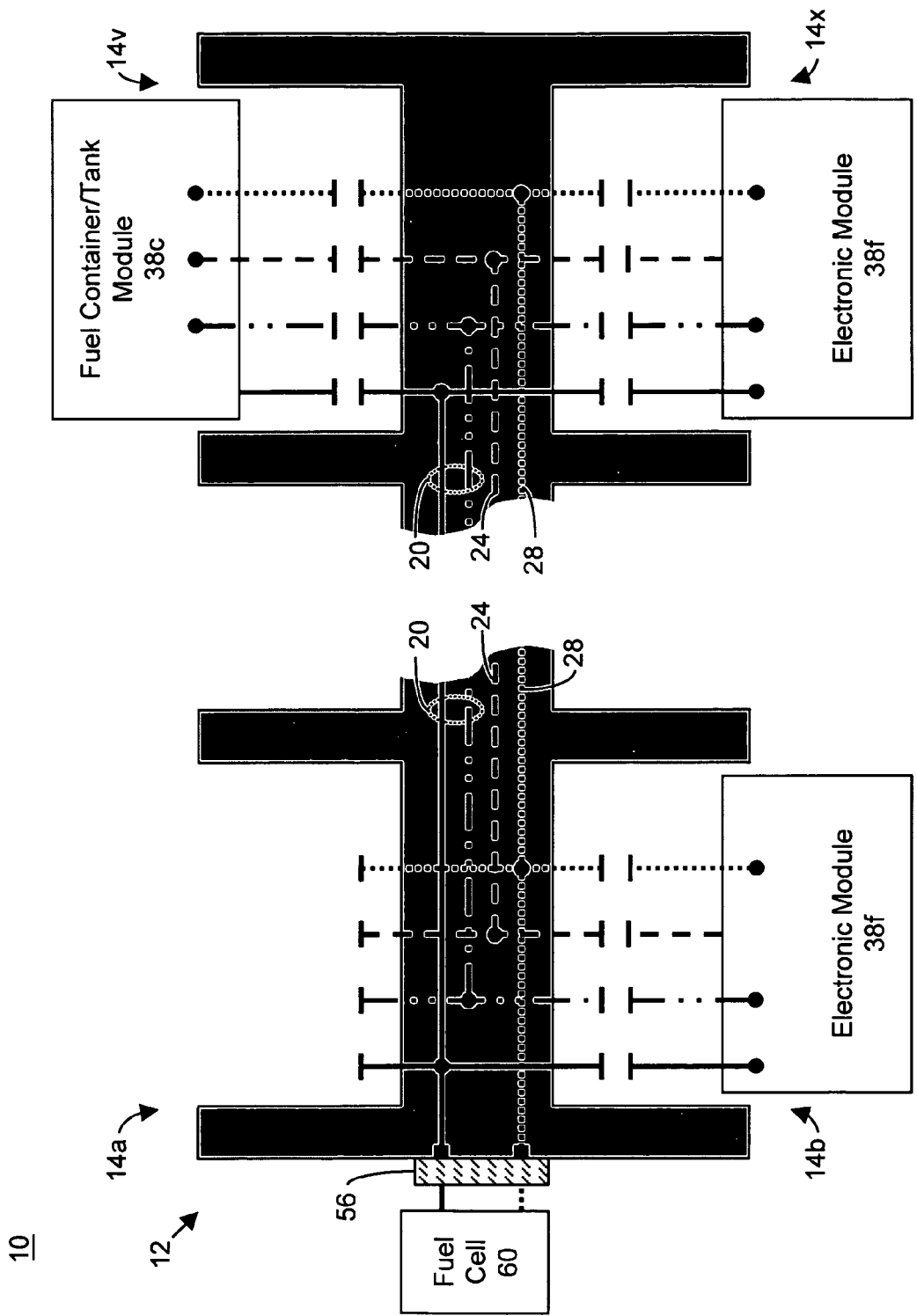

In another embodiment, external connector 56 provides connection of fuel cell 60 to fluid bus 20 and power management bus 28 of integration plane 12. (See, for example, FIGS. 11, 13 and 15). In this regard, fuel cell 60 may be a primary electrical generation unit (FIGS. 11 and 15), and/or a secondary electrical generation unit or redundant electrical generation unit (FIG. 13).

Figure 16:
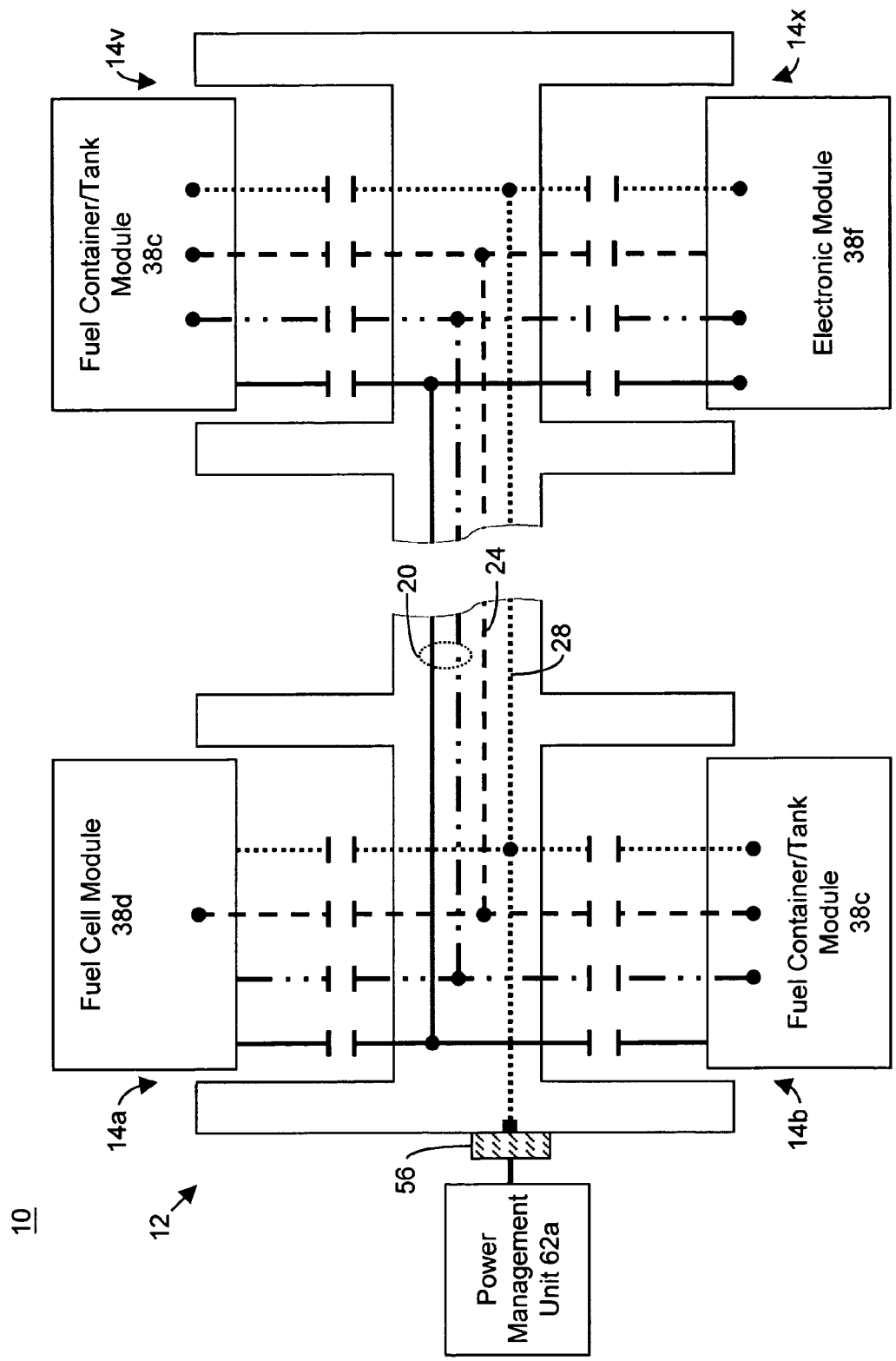
FIGS. 16 and 17 are block diagram representations of exemplary fuel cell systems including an integration plane, a plurality of technology modules populating the plurality of module bays of the integration plane, and an external connector to facilitate communication with an external power management unit (FIG. 16) and an external processor (FIG. 17) and interconnection therewith to one or more of the fluid, electrical and/or power management buses, according to exemplary embodiments of an aspect of the present inventions.

With reference to FIG. 16, in yet another embodiment, integration plane 12 includes external connector 56 that provides connection to external power management unit 62a. In this embodiment, external power management unit 62a may receive unconditioned and/or unregulated electrical power from fuel cell module 38d and provide conditioned and/or regulated power to the other technology modules 38 (for example, electronic modules 38f) disposed in module bays 14 of integration plane 12. The resident power management unit 62b may be a primary power management unit that provides suitable electrical power to, for example, electronic modules that are connected to the power lines of electrical bus 24 or a secondary or redundant power management unit that is enabled in the event additional conditioning or regulating is necessary or desired and/or in the event of a failure in the primary power management unit.

Figure 17:
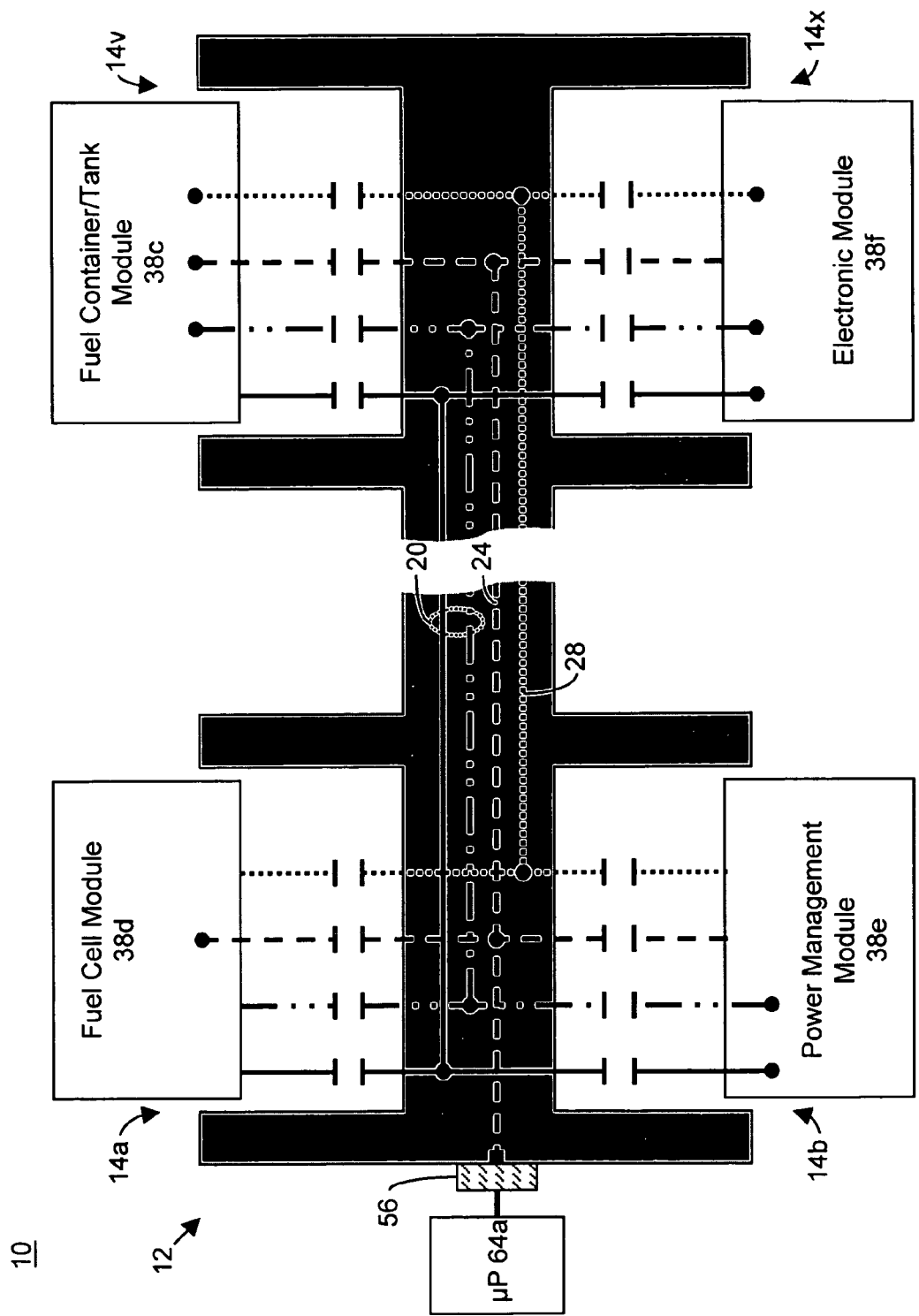

With reference to FIG. 17, integration plane 12 includes external connector 56 that provides connection to external processor 64a. In this embodiment, external processor 64a may facilitate orderly use of electrical bus 24, manage communication between a plurality of electronic modules 38f which are disposed in module bay(s) 14, and/or manage or control operations of integration plane 12 and/or one or more technology modules 38 disposed in modules bays 14.

Notably, external connector 56 may be employed as a "maintenance" port. In this regard, external connector 56 may facilitate continued use or operation of integration plane 12 while, for example, one or more modules 38 in bay(s) 14 are replaced, changed and/or repaired, by performing the operations/functions/purpose of such one or more modules 38. For example, an external fuel cell may be connected to external connector 56 (and operational within integration plane 12) while fuel cell module 38d, disposed in one of bays 14 of integration plane 12, is replaced, changed and/or repaired. The external fuel cell may (or may not) be, after replacement and/or repair of fuel cell module 38d, disconnected from external connector 56 and integration plane 12. Notably, such a "maintenance port" configuration/implementation may be employed in any embodiment having external connector 56.

Moreover, external connector 56 may be employed as a "supplemental" port for start-up and/or acceleration thereof. In this regard, external connector 56 may be employed to initialize and/or start-up various operations/functions of integration plane 12 while, for example, one or more modules 38 in bay(s) 14 are being initialized and/or powered-up. For example, an external fuel cell may be connected to external connector 56 (and operational within integration plane 12) while fuel cell module 38d, disposed in one of bays 14 of integration plane 12, is starting-up. Alternatively, an external power management unit may be connected to external connector 56 (and operational within integration plane 12) while power management unit 38e, disposed in one of bays 14 of integration plane 12, or power management unit 62b, is undergoing or performing starting-up. Indeed, one or more external battery power units may be connected to external connector 56 while the power source of integration plane 12 (for example, a fuel cell source or solar power source), is in start-up. Notably, such a "supplemental" port configuration/implementation may be employed in any embodiment having external connector 56.

With reference to FIGS. 18-22, in certain embodiments, integration plane 12 may include resident technology incorporated into or fixed on, or embedded on or in the integration plane, for example, resident power management unit, a resident system processor, controller or control system (having appropriate firmware), and/or resident fuel cell technology. The fluid bus, electrical bus and/or power management buses of the integration plane may be routed to and/or through the resident technology, thereby facilitating connection of the resident technology to the appropriate bus or busses.

Figure 18:
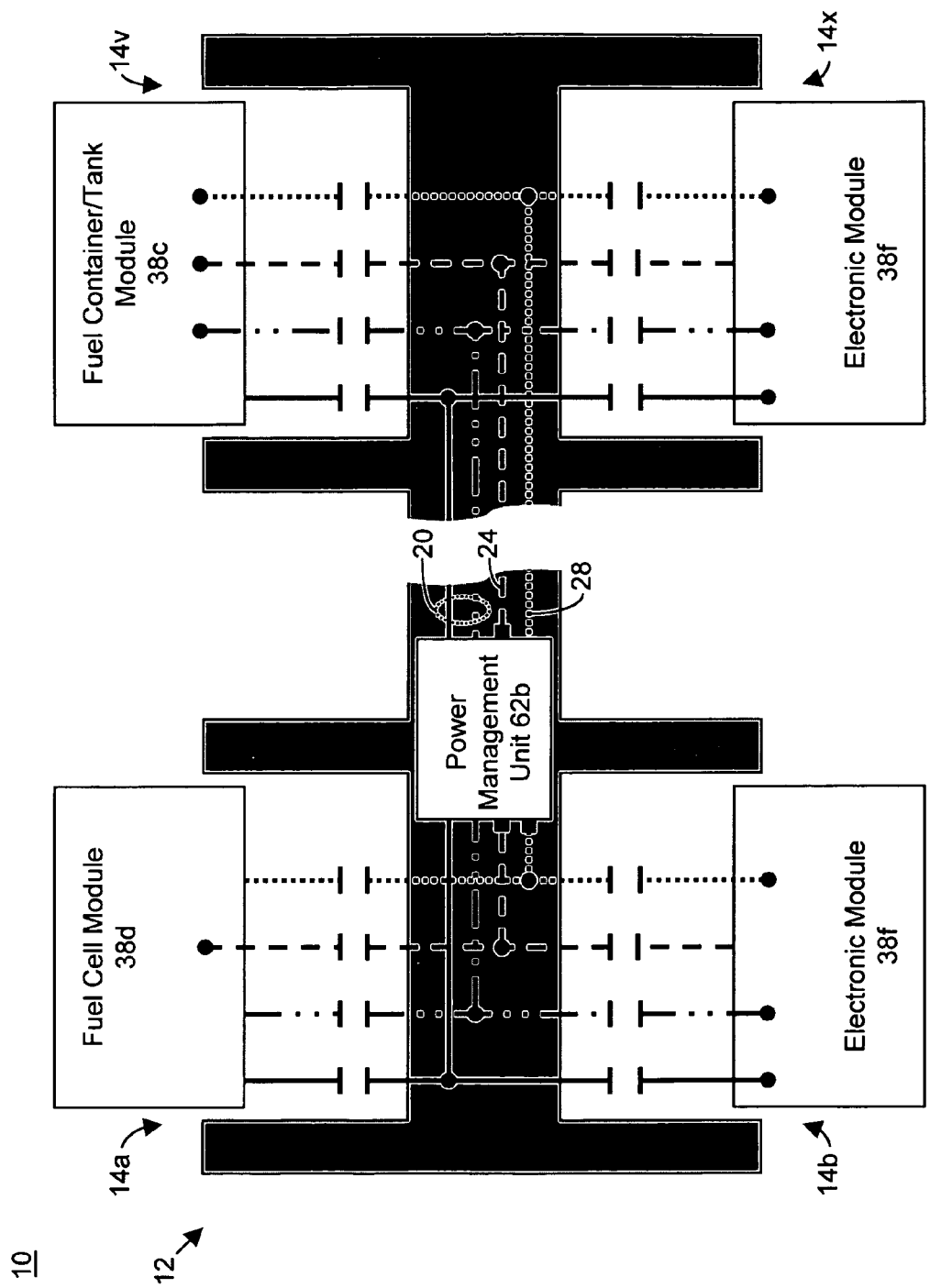
FIGS. 18 and 19 are block diagram representations of exemplary fuel cell systems including an integration plane, having a resident power management unit, and a plurality of technology modules populating the plurality of module bays of the integration plane, according to exemplary embodiments of an aspect of the present inventions.
Figure 19:
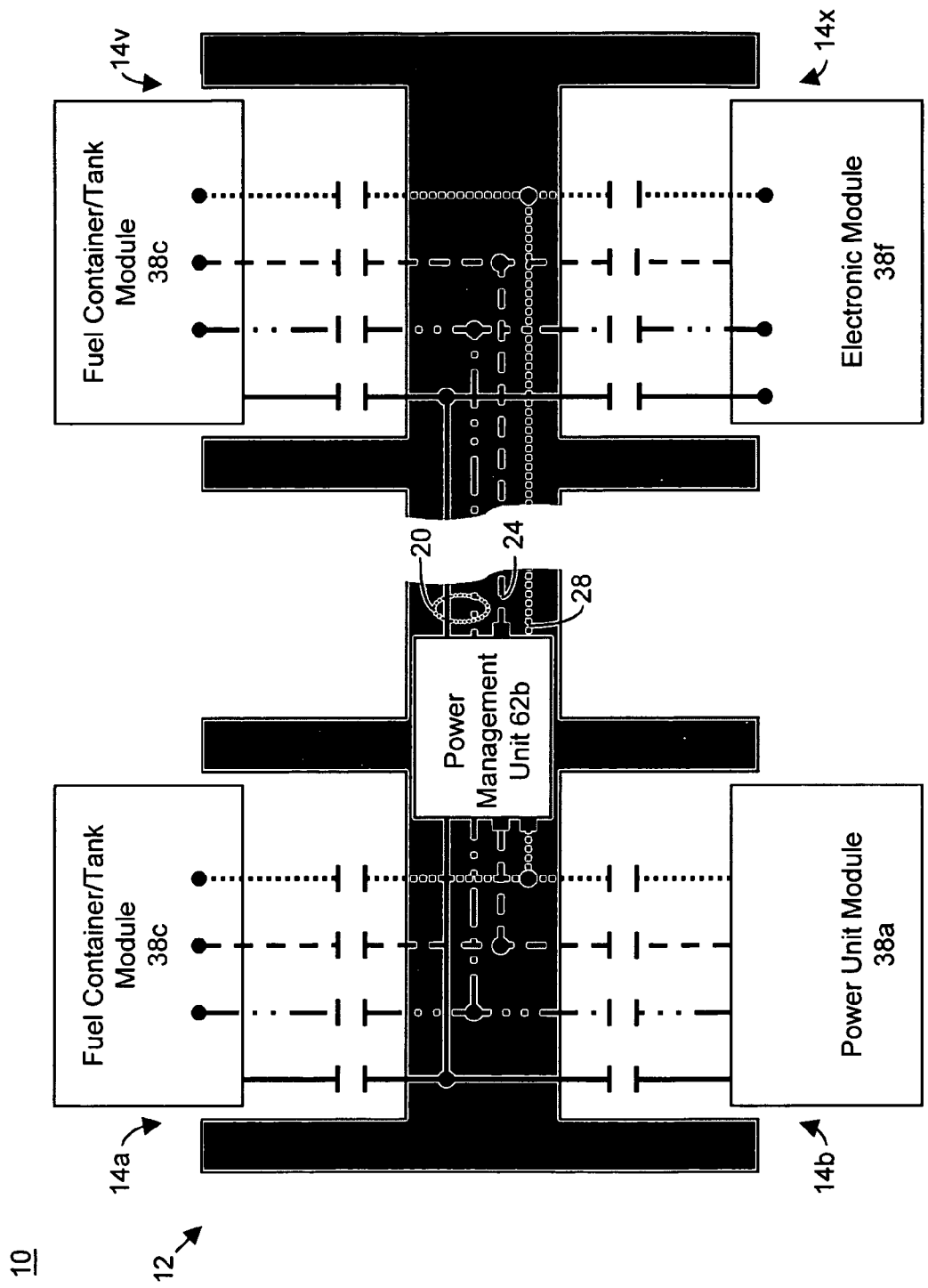

For example, with reference to FIGS. 18 and 19, integration plane 12 may include resident power management unit 62b that is attached to power management bus 28. In this embodiment, power management unit 62b may receive "raw" electrical power (for example, unconditioned and/or unregulated electrical power) from fuel cell module 38d and provide conditioned and/or regulated power to the other technology modules 38 (for example, electronic modules 38f) disposed in module bays 14 of integration plane 12. The resident power management unit 62b may be a primary power management unit that provides suitable electrical power to, for example, electronic modules that are connected to the power lines of electrical bus 24. (See, for example, FIG. 18). The resident power management unit 62b may be a secondary or redundant power management unit that is enabled in the event additional conditioning or regulating is necessary or desired and/or in the event of a failure in the primary power management unit (for example, power unit module 38 disposed in module bay 14b of FIG. 19).

Further, with reference to FIGS. 20A-20C and 21, integration plane 12 may include resident processor 64b that is secured to or in integration plane 12 and coupled to electrical bus 24 to, for example, manage and/or control the use of electrical bus 24 (for example, the data and/or control portion of electrical bus 24) by one or more electronic modules 38f that are disposed in module bay(s) 14 of integration plane 12. In this way, the resident system processor 64b may facilitate orderly use of electrical bus 24, manage communication between a plurality of electronic modules 38f which are disposed in module bay(s) 14, and/or manage or control operations of integration plane 12. In addition, resident processor 64b may manage and control the operations and/or functions of one or more technology modules 38 disposed in modules bays 14 of integration plane 12. For example, in one embodiment, resident processor 64b may control the operations of fuel cell module 38d and/or electronic module 38f (for example, an electronic module having wireless communication circuitry).

Figure 20A:
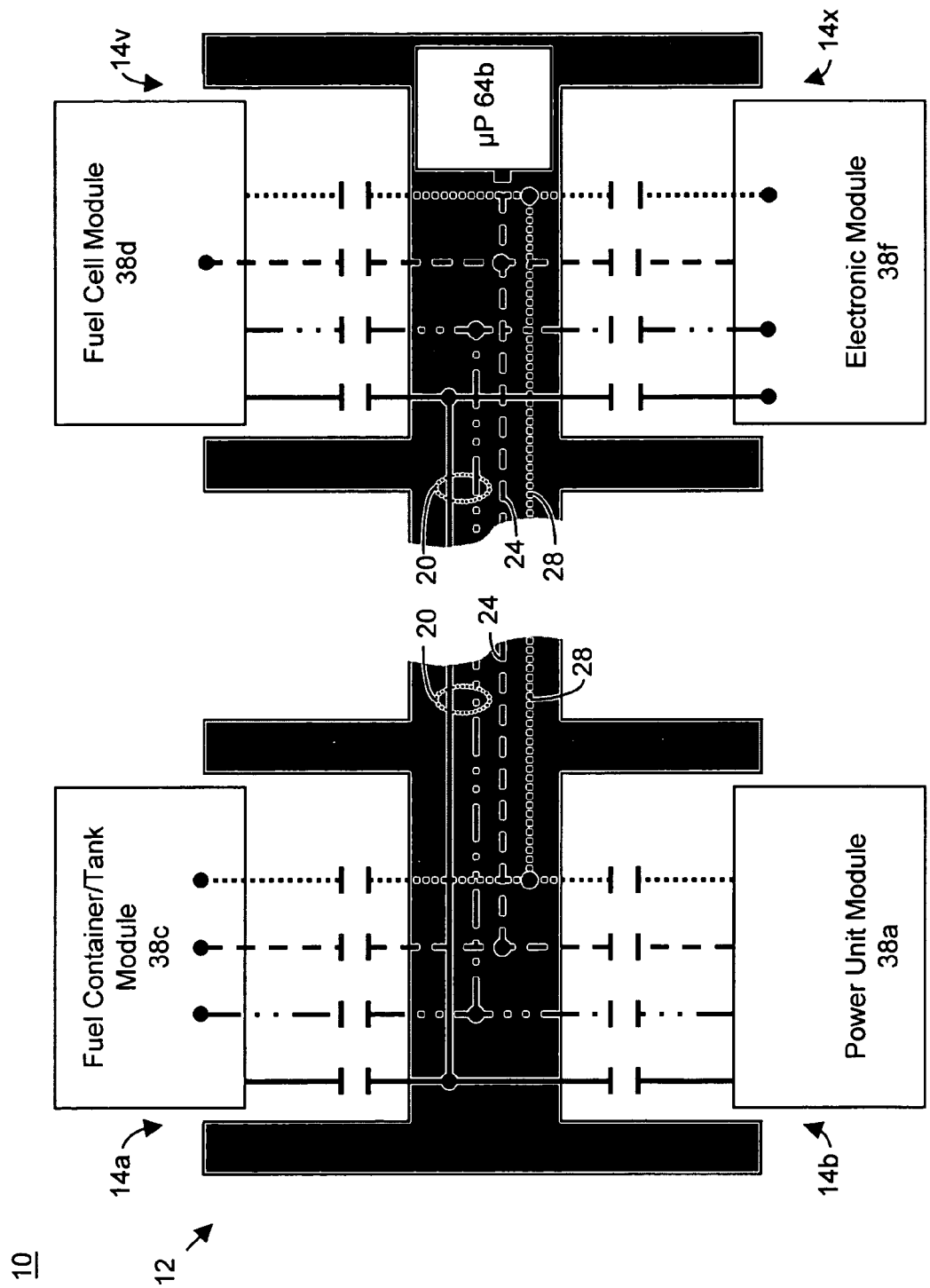
FIGS. 20A and 21 are block diagram representations of exemplary fuel cell systems including an integration plane, having a resident processor unit, and a plurality of technology modules populating the plurality of module bays of the integration plane, according to exemplary embodiments of an aspect of the present inventions.
Figure 20B:
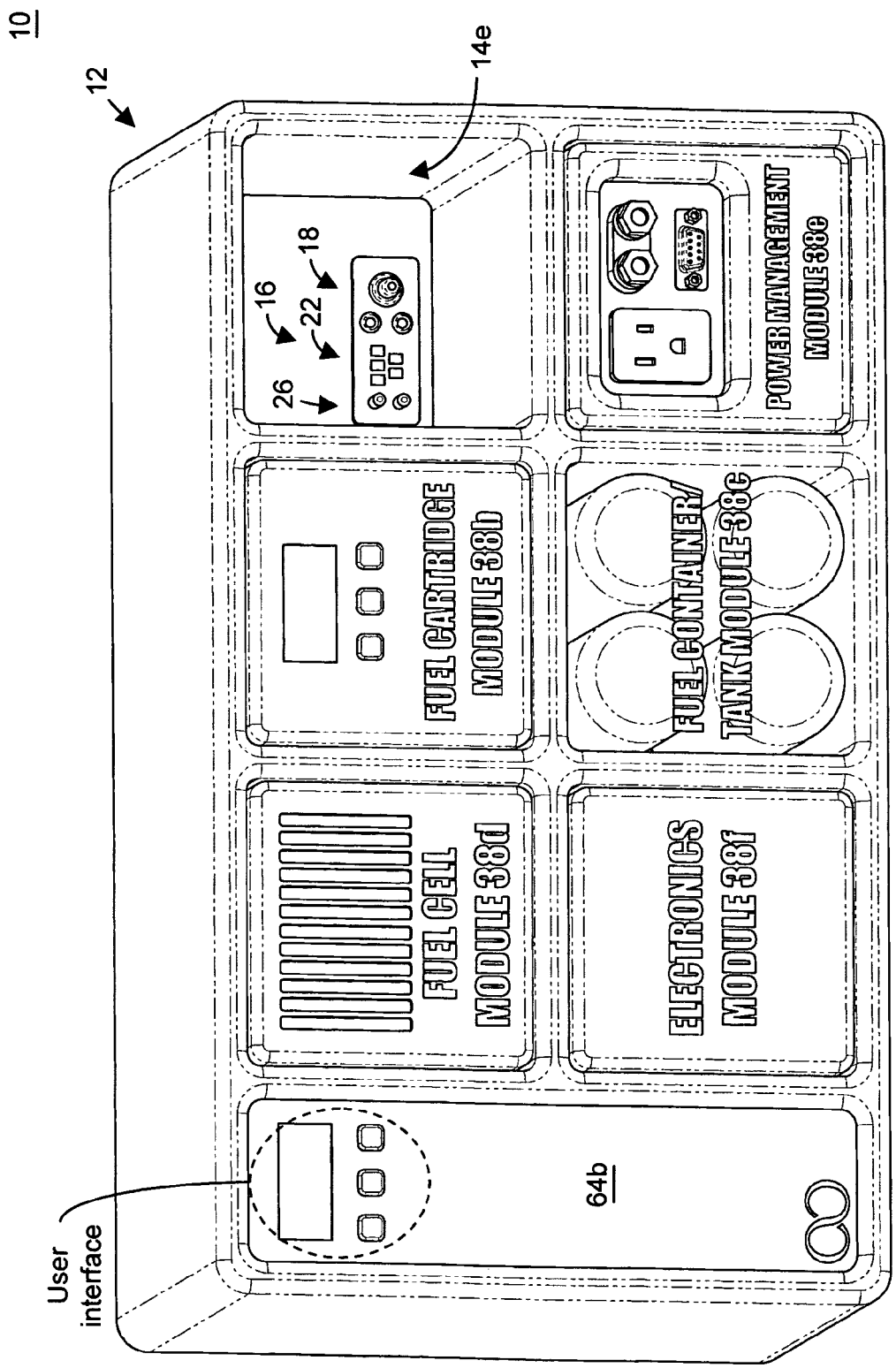
FIGS. 20B and 20C illustrate an exemplary system including an integration plane, having a resident processor unit, and a plurality of technology modules populating the module bays, according to an embodiment of an aspect of the present inventions.
Figure 20C:
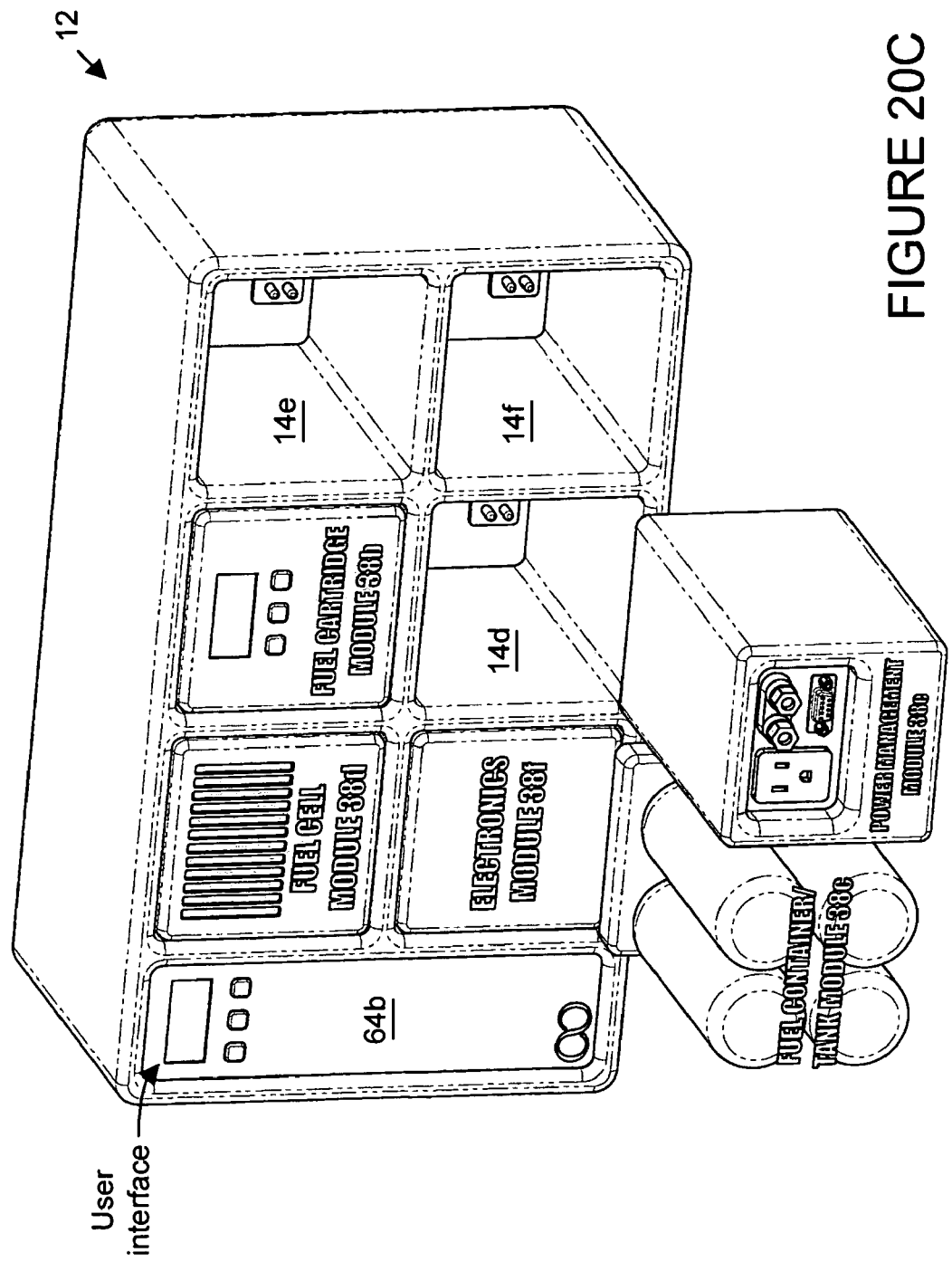
Figure 21:
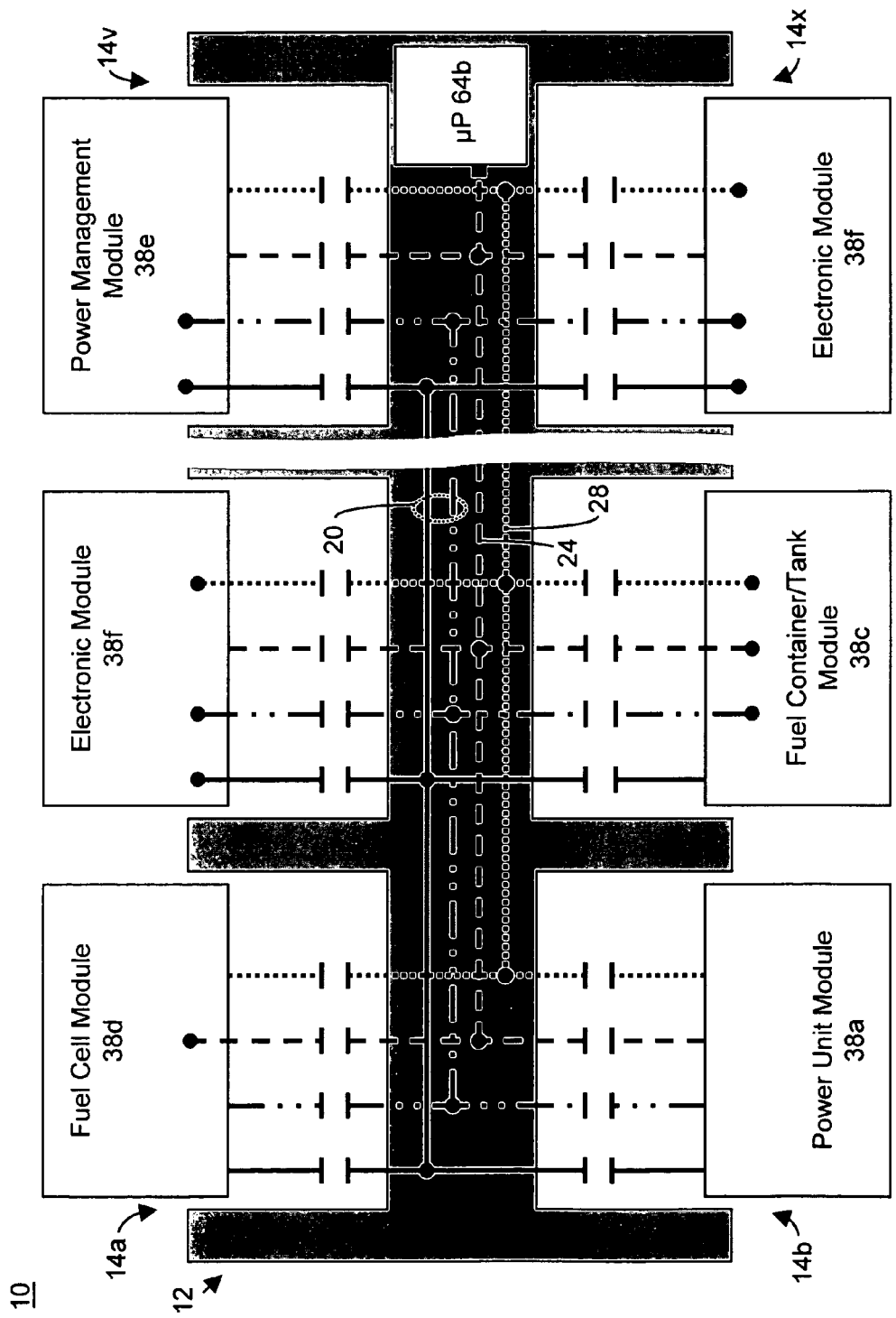

Notably, with continued reference to FIGS. 20B and 20C, integration plane 12 may also include a user interface to facilitate user communication with integration plane 12, one or more of modules 38, and/or resident processor 64b. Indeed, the user interface may include visual and audio information to the user. The user interface may also include inputs to allow the user or operator to manage, monitor and/or control the integration plane 12, one or more of modules 38, and/or resident processor 64b. All types of user interfaces, whether now known or later developed are intended to fall within the scope of the present invention.

Figure 22:
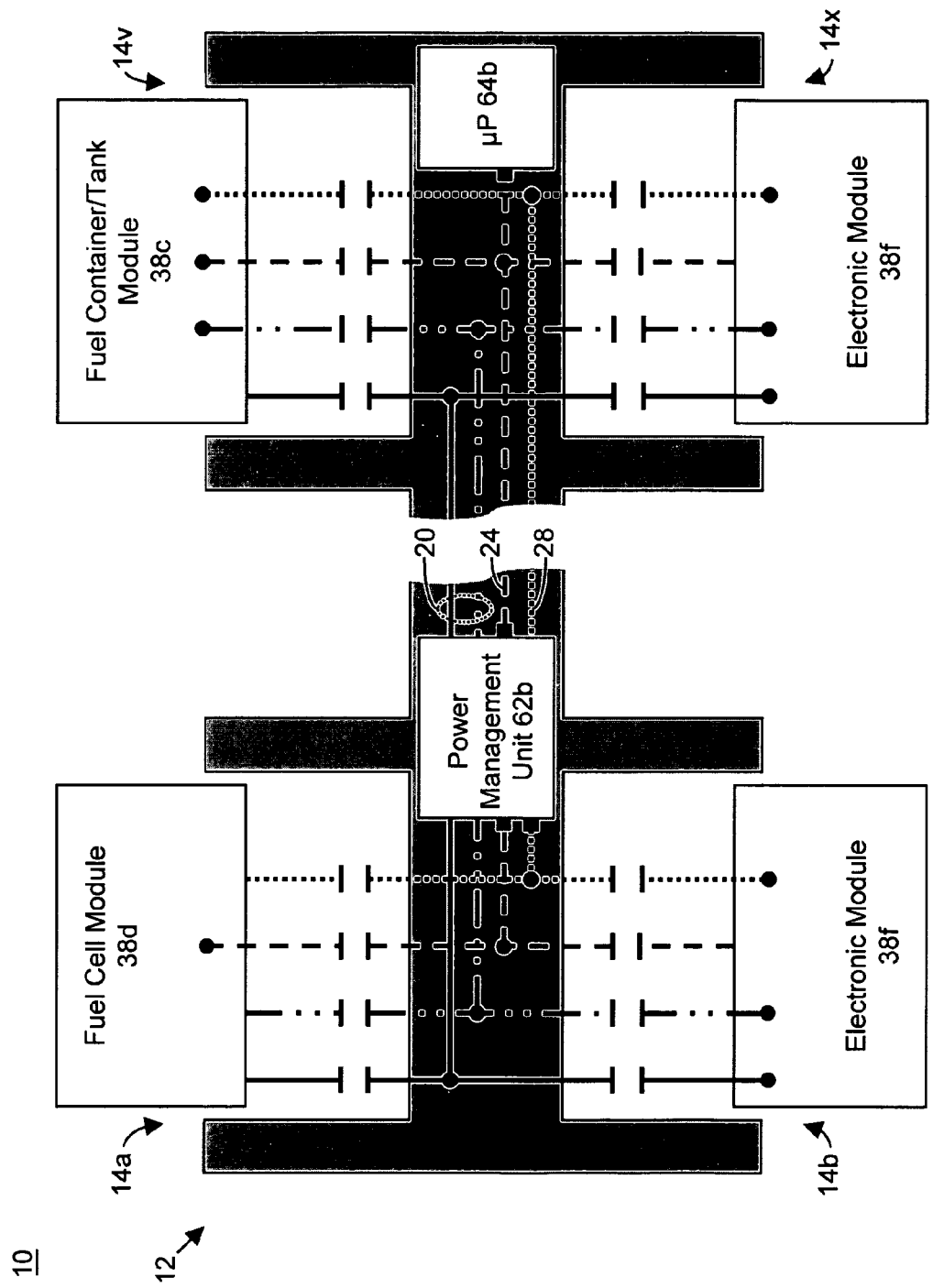
FIG. 22 is a block diagram representation of an exemplary fuel cell system including an integration plane, having a resident power management unit and a resident processor, and a plurality of technology modules populating the plurality of module bays of the integration plane, according to an exemplary embodiment of an aspect of the present inventions.

With reference to FIG. 22, integration plane 12 may include resident power management unit 62b and resident system processor 64b. In this way, the module bays may be populated by one or more fuel cell stacks, fuel storage containers/tanks (for example, hydrogen or hydride), a "redundant" or secondary power management unit to provide fault-tolerant capabilities, fuel cartridge having one or more fuel storage containers/tanks and circuitry to monitor and/or store one or more parameters of the fuel storage container(s)/tank(s), super-capacitors, batteries, electrical or electronic devices such as, for example, mobile communications device (for example, a phone or modem) and/or a surveillance device, and/or a "primary" system processor to provide primary control/management for the integration plane or a "redundant" or secondary system processor to provide fault-tolerant capabilities in the event that the resident system processor becomes inoperative. Notably, all permutations and combinations of resident technologies and technology modules are intended to fall within the scope of the present inventions. However, for the sake of brevity, all such permutations and combinations are not discussed in detail herein.

With reference to FIGS. 23-28, in certain embodiments, integration plane 12 may include resident technology incorporated into or fixed on, or embedded on or in the integration plane, as discussed above, as well as one or more external connectors to facilitate connection of one or more non-module technologies to the buses of the integration plane. The fluid bus, electrical bus and/or power management buses of the integration plane may be routed to and/or through the resident technology, thereby facilitating connection of the resident technology to the appropriate bus or busses. In addition, the fluid bus, electrical bus and/or power management buses of the integration plane may be routed to the one or more external connectors to facilitate incorporation of one or more non-module technologies into the bus networks of the integration plane.

Figure 23:
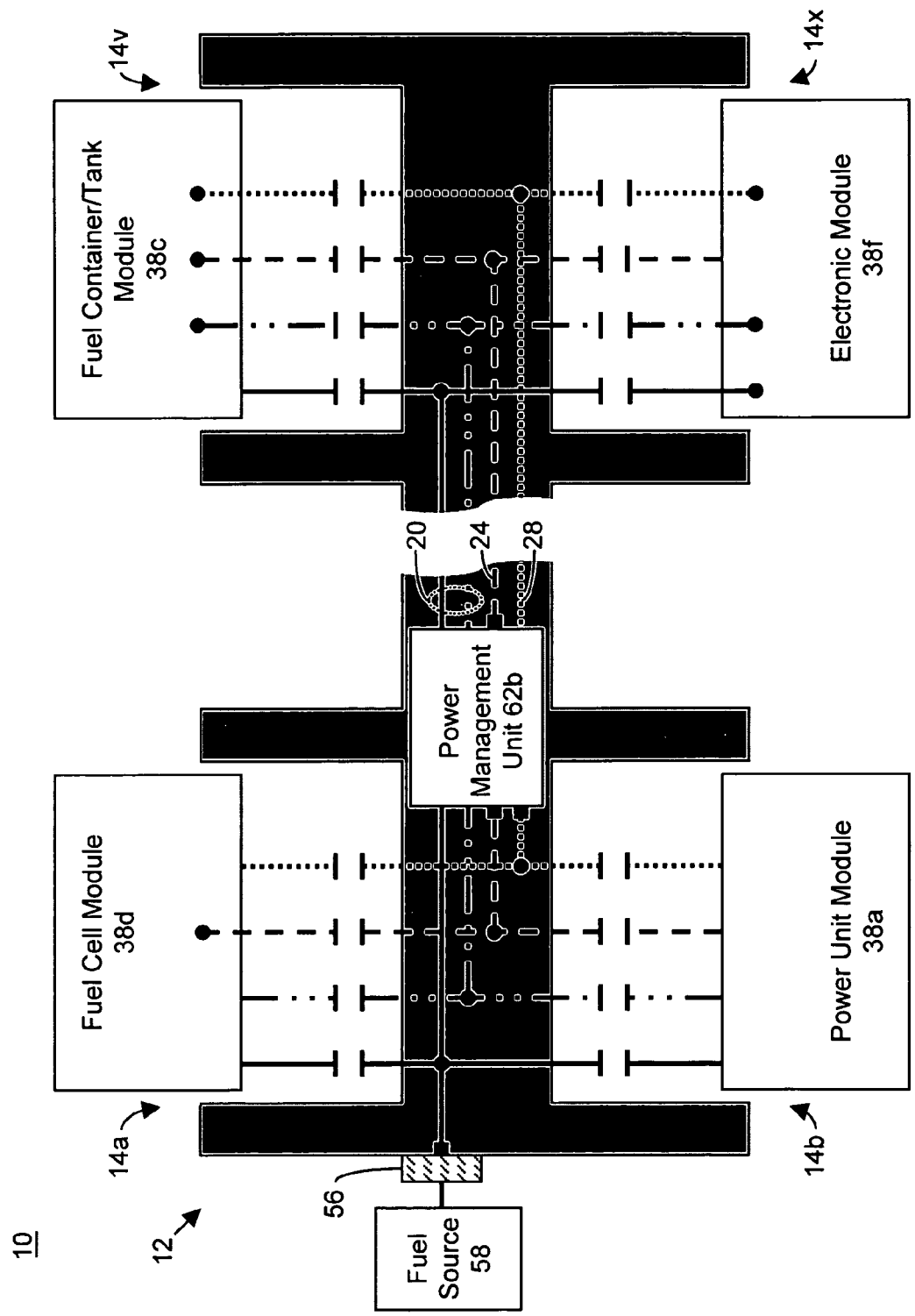
FIGS. 23 and 24 are block diagram representations of exemplary fuel cell systems including an integration plane, a plurality of technology modules populating the plurality of module bays of the integration plane, a resident power management unit, and an external connector that provides communication to one or more of the fluid, electrical and/or power management buses, according to exemplary embodiments of an aspect of the present inventions.

For example, with reference to FIG. 23, in one exemplary embodiment, modular fuel cell power system 10 includes external fuel source 58 coupled to connector 56 which is coupled to fluid bus 20. The external fuel source 58 or fuel container/tank module 38c (disposed in module bay 14v) may provide a primary or secondary fuel supply to fuel cell module 38d, which is disposed in module bay 14a. The power management unit 62b, which is resident on integration plane 12, or power unit module 38a provides the primary or secondary conditioning and/or regulating of electrical power generated by fuel cell 38d (and supplied on power management bus 28). The electronic module 38f (which may include any electronic or electrical circuitry) employs the conditioned and/or regulated power provided by power management unit 62b on the electrical bus 24. Moreover, electronics module 38f may configure, manage and/or control integration plane 12 (and technology modules 38 connected thereto) so that such modules 38 provide the required, desired or predetermined outputs, conditions, operations and/or functions of integration plane 12.

Notably, fuel cell module 38d or the fuel cell in power unit module 38a may provide primary or secondary electrical power generation. Alternatively, each may provide primary power generation for independent electrical supplies wherein the power management unit 62b may provide primary conditioning and/or regulating of electrical power generated by fuel cell 38d and power unit 38a may provide primary conditioning and/or regulating of electrical power generated its internal fuel cell. Indeed, external fuel source 58 and fuel container/tank module 38c may provide different fuels and, as such, each may be a primary fuel source for fuel cell module 38d and power unit module 38a. All permutations and combinations of the configurations of modular fuel cell power system 10 are intended to fall within the scope of the present invention. Indeed, electronics module 38f (and/or external processor unit 64a (if any, see, FIG. 25) and/or resident processor unit 64b (if any, see FIG. 17)), may configure, manage and/or control which technology modules, external technologies and/or internal technologies of system 10 perform primary and/or secondary operations.

Figure 24:
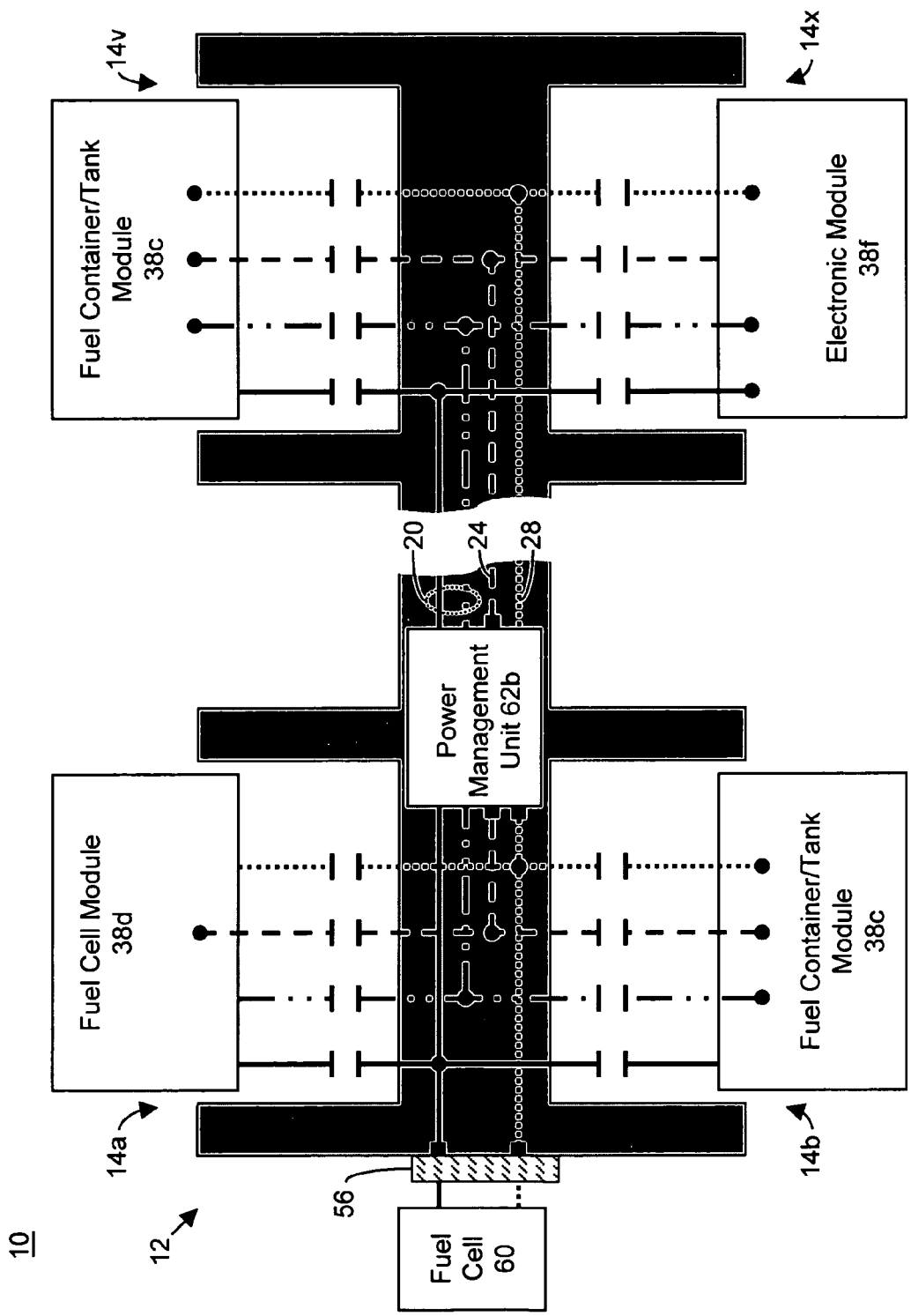
Figure 25:
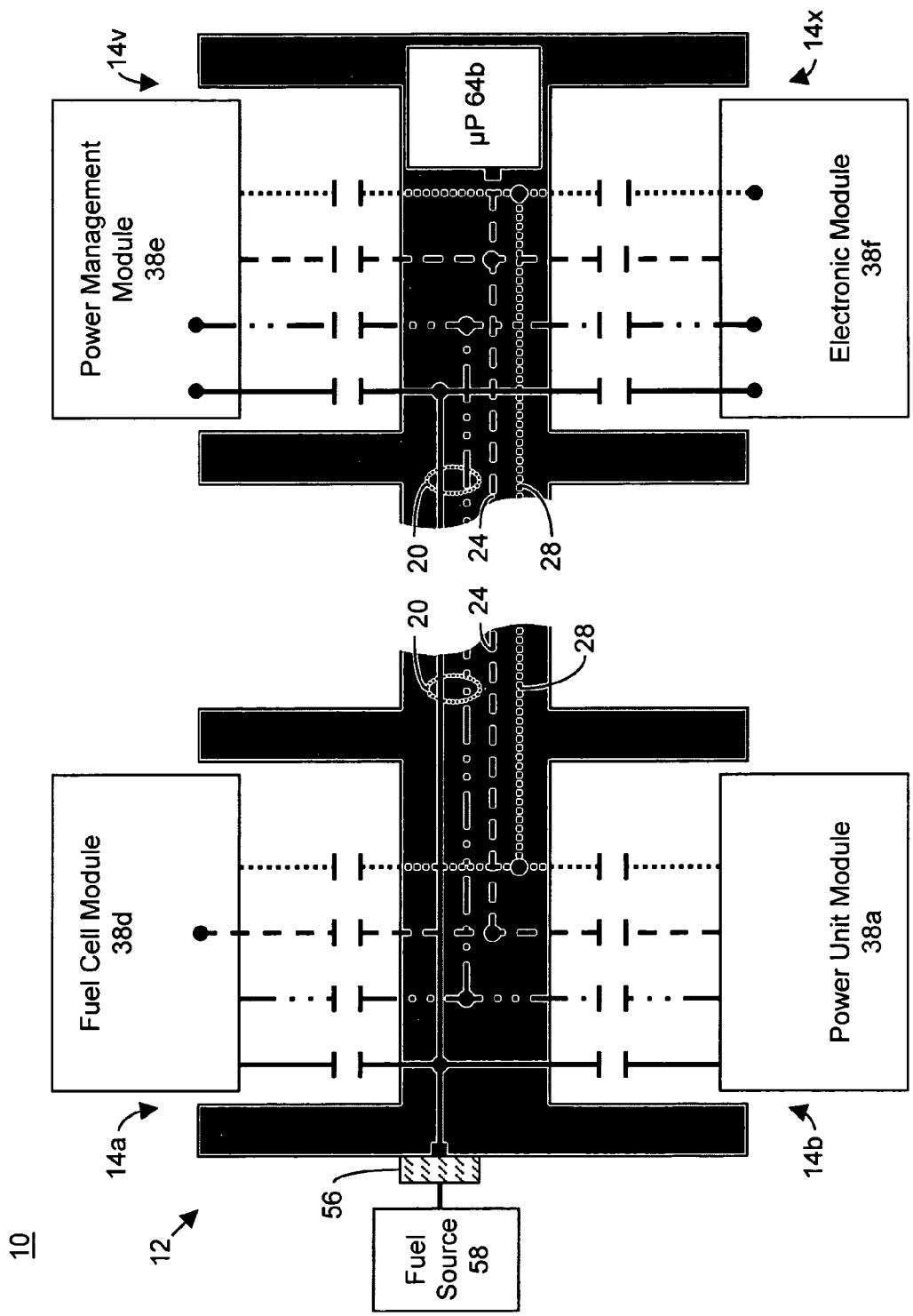
FIGS. 25-28 are block diagram representations of exemplary fuel cell systems including an integration plane, a plurality of technology modules populating the plurality of module bays of the integration plane, a resident processor, and an external connector that provides communication to one or more of the fluid, electrical and/or power management buses, according to exemplary embodiments of an aspect of the present inventions.
Figure 26:
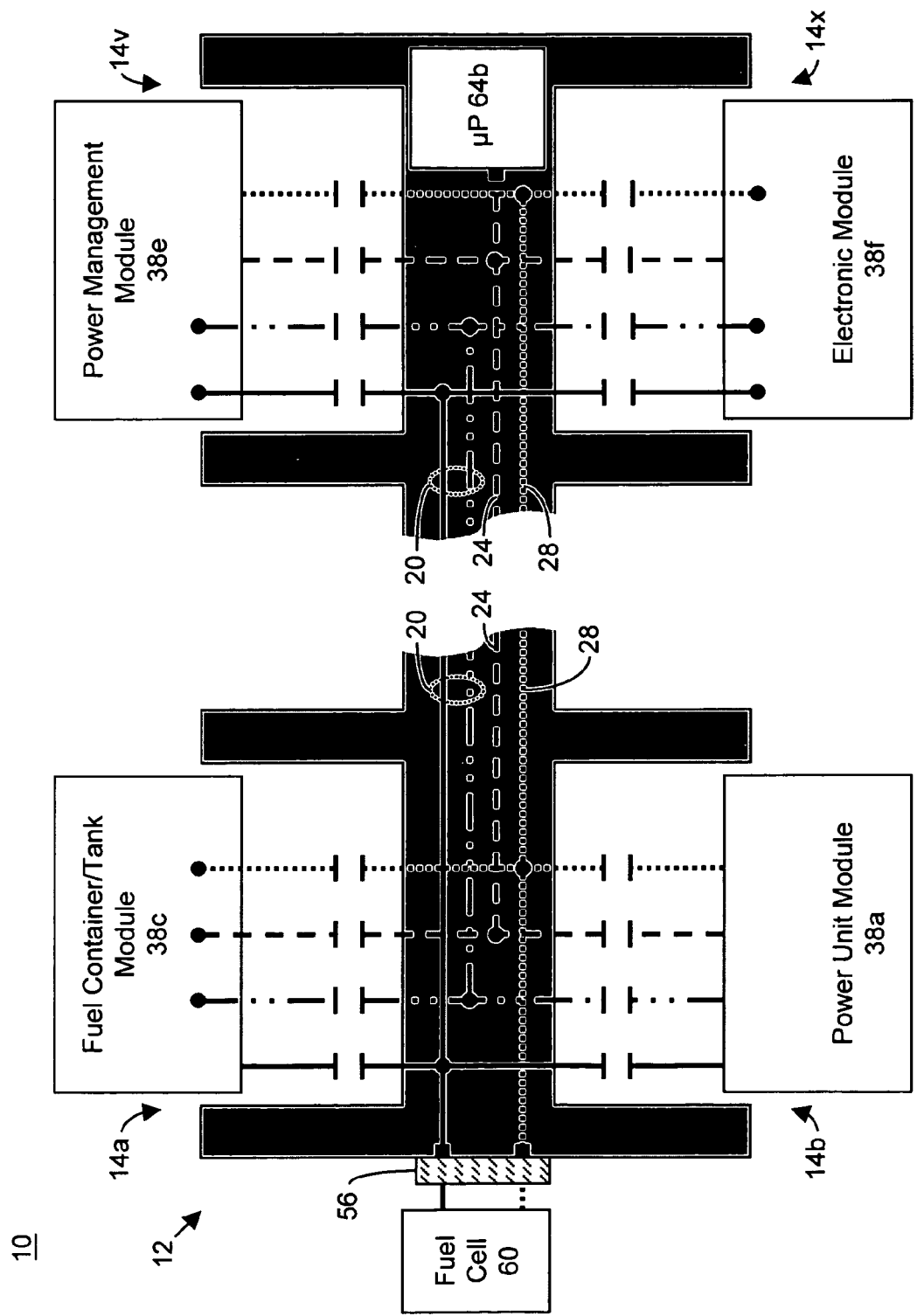
Figure 27:
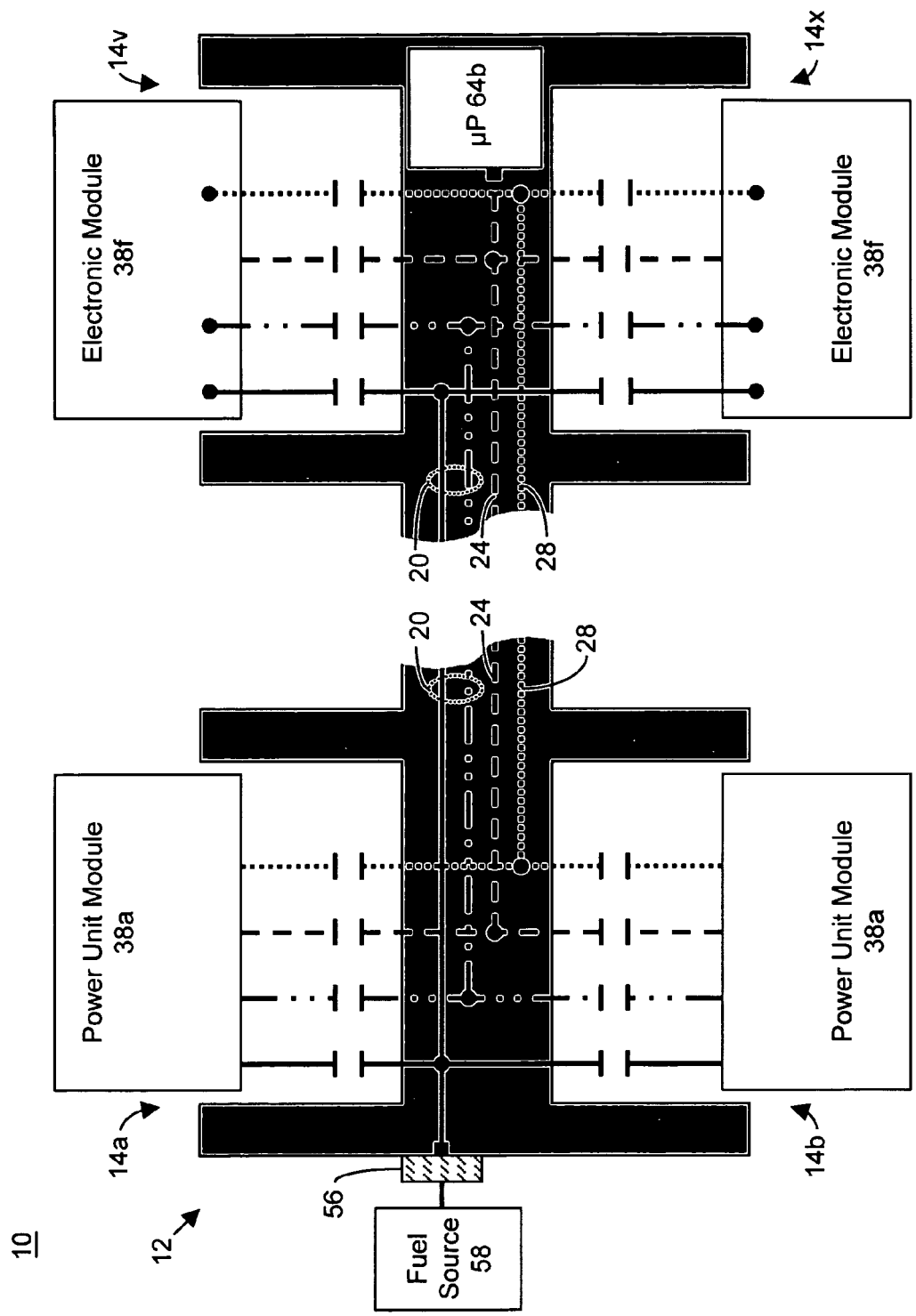
Figure 28:
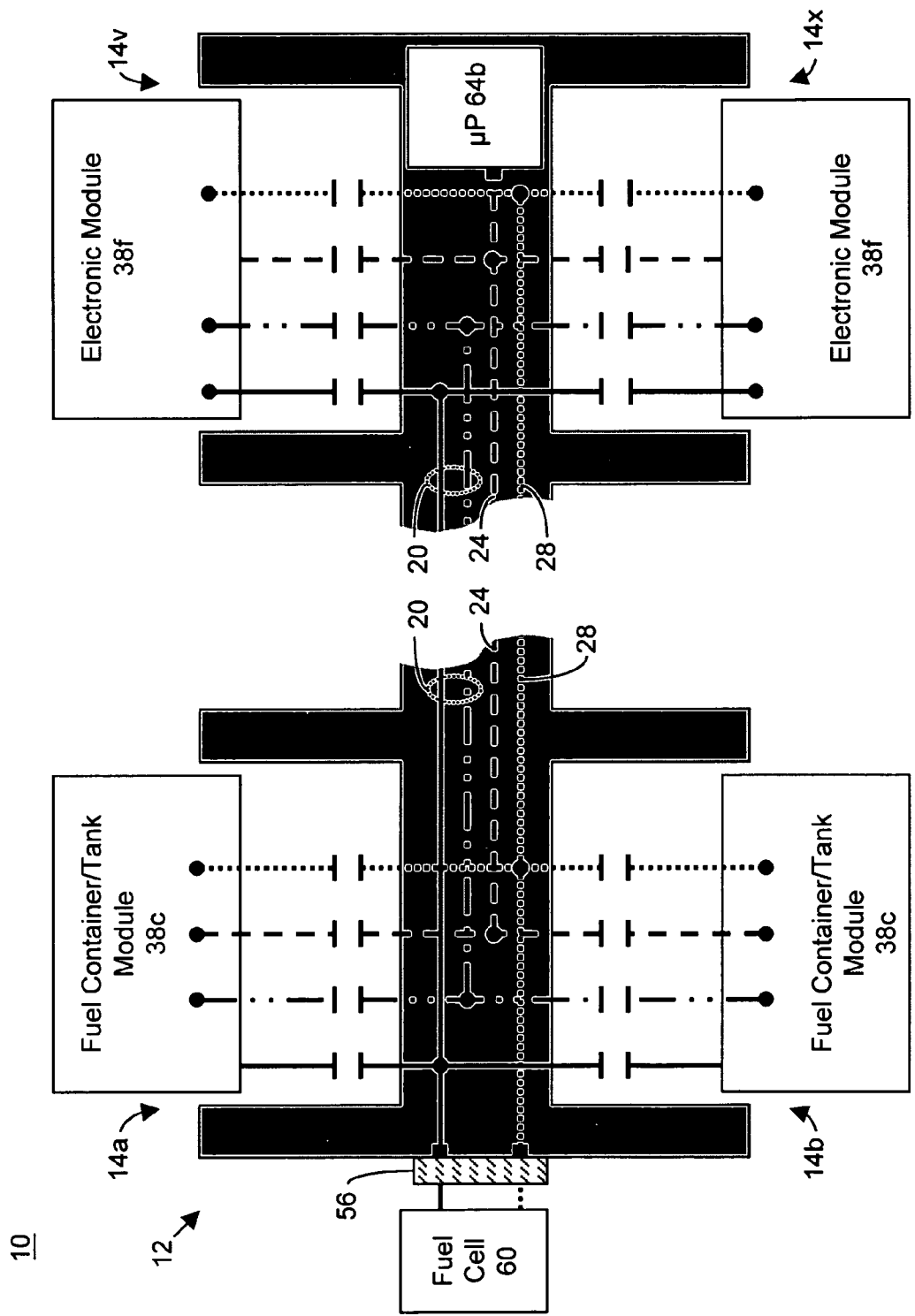

Similarly, with reference to FIG. 24, external fuel cell 60 and fuel cell module 38d may be a primary or secondary electrical power generation source. Alternatively, each may provide primary power generation for independent electrical supplies wherein the power management unit 62b may provide primary conditioning and/or regulating of electrical power generated by fuel cell 38d and external fuel cell 60. Likewise, fuel container/tank module 38c (disposed in module bay 14b) and fuel container/tank module 38c (disposed in module bay 14b) may provide the same or different fuels. Again, all permutations and combinations of the configurations discussed above for modular fuel cell power system 10 of FIG. 23 are also suitable combinations of the system of FIG. 24.

In this exemplary embodiment, electronics module 38f may configure, manage and/or control integration plane 12 and technology modules 38 connected thereto. For example, with reference to FIG. 24, electronics module 38f may configure fuel container/tank module 38c (disposed in module bay 14b) to provide fluid to fuel cell 38d and fuel container/tank module 38c (disposed in module bay 14v) to provide fluid in the event that and/or when system 10 depletes the fuel in fuel container/tank module 38c (disposed in module bay 14b). As such, electronics module 38f may enable or configure fuel container/tank module 38c (disposed in module bay 14v) to provide fluid to fuel cell 38d when the fuel in fuel container/tank module 38c (disposed in module bay 14b) is depleted.

Notably, as discussed below, electronic module 38f may determine, monitor, manage and/or control one or more operating parameters, for example, the amount of fuel remaining and/or consumed, the rate of fuel consumption, the temperature and pressure of the fuel in the associated fuel vessel, temperature of the exterior of fuel vessel, and the operating status of fuel cartridge module 38b (for example, whether any faults or errors have been registered). In this way, electronic module 38f may more precisely configure, control, manage and/or monitor technology modules 38 connected to integration plane 12. For example, with reference to FIG. 24, electronic module 38f may more precisely configure, control, manage and/or monitor the operations of fuel container/tank module 38c (disposed in module bay 14b) and fuel container/tank module 38c in order to meet the requirements of technology modules 38 connected to integration plane 12 (for example, fuel cell module 38d, external fuel cell 60 and/or resident power management unit 62a).

In addition, electronics module 38f may control and/or manage the operating parameters and/or characteristics of fuel cell module 38d (and/or fuel cell 60) as well as resident power management unit 62b. In this regard, electronics module 38f may determine the amount of electrical power output by fuel cell module 38d (and/or fuel cell 60) (based on, for example, an assessment of requirements or needs of integration plane 12 and/or technology modules 38 connected thereto) and the amount, type and duration of electrical power output by resident power management unit 62b (again, based on, for example, an assessment of requirements or needs of integration plane 12 and/or technology modules 38 connected thereto).

With reference to FIG. 25-28, in one exemplary embodiment, modular fuel cell power system 10 includes external connector 56, which may couple to one or more external technologies (for example, fuel cell 60 and fuel source 58) and resident processor 64b. In this embodiment, the electrical bus and/or power management buses of the integration plane may be routed to and/or through resident processor 64b, thereby facilitating connection to the appropriate bus or buses. The resident processor 64b may manage and/or control the use of electrical bus 24 (for example, the data and/or control portion of electrical bus 24) by one or more electronic modules 38f that are disposed in module bay(s) 14 of integration plane 12. In addition, or in lieu thereof, resident processor 64b may manage communication between a plurality of electronic modules 38f, manage or control operations of integration plane 12, and/or manage or control operations of one or more technology modules 38 disposed in modules bays 14 (electronic modules 38f).

Figure 29:
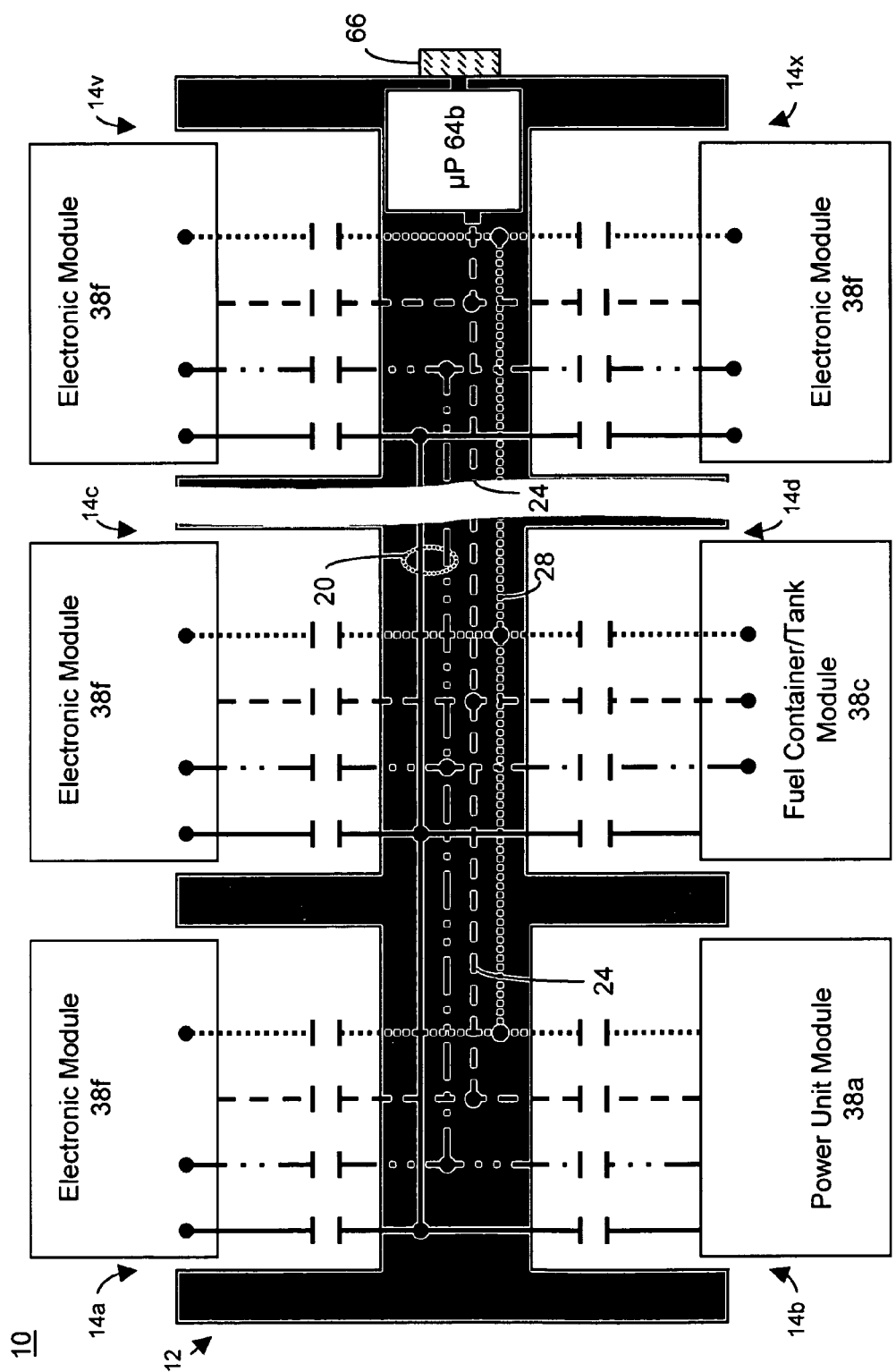
FIG. 29 is a block diagram representation of an exemplary fuel cell system including an integration plane, having a resident processor, a plurality of technology modules populating the plurality of module bays of the integration plane, and an external connector for communication directly with the resident processor, according to an exemplary embodiment of an aspect of the present inventions.

With reference to FIG. 29, in one exemplary embodiment, integration plane 12 includes external connector 66 that provides direct connection and communication to resident processor 64b. In this regard, integration plane 12 may include a second electrical bus to facilitate such connection or external connector 66 may be coupled to electrical bus 24. In this embodiment, a user or operator may directly access resident processor 64b via external connector 66. Alternatively, a user or operator may directly access electronic modules 38f in one or more of module bays 14 (for example, electronic modules 38f in bays 14a, 14c and/or 14x) of integration plane 12.

Figure 30:
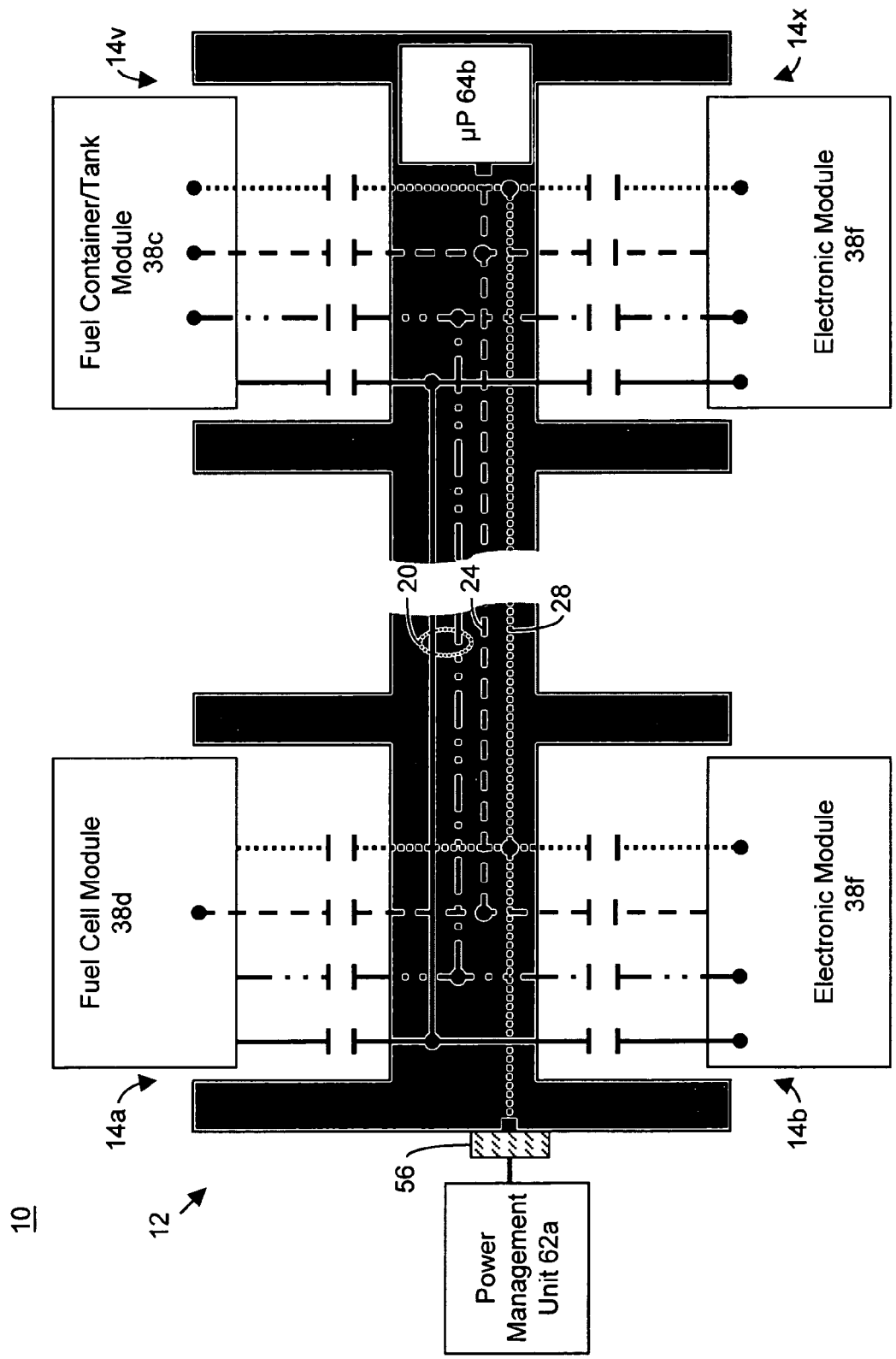
FIG. 30 is a block diagram representation of an exemplary fuel cell system including an integration plane, having a resident processor, a plurality of technology modules populating the plurality of module bays of the integration plane, and an external power management unit connected to an external connector which provides communication to the power management bus, according to an exemplary embodiment of an aspect of the present inventions.
Figure 31:
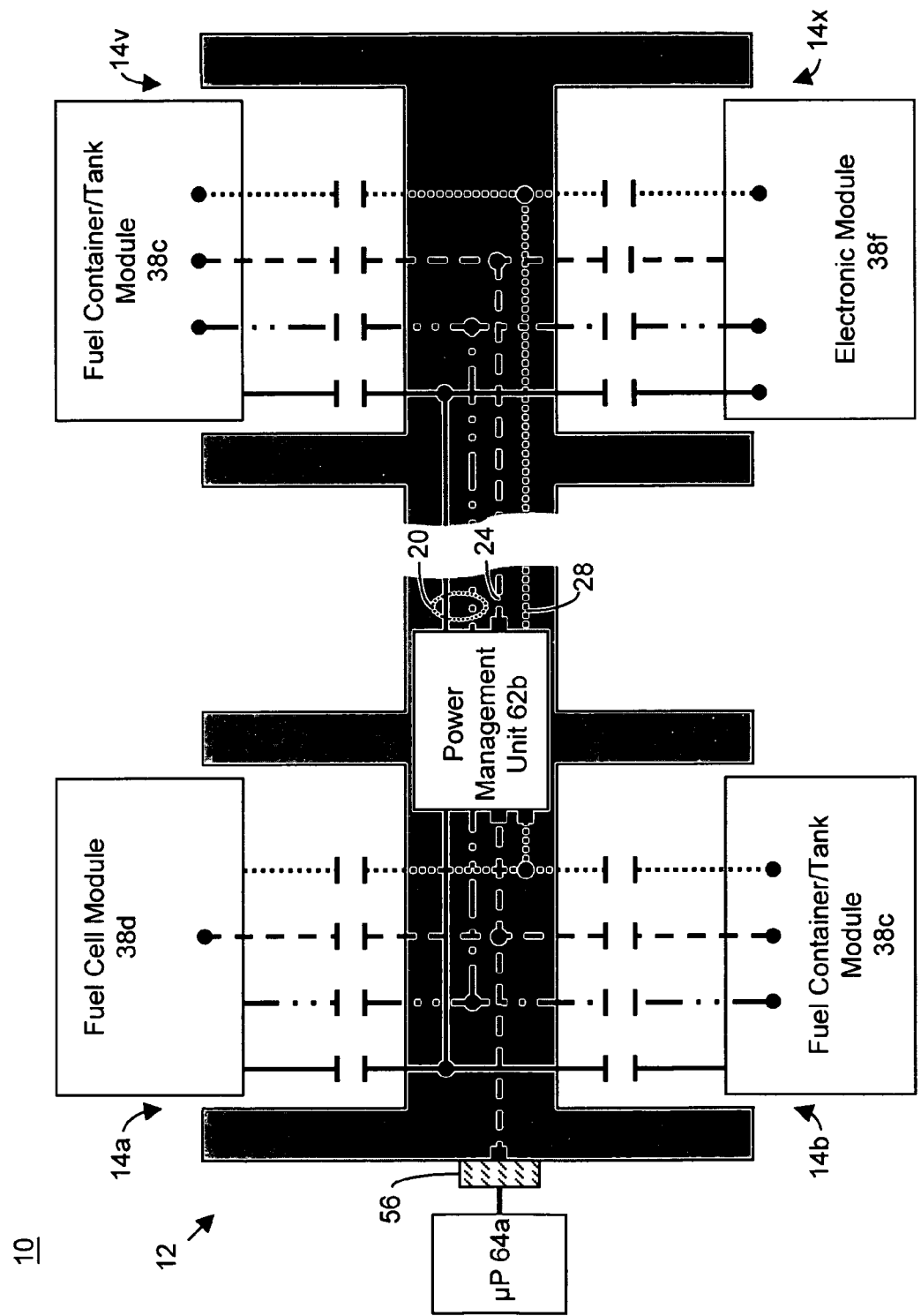
FIG. 31 is a block diagram representation of an exemplary fuel cell system including an integration plane, having a resident power management unit, a plurality of technology modules populating the plurality of module bays of the integration plane, and an external processor connected to an external connector which provides communication to the electrical bus, according to an exemplary embodiment of an aspect of the present inventions.

With reference to FIGS. 30 and 31, modular fuel cell power system 10 may include an external power management unit 62a and a resident processor 64b (see, FIG. 30) or a resident power management unit 62b and an external processor 64a (see, FIG. 31). The external connector 56 facilitates communication to the appropriate bus on integration plane 12. Thus, in these embodiments, modular fuel cell power system 10 may be rapidly reconfigured via substitution of the external power management unit (for example, in order to implement a unit that provides a greater or more condition/regulated output) and/or facilitate rapid user/operator connection to electrical bus 24 and direct access to one or more electronic modules 38f in one or more of module bays 14, and/or control one or more operations/aspects of system 10 (for example, operation of resident power management unit 62b).

Figure 32:
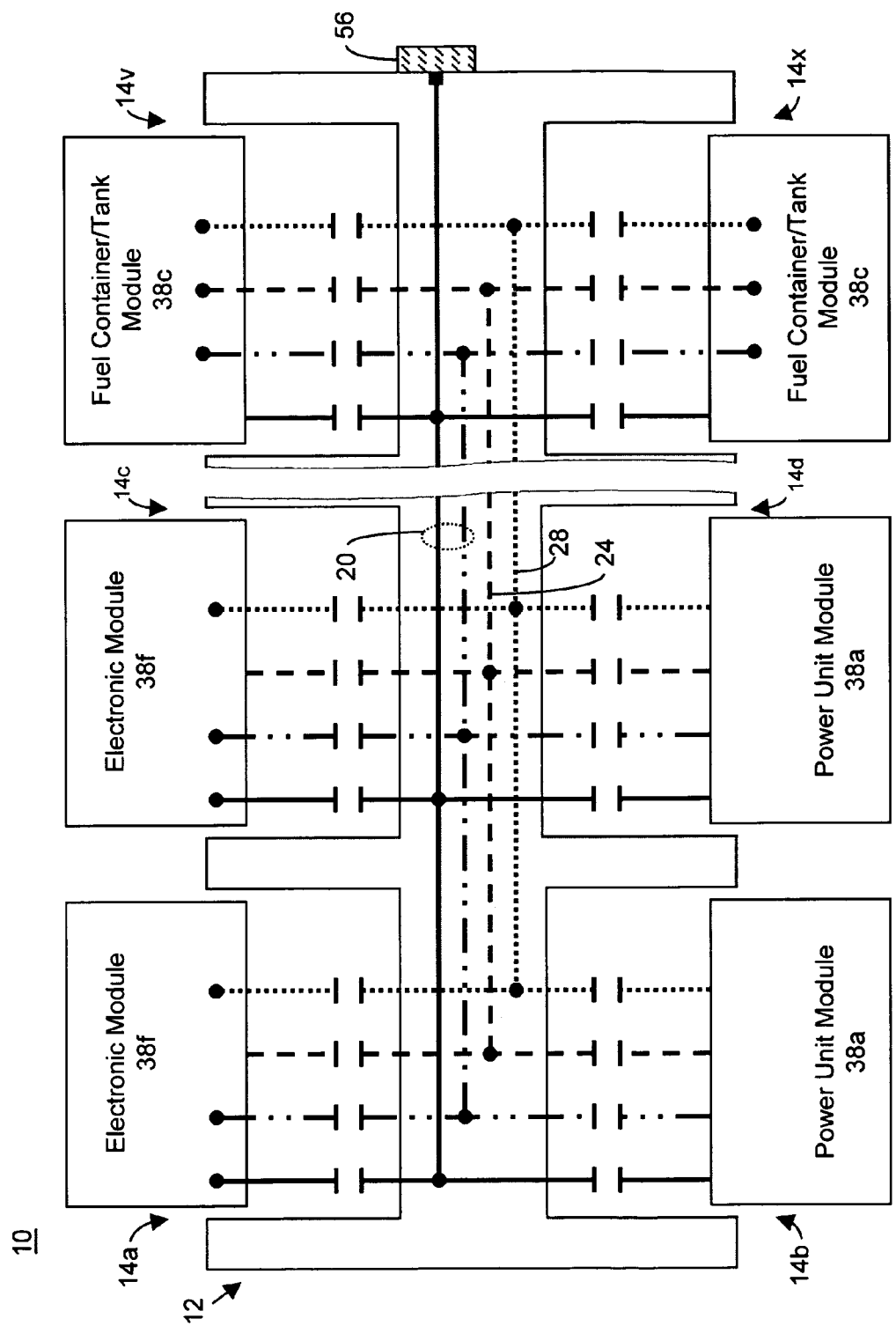
FIGS. 32-34 are block diagram representations of exemplary fuel cell systems including an integration plane and a plurality of technology modules populating the plurality of module bays of the integration plane wherein the technology modules provide for redundancy of functions and/or operations.

As mentioned above, modular fuel cell power system may include mechanisms, circuitry and/or technology modules that provide for redundancy of operations or functions in the event, for example, a failure. With reference to FIG. 32, modular fuel cell power system 10 may include redundant technology modules, for example, power unit modules 38a, which are disposed in module bays 14b and 14d, and/or electronic modules 38f, which are disposed in module bays 14a and 14c. Thus, in this embodiment, in the event one or more modules 38 become inoperative or are removed from system 10 (for example, during operation), another module 38 which performs the same or substantially the same function may be enabled and become operative.

Figure 33:
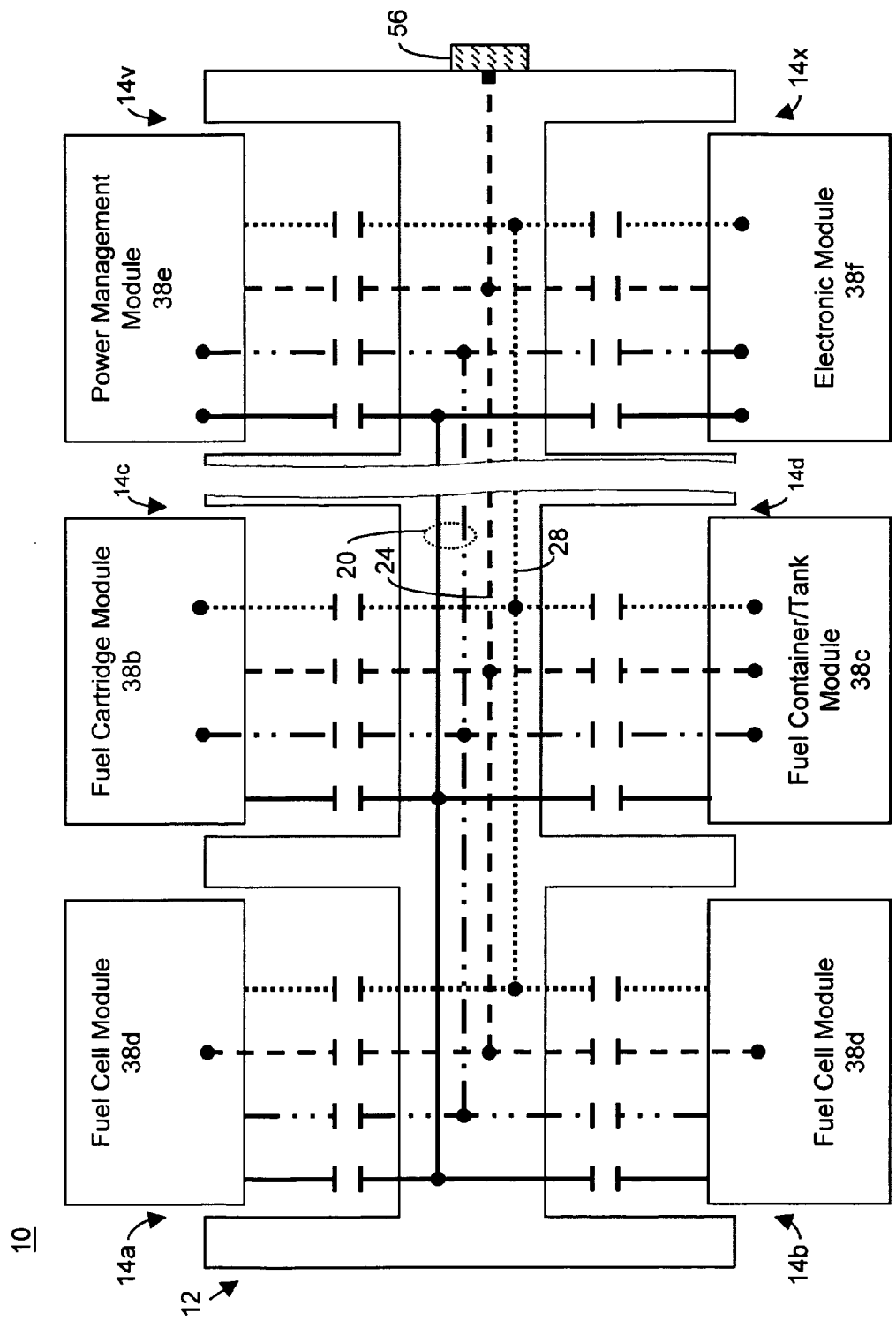
Figure 34:
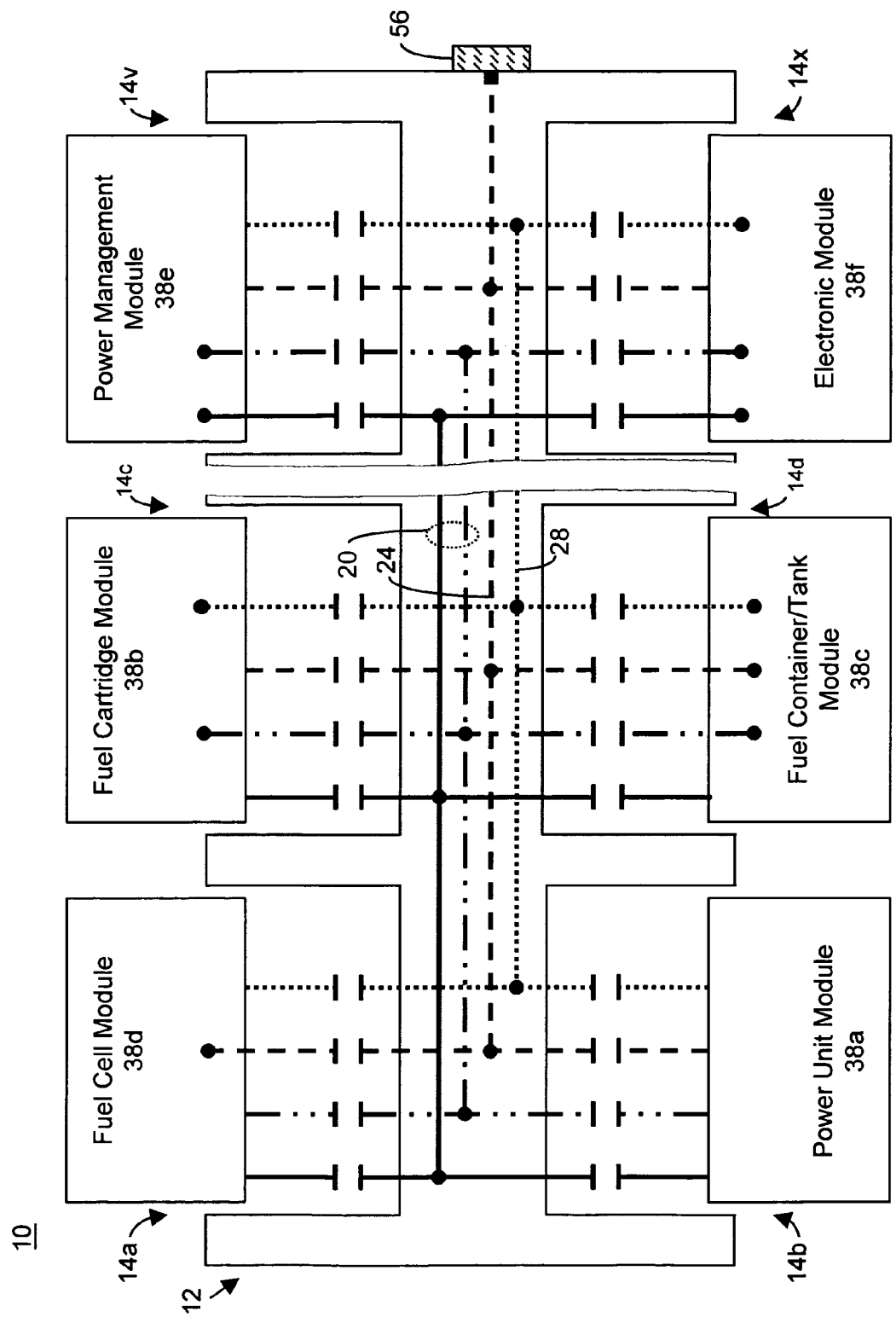
Figure 35:
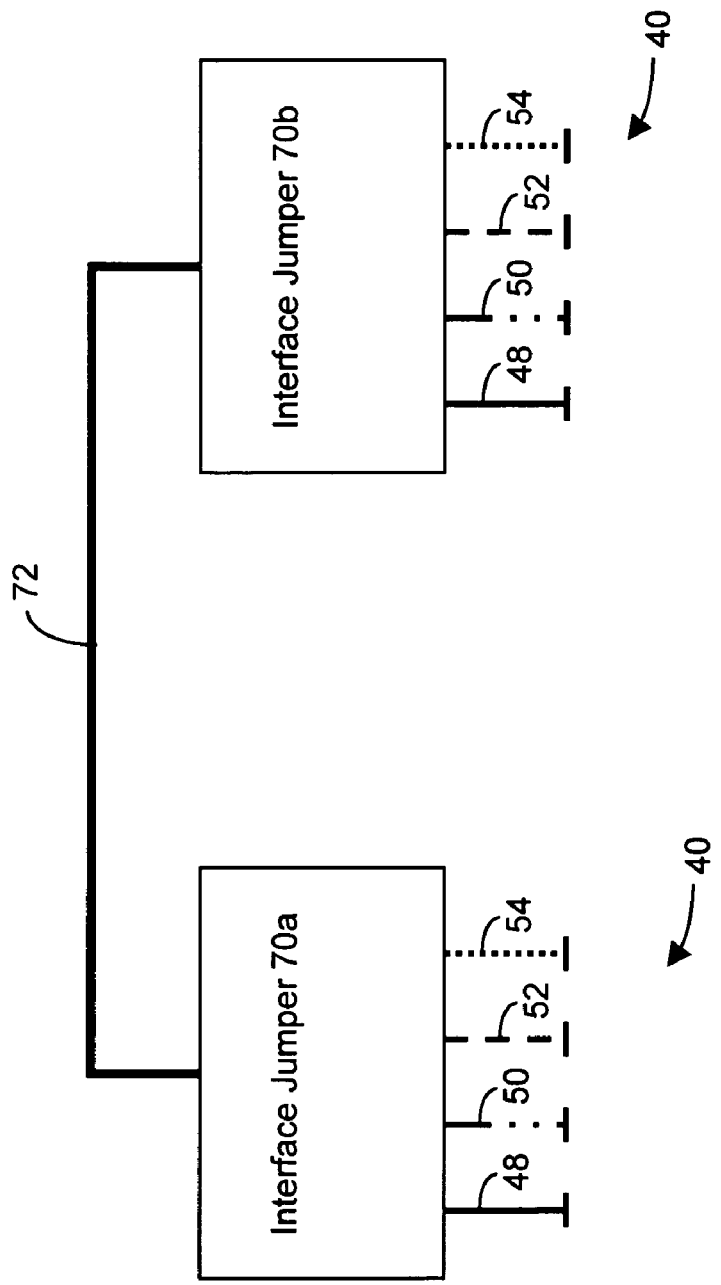
FIG. 35 is a block diagram illustration of an extension mechanism (having two interface jumpers and a fluid, electrical and/or power management bus disposed therebetween) to interconnect a plurality of integration planes, according to an embodiment of an aspect of the present inventions.

With reference to FIG. 33, modular fuel cell power system 10 may include redundant fuel cell modules 38d which are disposed in module bays 14a and 14b, and/or redundant modules that perform the same or similar functions such as fuel cartridge module 38b, which is disposed in module bay 14c, and fuel container/tank module 38c, which is disposed in module bay 14d. (See also, power unit 38a and fuel cell module 38d and power management module 38e of FIG. 34). Notably, one of fuel cell modules 38d may be a secondary fuel cell that is enabled when additional power is required or desired. In this regard, fuel cell module 38d, which is disposed in module bay 14b, may be inoperative until required, desired and/or enabled, wherein thereafter it provides an additional independent source of electrical power.

The redundancy management and/or control may be performed by external processor unit 64a (if any), resident processor unit 64b (if any), and/or electronics module 38f. For example, external processor unit 64a (if any) and/or resident processor unit 64b (if any), and/or electronics module 38f (if any) may continuously poll the operating conditions, characteristics and/or states of technology modules 38 connected or coupled to integration plane 12. When a failure is detected and/or anticipated, external processor unit 64a (if any) and/or resident processor unit 64b (if any), and/or electronics module 38f (if any) may engage or enable a "redundant" technology module (if any) and/or external or internal technology unit (if any). Under these circumstances, system 10 continues to operate notwithstanding a failure in one or more technology modules 38.

Notably, as mentioned above, external processor unit 64a (if any), resident processor unit 64b (if any), and/or electronics module 38f (if any) may configure integration plane 12 and technology modules 38 connected thereto, as well as control the operation of integration plane 12 and/or modules 38 connected thereto. For example, resident processor unit 64b (if any) and/or electronics module 38f (if any) may receive data (directly or indirectly) from technology modules 38 connected to integration plane 12 (for example, via the state of one or more pins of electrical connector and/or information stored or resident (for example, a ROM or EEPROM) in module 38) which is representative of the type capabilities, requirements, and/or characteristics of each module 38 connected to integration plane 12. The resident processor unit 64b (if any) and/or electronic module 38f (if any) may, based on a determination of one or more modules 38 coupled or connected to integration plane 12, configure integration plane 12 and/or technology modules 38 to provide the required, desired or predetermined outputs, conditions, operations and/or functions of integration plane 12 (and/or technology modules 38 connected thereto). In this regard, for example, certain technology modules 38 may be configured for redundancy, certain technology modules 38 may be configured to provide certain outputs, certain modules 38 may be configured to perform certain operations and/or functions, and certain modules 38 may be configured to accommodate certain needs or requirements of integration plane 12 and/or technology modules 38.

The modular fuel cell power system may also include an extension mechanism or technique that facilitates or allows communication between a plurality of integration planes. In this way, the number of module bays available in a system, and as such, the number of technology modules that may be employed within the system, may be expanded or contracted without changing or modifying the integration plane(s).

Moreover, two integration planes, located remote from one another, may be considered, in effect, a single integration plane having more module bays than either one of the integration planes alone. In addition, two integration planes having different size or dimension, operating characteristics, and/or functionality constraints (which may be dictated by the environment in which each integration plane is employed), may also be interconnected notwithstanding such differences (for example, different size technology modules).

With reference to FIGS. 35-38, in one embodiment, extension mechanism 68 includes interface jumpers 70a and 70b which are interconnected via bus 72. The interface jumper 70a may be disposed in module bay 14v, and communicate with interface 16 thereof, of integration plane 12a. Similarly, interface jumper 70b may be disposed in module bay 14a, and communicate with interface 16 thereof, of integration plane 12b. As such, fluid, electrical and/or power management buses of integration planes 12a and 12b are interconnected. In this way, the fluid buses, the electrical buses and/or power management buses of integration planes 12a and 12b are, in effect, one common bus.

Figure 36:
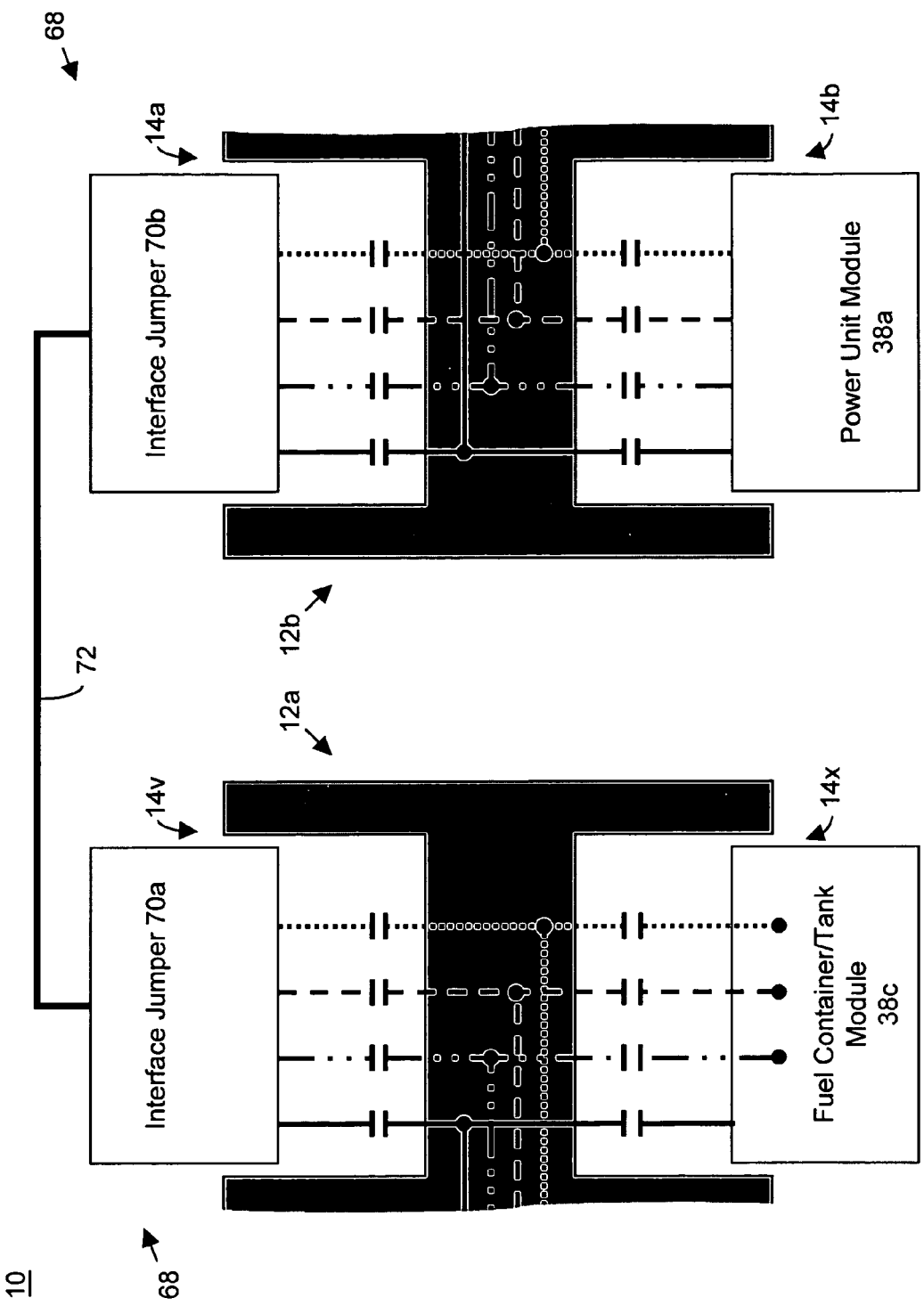
FIGS. 36-38 are block diagram representations of exemplary fuel cell systems including two integration planes, each having a plurality of technology modules populating the module bays, in conjunction with the extension mechanism of FIG. 35, according to exemplary embodiments of an aspect of the present inventions.
Figure 37:
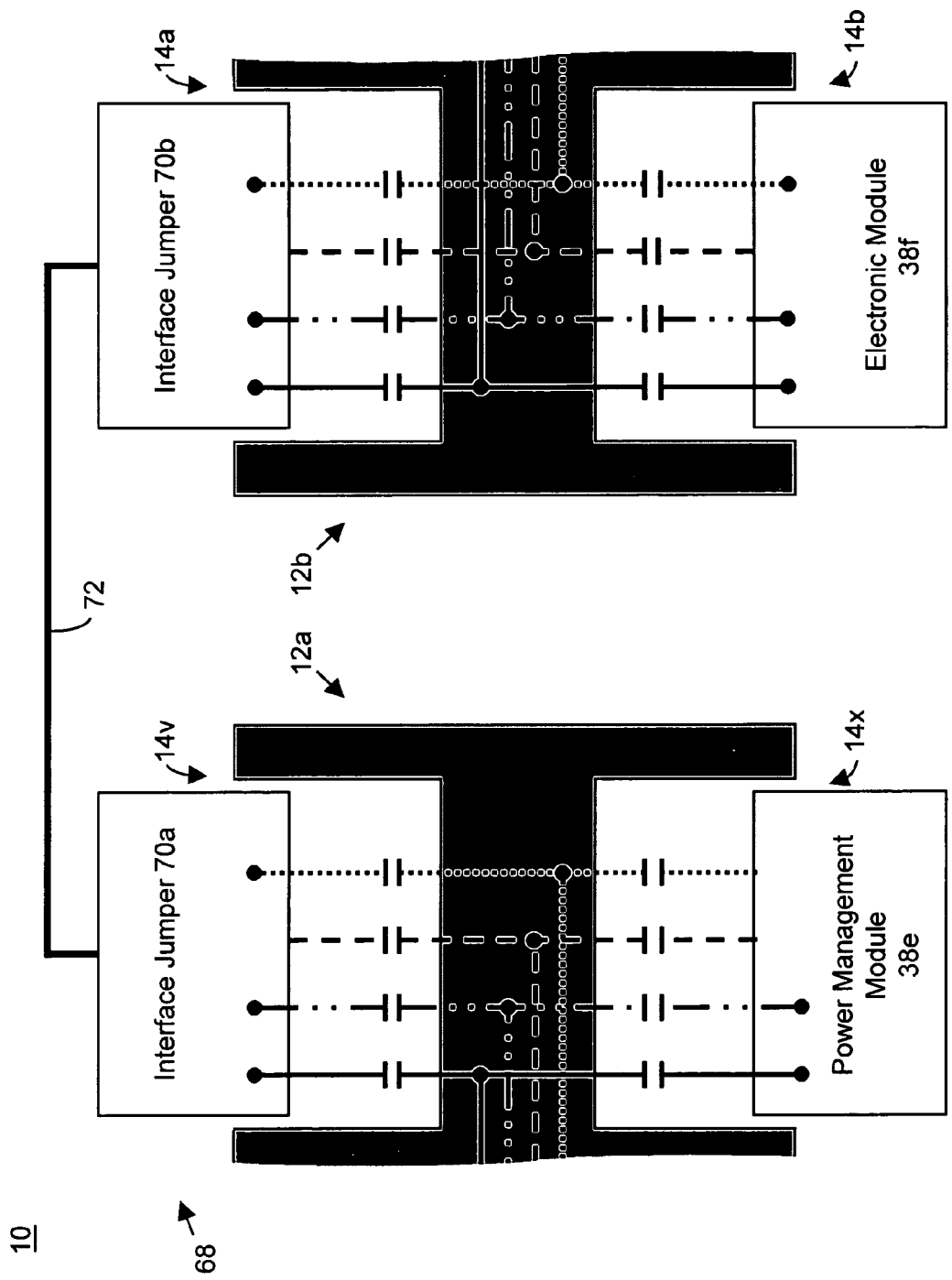
Figure 38:
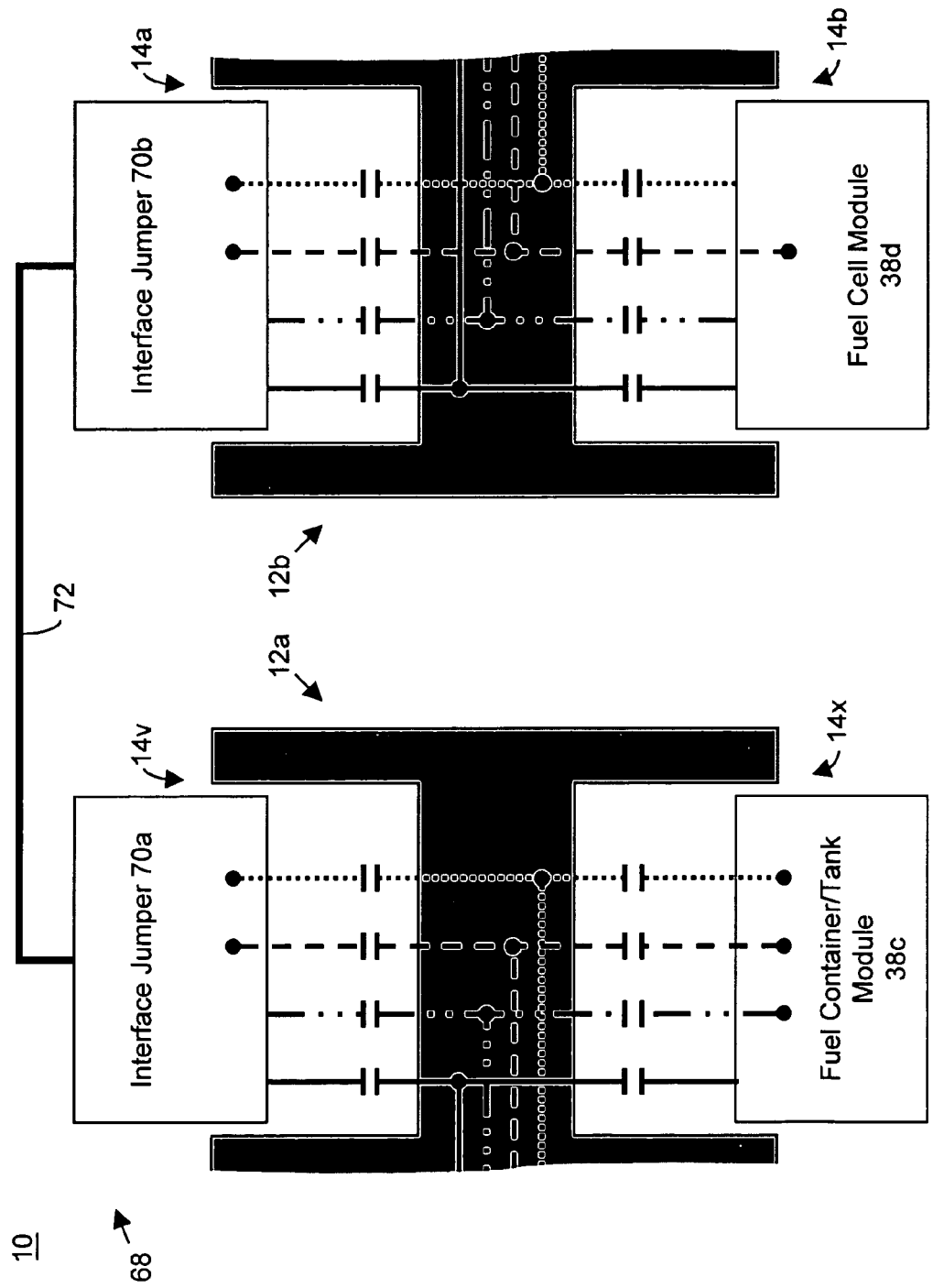

For example, with reference to FIG. 36, fuel container/tank module 38c, which is disposed in module bay 14x of integration plane 12a, may provide fuel to power unit module 38a, which is disposed in module bay 14b of integration plane 12b. Similarly, with reference to FIG. 37, power management module 38e, which is disposed in module bay 14x of integration plane 12a, may provide conditioned/regulated electrical power to electronic module 38f, which is disposed in module bay 14b of integration plane 12b.

Notably, in certain embodiments, not all of the buses are interconnected. (Compare FIG. 36) In this regard, interface jumpers 70a and 70b and bus 72 may be configured to interconnect one or more fluid, electrical and power management buses. For example, in the embodiment illustrated in FIG. 37, extension mechanism 68 connects only the electrical and power management buses of integration planes 12a and 12b. Further, in the embodiment illustrated in FIG. 38, extension mechanism 68 connects only the fluid bus of integration planes 12a and 12b. Notably, all permutations and combinations of technologies and technology modules, and interface plane interconnections via extension mechanism 68, are intended to fall within the scope of the present inventions.

Figure 39A:
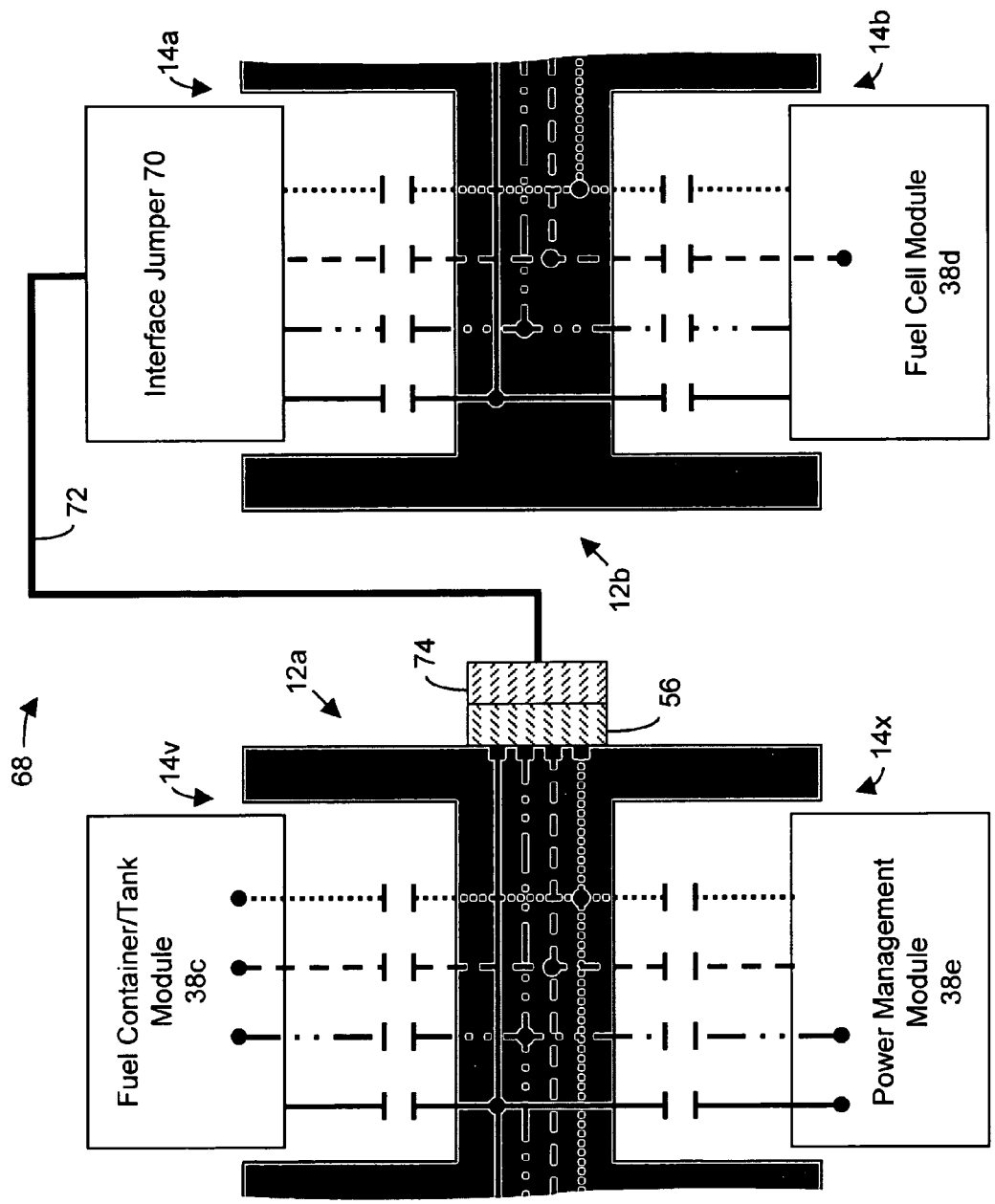
FIGS. 39A-39C are block diagram representations of exemplary fuel cell systems including two integration planes, each having a plurality of technology modules populating the module bays, in conjunction with an extension mechanism according to another embodiment thereof.
Figure 39B:
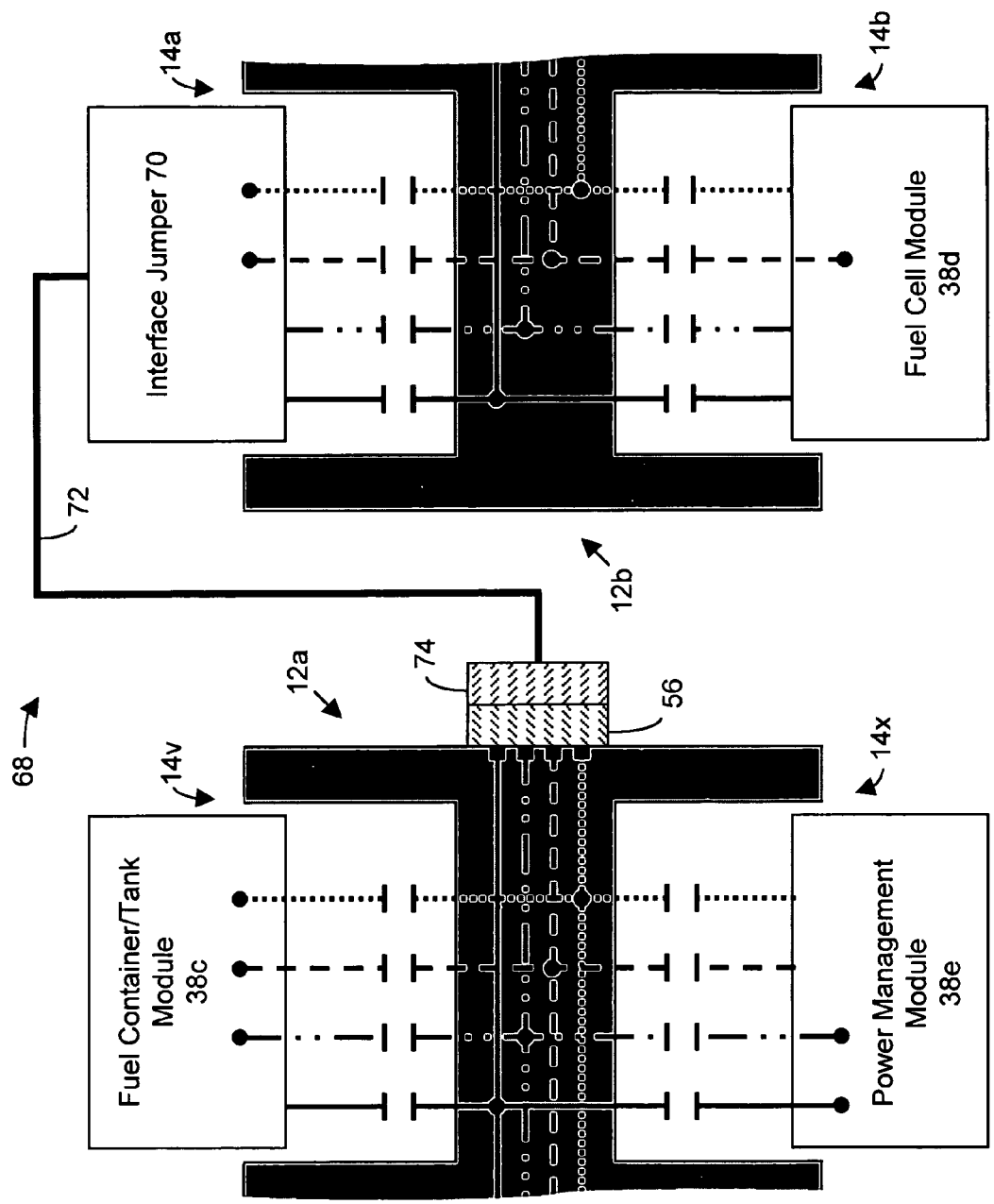
Figure 39C:
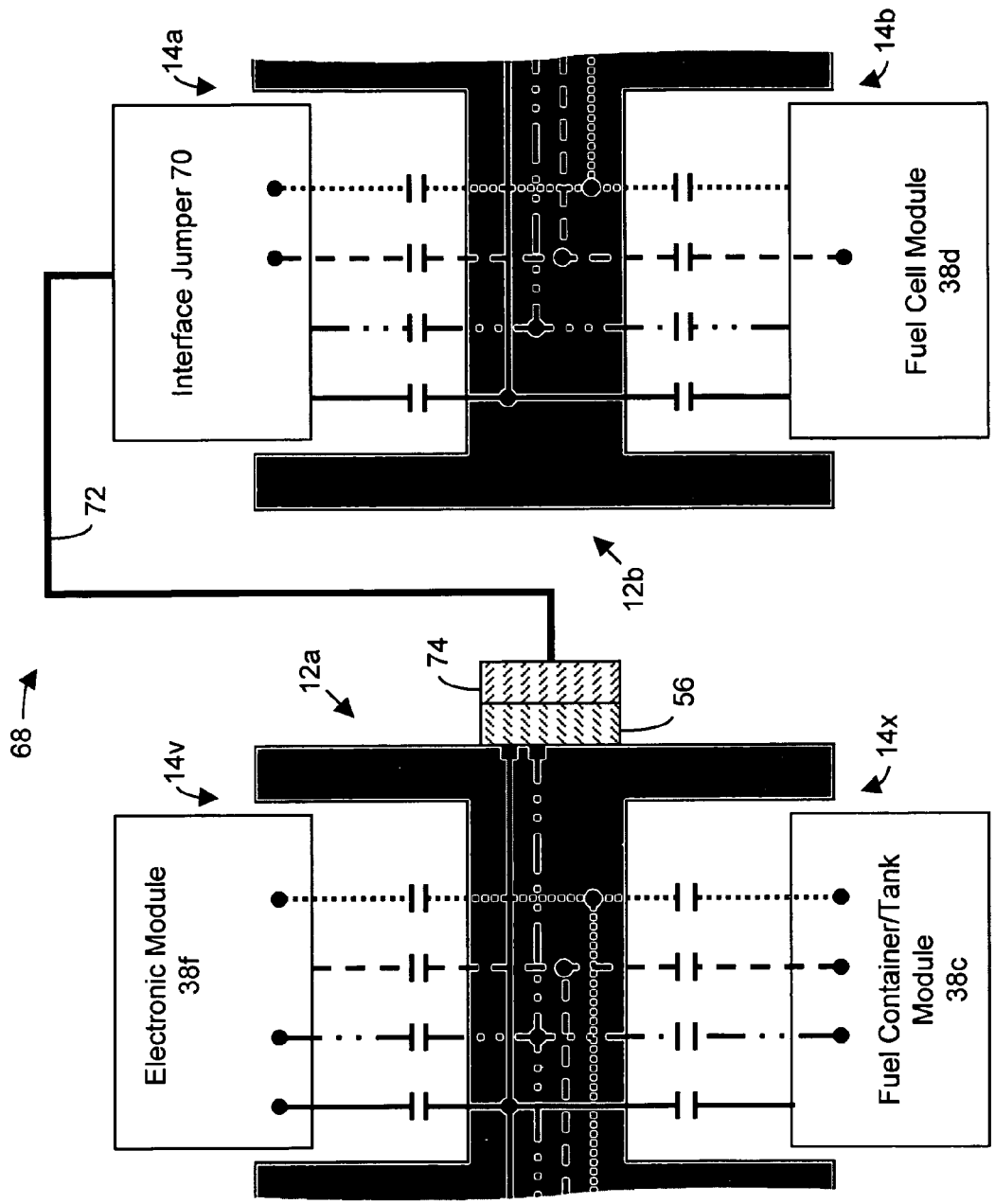

There are many different techniques and mechanisms to interconnect interface planes; all of which are intended to fall within the scope of the present inventions. For example, with reference to FIG. 39A-39C, in another embodiment, extension mechanism 68 includes interface jumper 70, bus 72 and connector 74. In this embodiment, interface jumper 70 may be disposed in module bay 14a of integration plane 12a and connector 74 engages and mates with external connector 56 disposed on integration plane 12a. As such, fluid, electrical and/or power management buses of integration planes 12a and 12b are interconnected. In this way, the fluid buses, the electrical buses and/or power management buses of integration planes 12a and 12b are, in effect, one common bus.

Figure 40A:
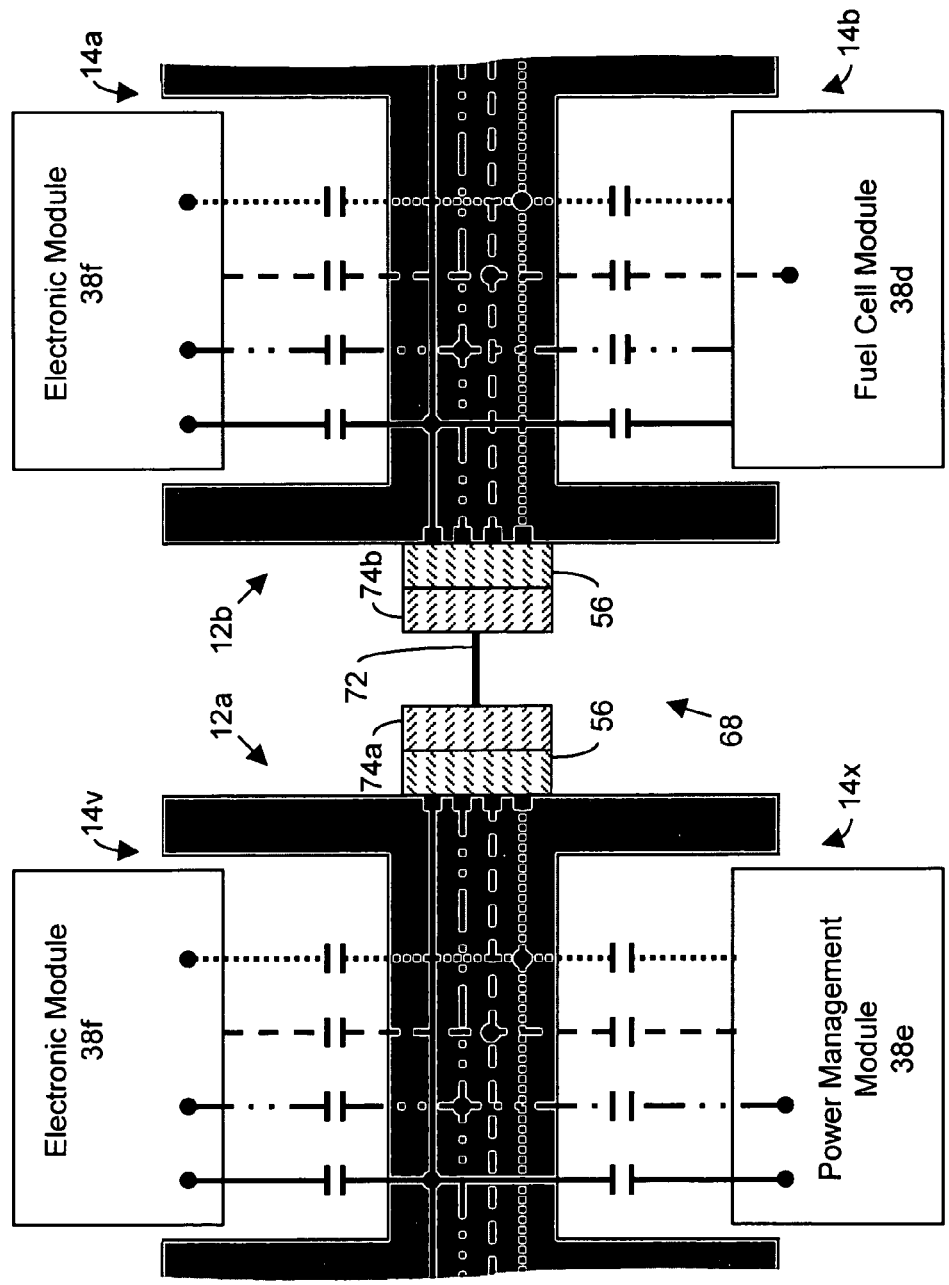
FIGS. 40A and 40B are block diagram representations of exemplary fuel cell systems including two integration planes, each having a plurality of technology modules populating the module bays, in conjunction with an extension mechanism having connectors disposed on each end of a bus wherein each connector engages and mates with an external connector disposed on the integration plane, according to exemplary embodiments of an aspect of the present inventions.
Figure 40B:
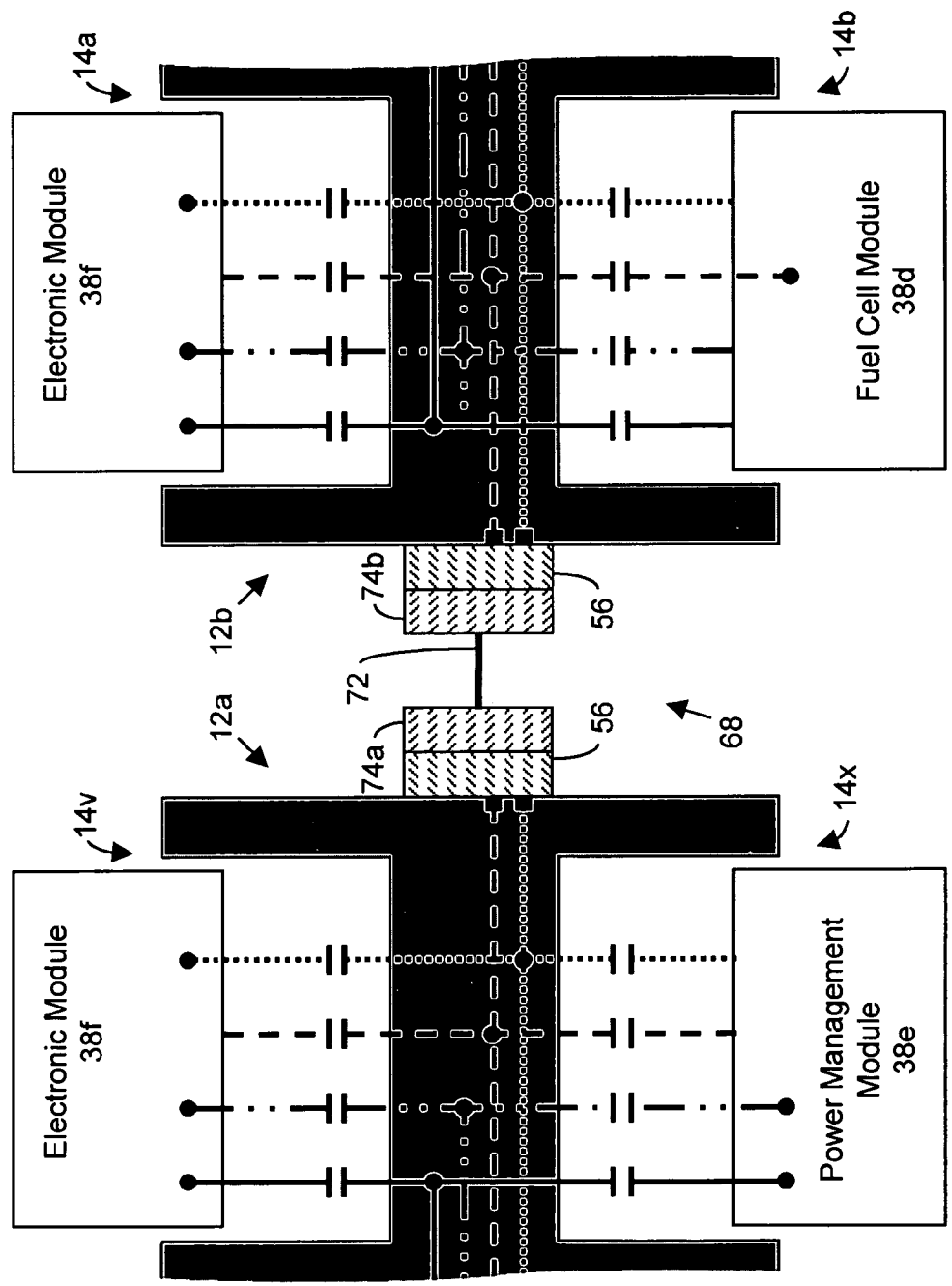

In another embodiment, with reference to FIGS. 40A and 40B, extension mechanism 68 includes connectors 74a and 74b disposed on the end of bus 72. In this embodiment, connectors 74a engages and mates with external connector 56 disposed on integration plane 12a and connector 74b engages and mates with external connector 56 disposed on integration plane 12b.

Figure 41A:
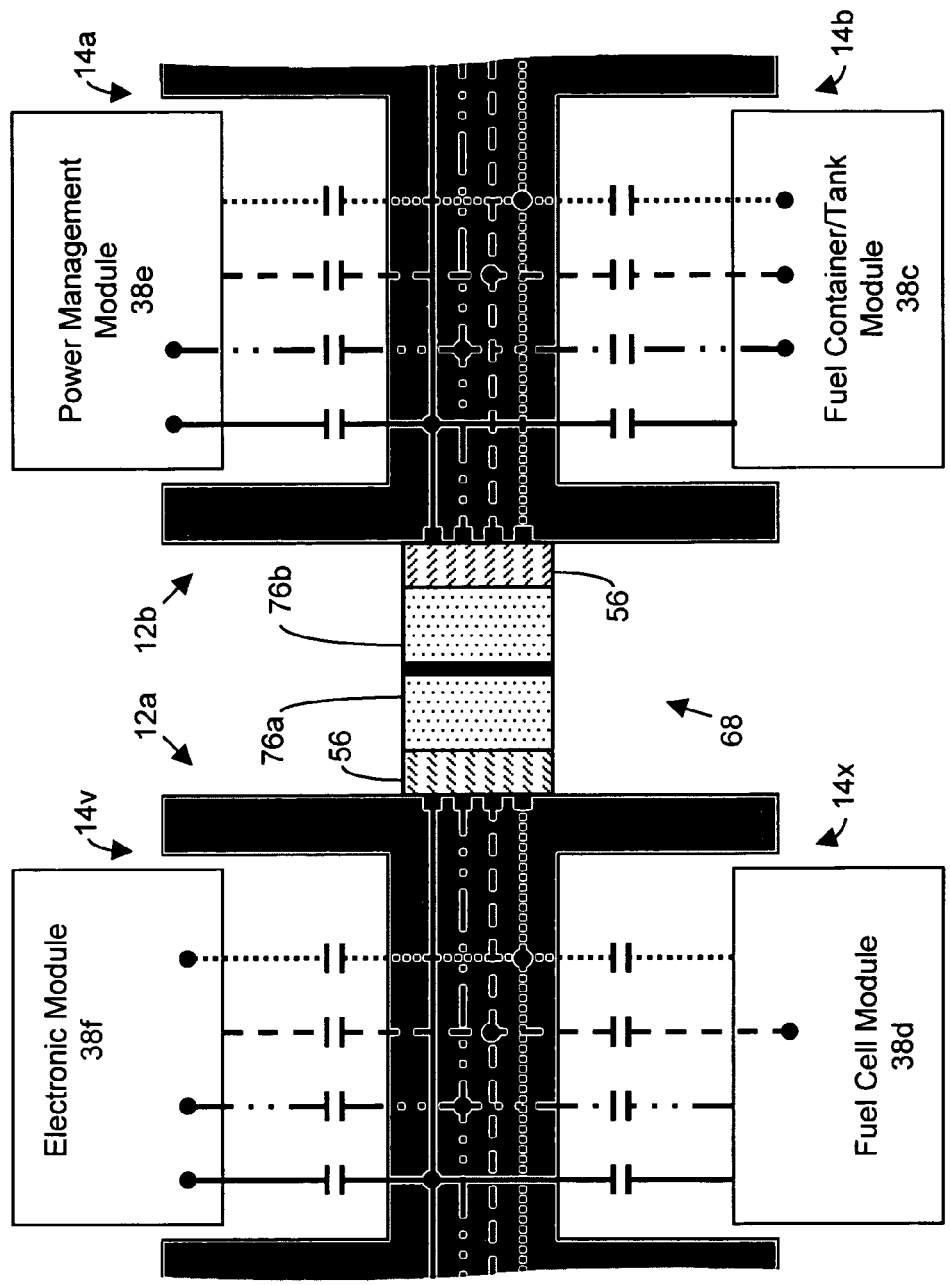
FIGS. 41A and 41B are block diagram representations of exemplary fuel cell systems including two integration planes, each having a plurality of technology modules populating the module bays, in conjunction with an extension mechanism having a doubled ended connector and an internal bus for interconnection of one or more buses of at least two integration planes, according to exemplary embodiments of an aspect of the present inventions.
Figure 41B:
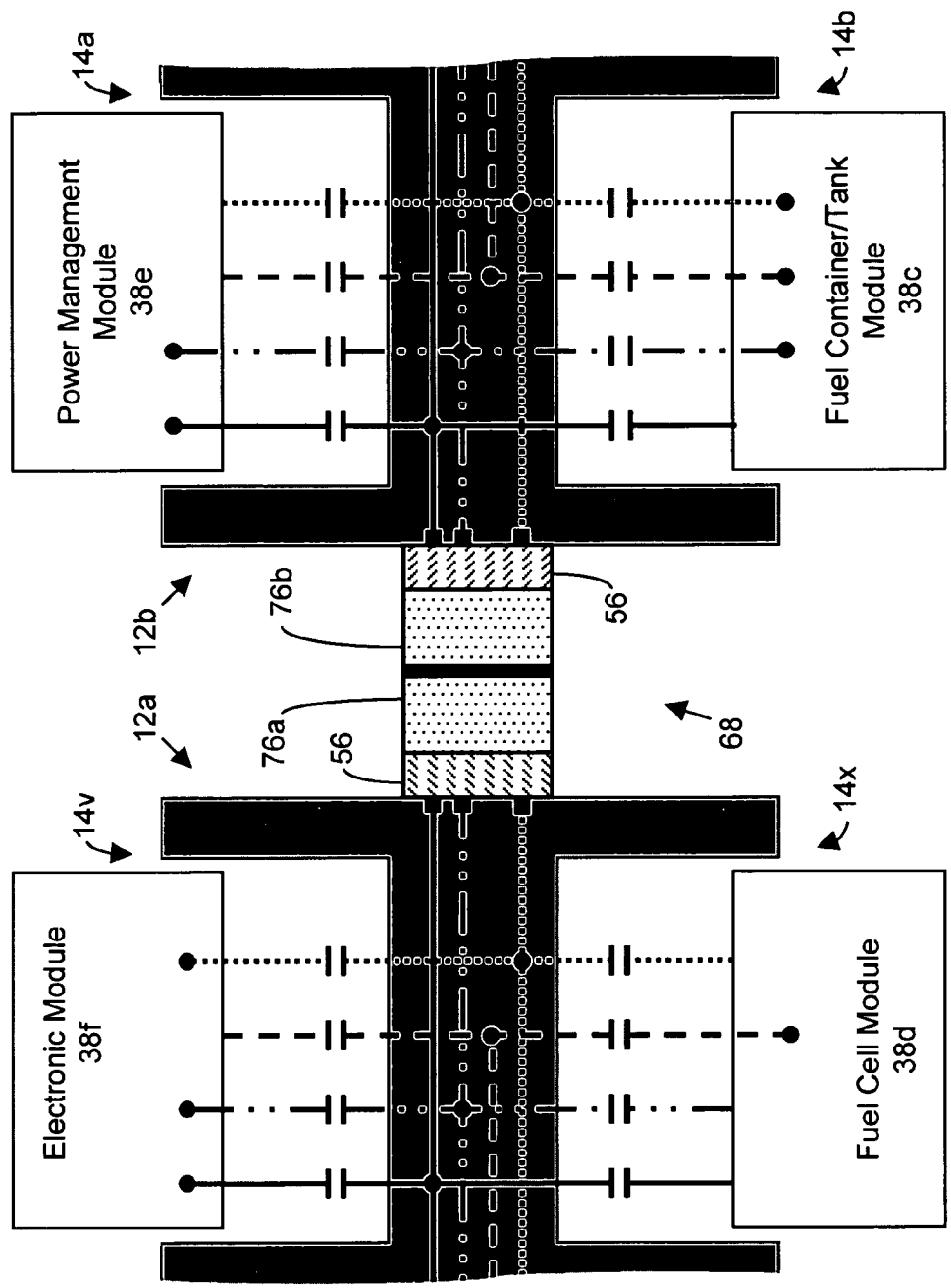

In yet another embodiment, with reference to FIGS. 41A and 41B, extension mechanism 68 includes double ended connector 76 having one or more buses disposed therein. In this embodiment, first end 76a of connector 76 engages and mates with external connector 56 disposed on integration plane 12a and second end 76b of connector 76 engages and mates with external connector 56 disposed on integration plane 12b.

Figure 42A:
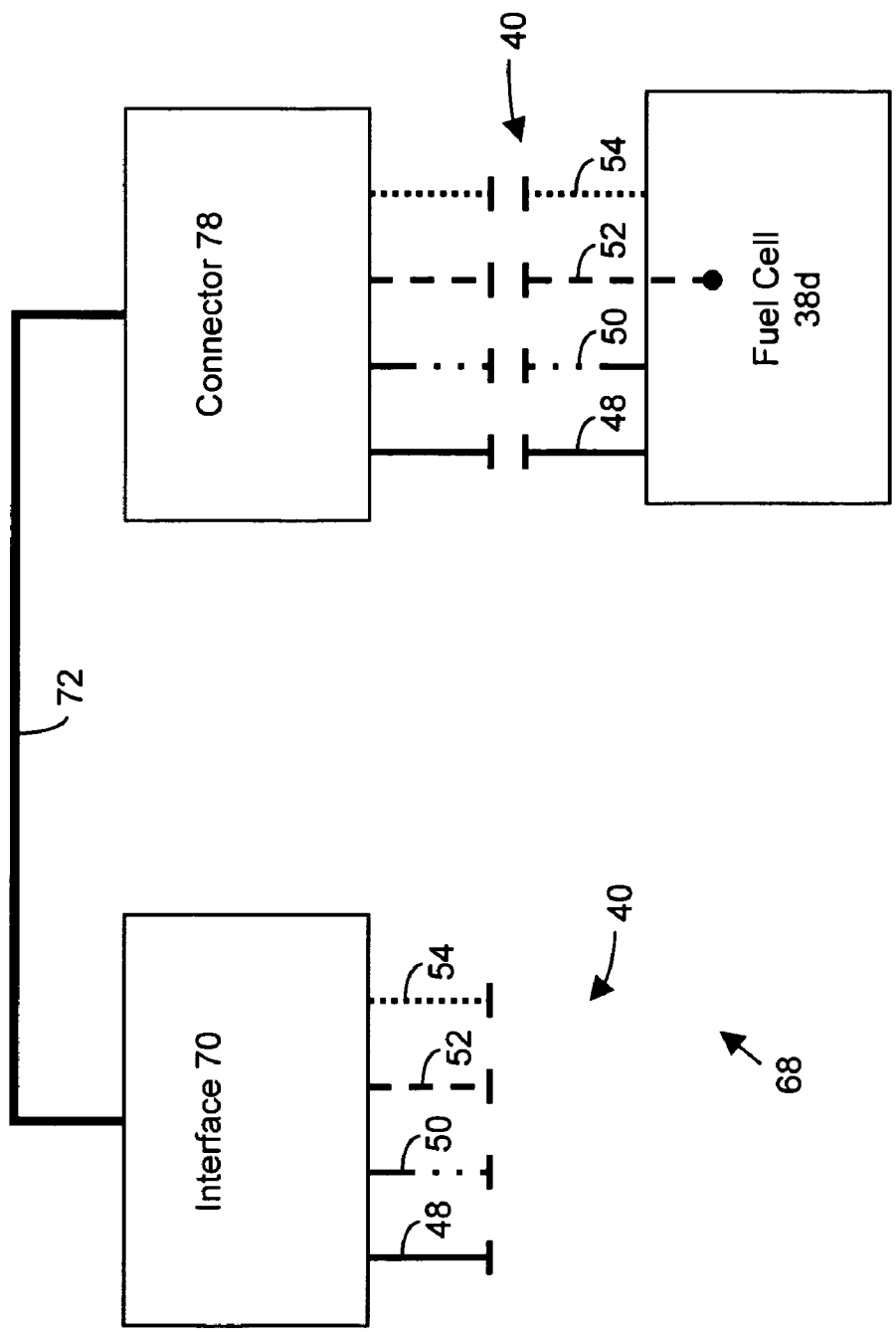
FIGS. 42A and 42B are block diagram illustrations of an extension mechanism (having an interface jumper for engaging and communicating with the fluid, electrical and/or power management bus of a integration plane) for interconnecting an integration plane and a technology module which is remote therefrom, according to exemplary embodiments of an aspect of the present inventions.
Figure 42B:
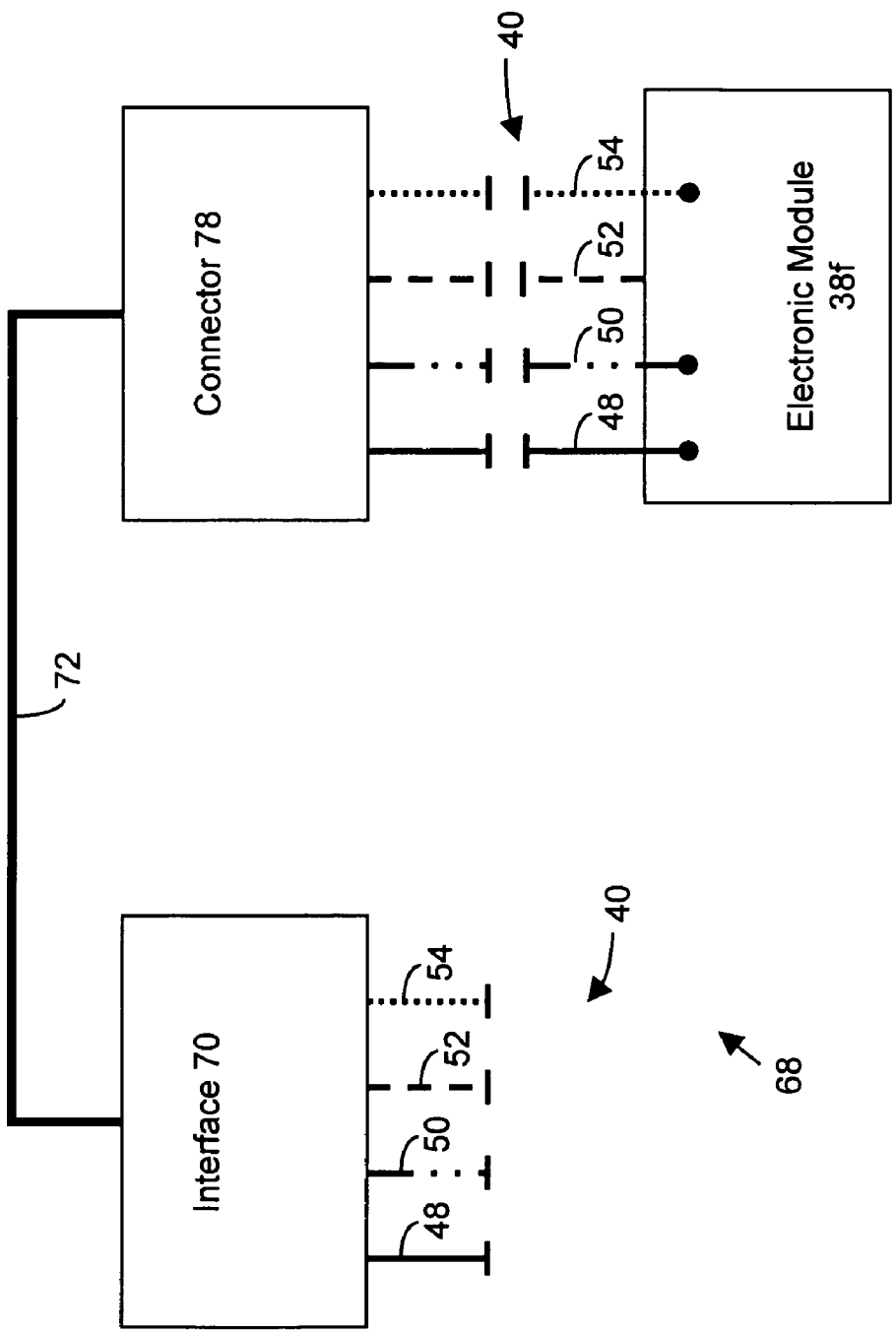

Indeed, in another embodiment, with reference to FIGS. 42A and 42B, extension mechanism 68 may interconnect an integration plane and a technology module. In this embodiment, the extension mechanism 68 includes interface jumper 70 for engaging and communicating with the fluid, electrical and/or power management bus of a integration plane (not illustrated) and a technology module 38 via connector 78 (in the illustrative embodiment of FIG. 42A, fuel cell module 38d, and in the illustrative embodiment of FIG. 42B, electronics module 38f). As such, the integration plane may be located remote from technology module 38 to accommodate various considerations and/or constraints, for example, size or dimension, operating characteristics, and/or functionality of the technology module. Indeed, in this embodiment, the technology module may be an external type unit that includes size or dimension, operating characteristics, and/or functionality which are the same as or different from a technology module.

Notably, as mentioned above, in certain embodiments, extension mechanism 68 may not interconnect or connect to all of the buses. (Compare FIGS. 36, 39A, 39B and 41A). For example, in the illustrative embodiment of FIG. 39C, extension mechanism 68 only interconnects the fluid bus of integration planes 12a and 12b. In the illustrative embodiment of FIG. 40B, extension mechanism 68 only interconnects electrical and power management buses of integration planes 12a and 12b. Further, in the illustrative embodiment of FIG. 41B, extension mechanism 68 only interconnects fluid and power management buses of integration planes 12a and 12b. In addition, where extension mechanism 68 is employed with, for example, fuel cell module 38d, bus 72 of extension mechanism 68 may be configured to connect or interconnect the fluid and power management buses. (See, for example, FIG. 42A). Similarly, where extension mechanism 68 is employed with, for example, electronics module 38f, bus 72 of extension mechanism 68 may be configured to connect or interconnect electrical bus. (See, for example, FIG. 42B).

Figure 43:
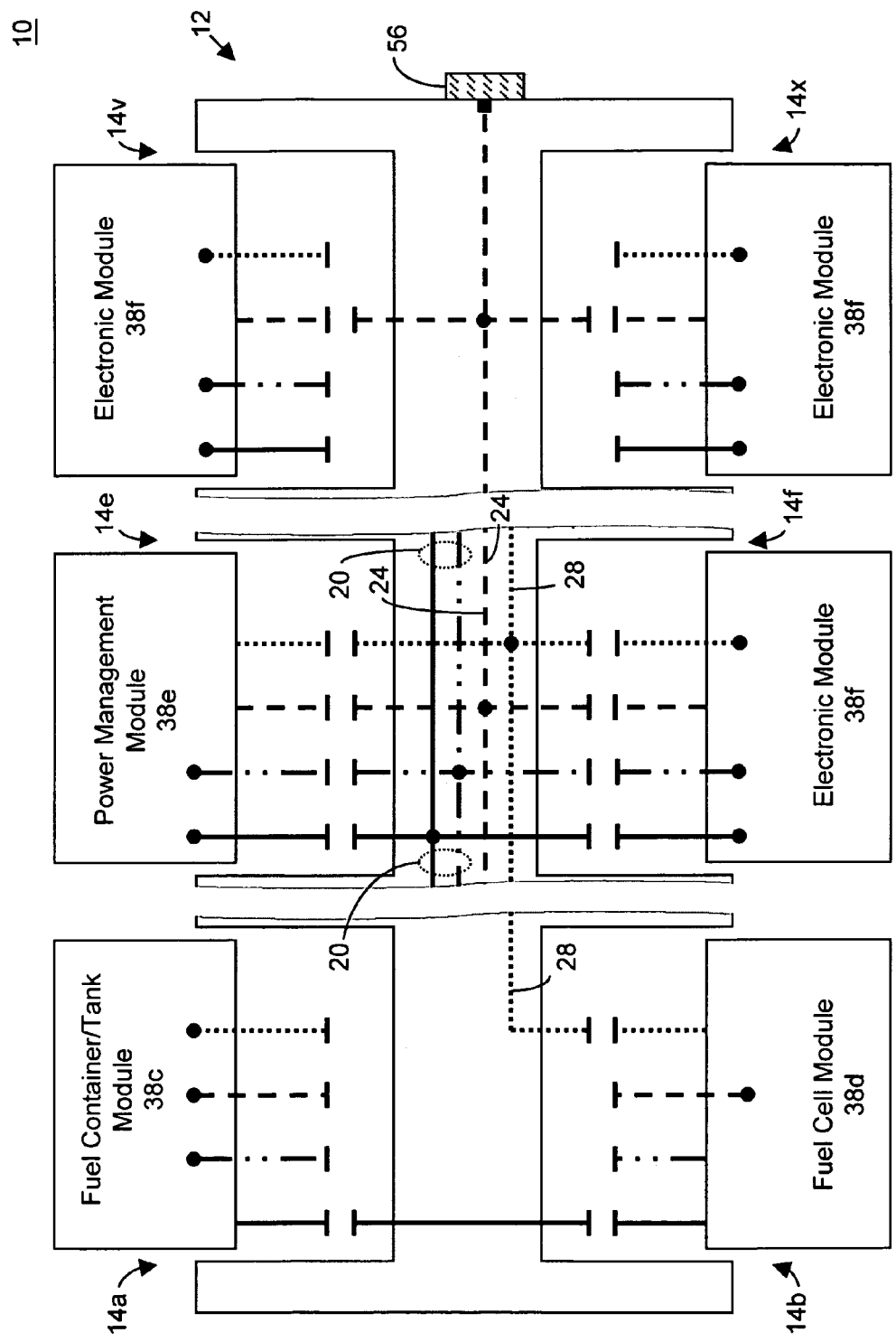
FIG. 43 is a block diagram representation of an exemplary fuel cell system including an integration plane, having a plurality of module bays wherein one or more of the module bays include non-standard interfaces, and a plurality of technology modules, each having standard interfaces, which populate the plurality of module bays of the integration plane, according to an exemplary embodiment of an aspect of the present inventions.
Figure 44:
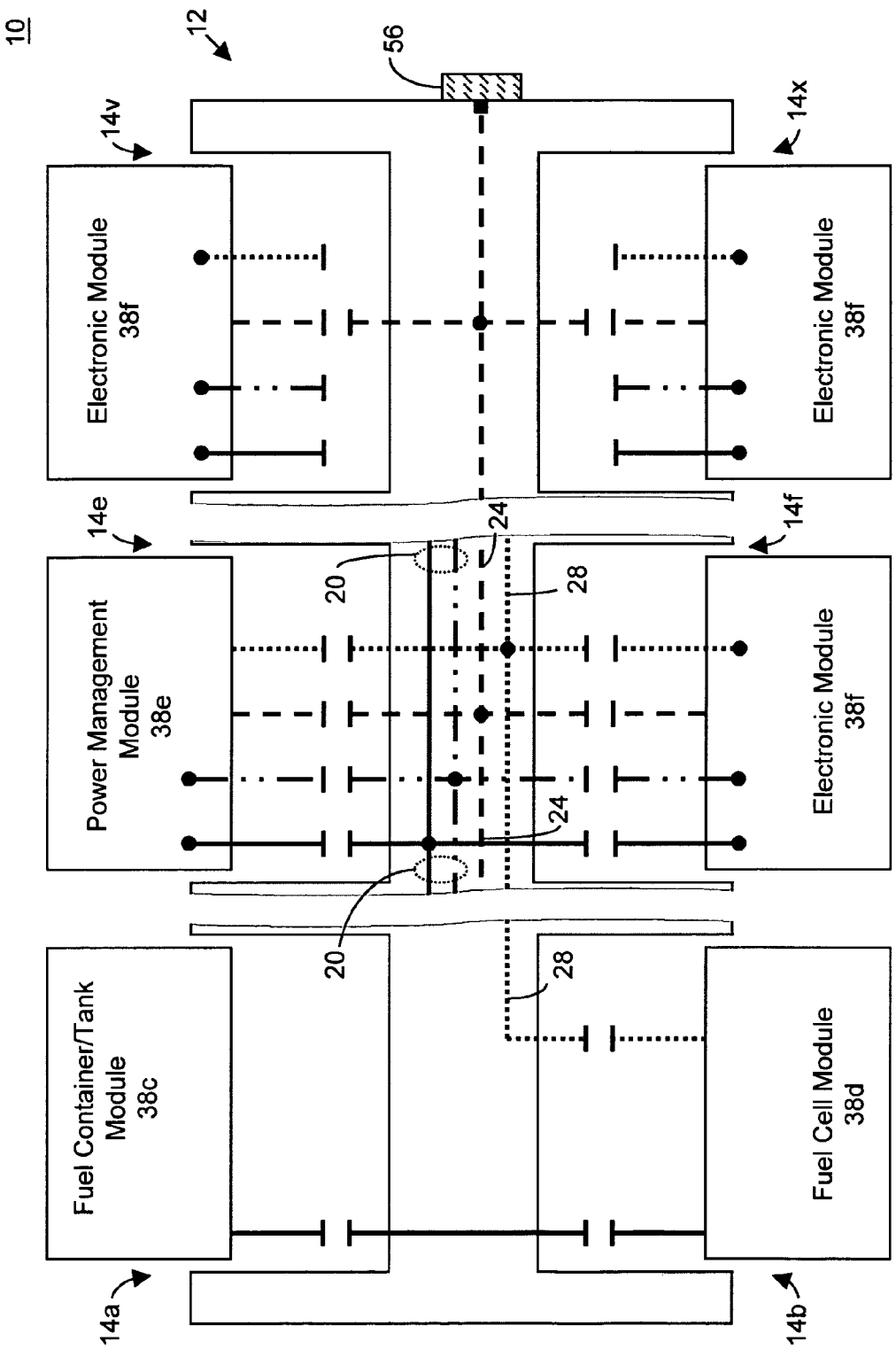
FIG. 44 is a block diagram representation of an exemplary fuel cell system including an integration plane, having a plurality of module bays wherein one or more of the module bays include non-standard interfaces, and a plurality of technology modules, having standard and non-standard interfaces, which populate the plurality of module bays of the integration plane, according to an exemplary embodiment of an aspect of the present inventions.
Figure 45:
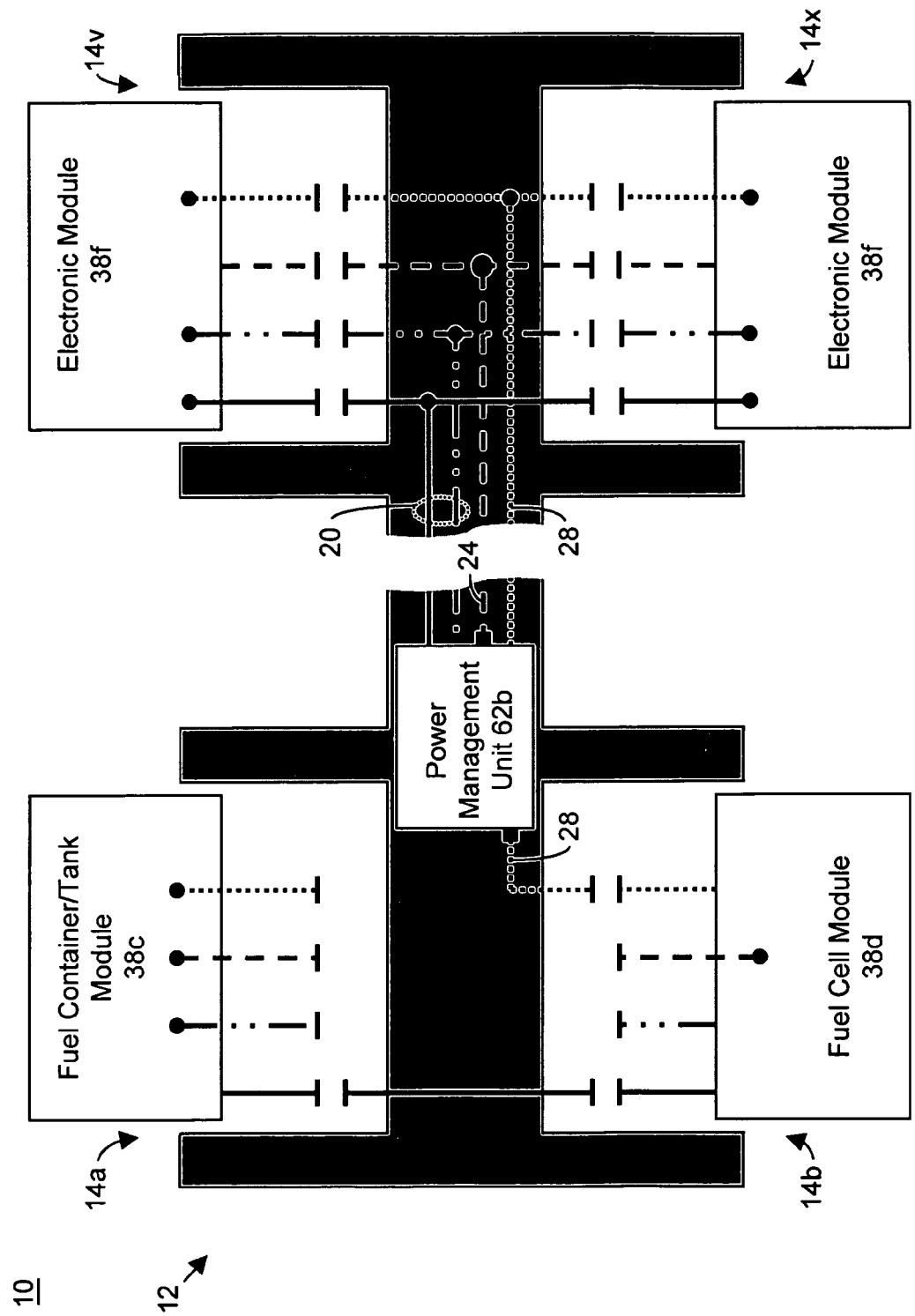
FIG. 45 is a block diagram representation of an exemplary fuel cell system including an integration plane, having a resident power management unit and a plurality of module bays wherein one or more of the module bays include non-standard interfaces, and a plurality of technology modules, each having standard interfaces, which populate the plurality of module bays of the integration plane, according to an exemplary embodiment of an aspect of the present inventions.
Figure 46:
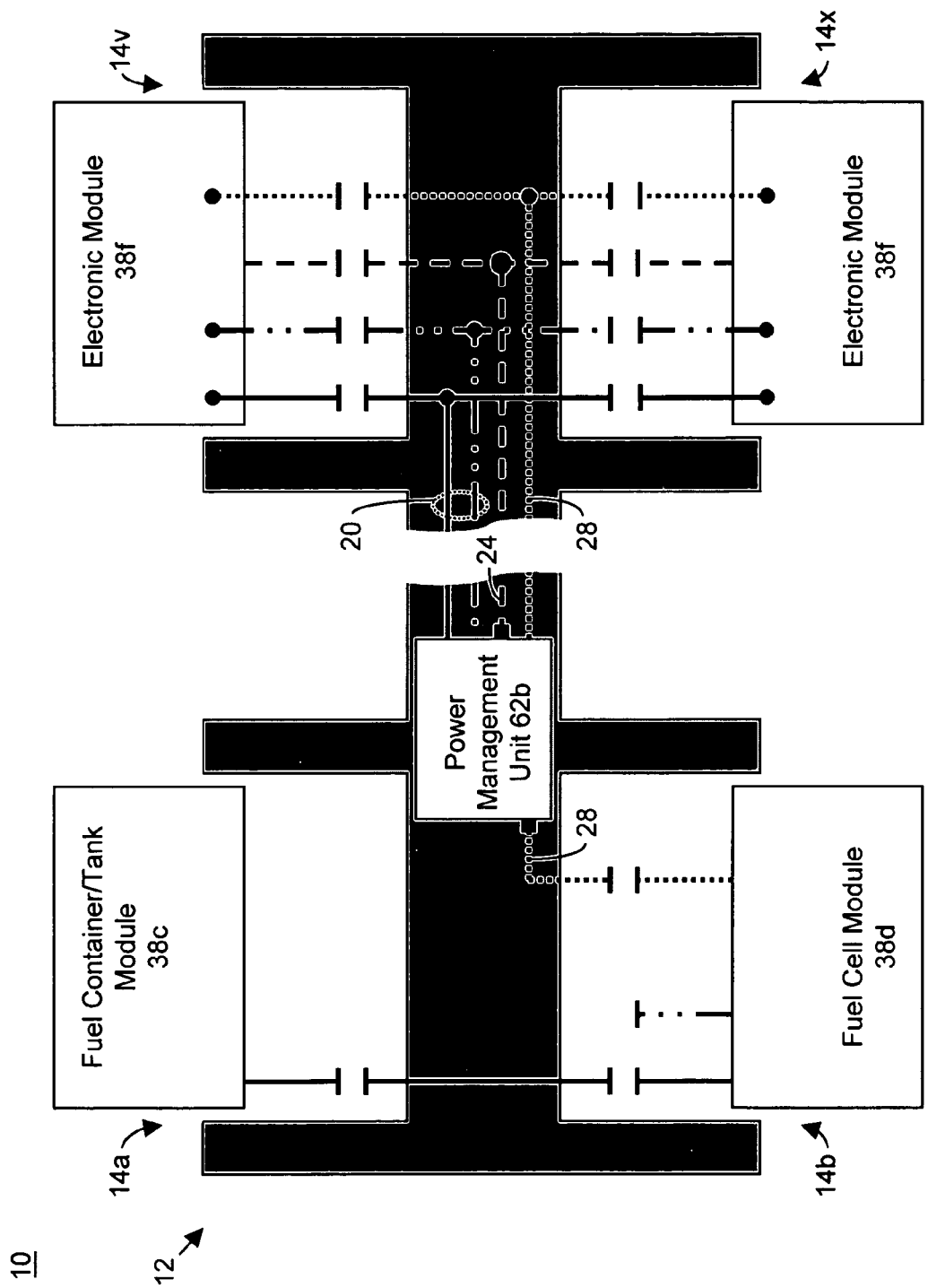
FIG. 46 is a block diagram representation of an exemplary fuel cell system including an integration plane, having a resident power management unit and a plurality of module bays wherein one or more of the module bays include non-standard interface, and a plurality of technology modules, having standard and non-standard interfaces, which populate the plurality of module bays of the integration plane, according to an exemplary embodiment of an aspect of the present inventions.
Figure 47:
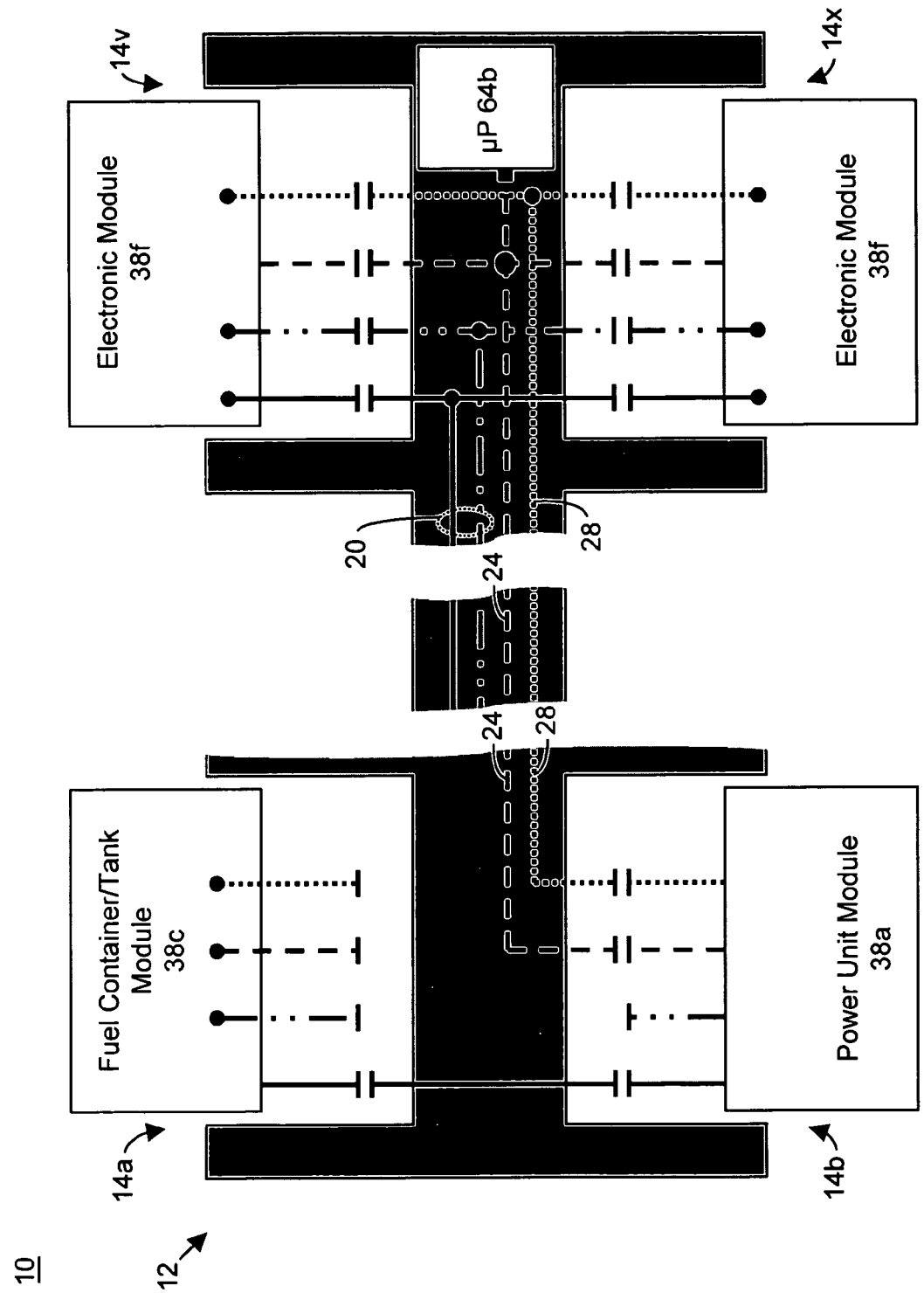
FIG. 47 is a block diagram representation of an exemplary fuel cell system including an integration plane, having a resident processor and a plurality of module bays wherein one or more of the module bays include non-standard interface, and a plurality of technology modules, having standard interfaces, which populate the plurality of module bays of the integration plane, according to an exemplary embodiment of an aspect of the present inventions.
Figure 48:
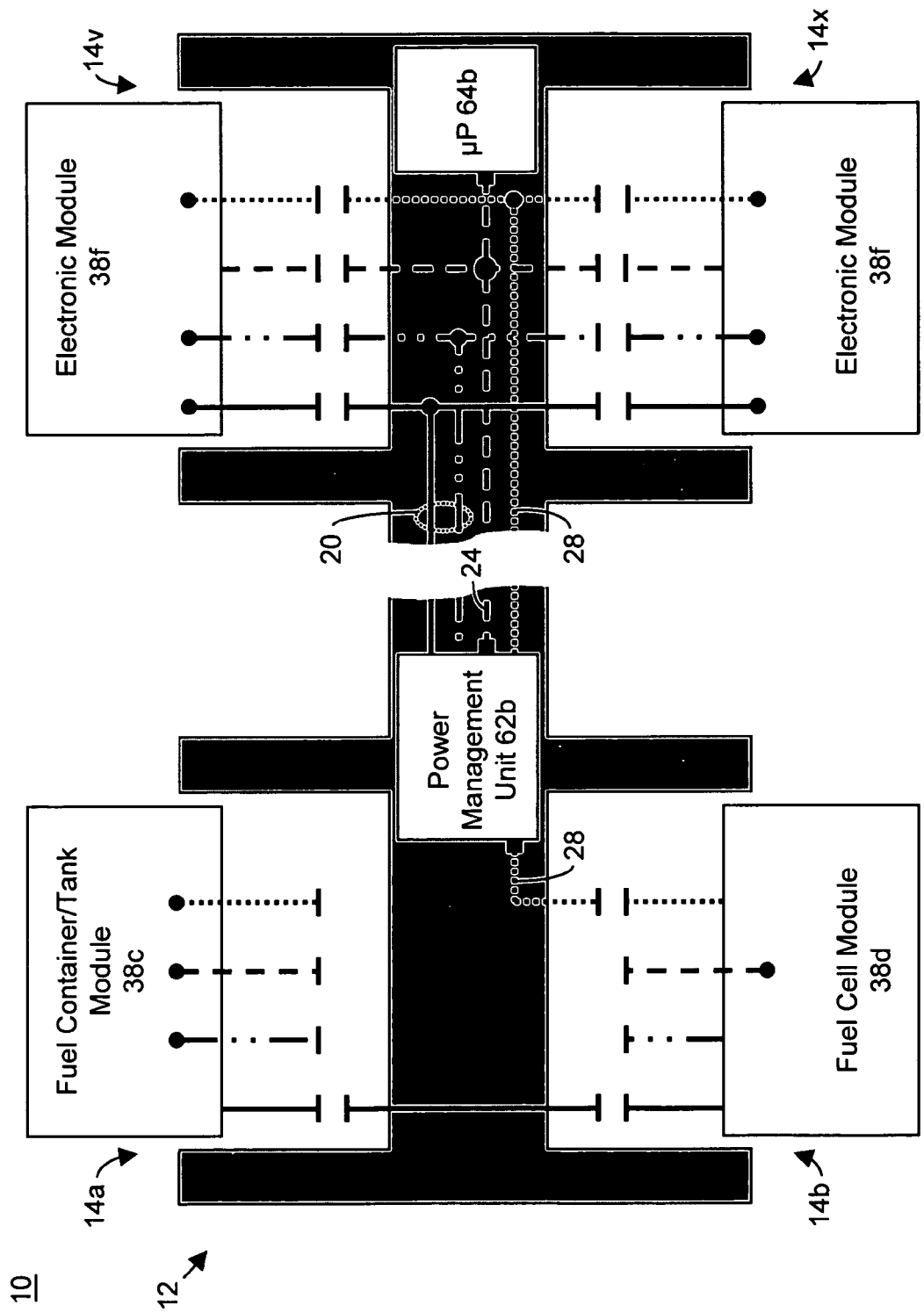
FIG. 48 is a block diagram representation of an exemplary fuel cell system including an integration plane, having a resident power management unit, resident processor and a plurality of module bays wherein one or more of the module bays include non-standard interface, and a plurality of technology modules, having standard interfaces, which populate the plurality of module bays of the integration plane, according to an exemplary embodiment of an aspect of the present inventions.
Figure 49A:
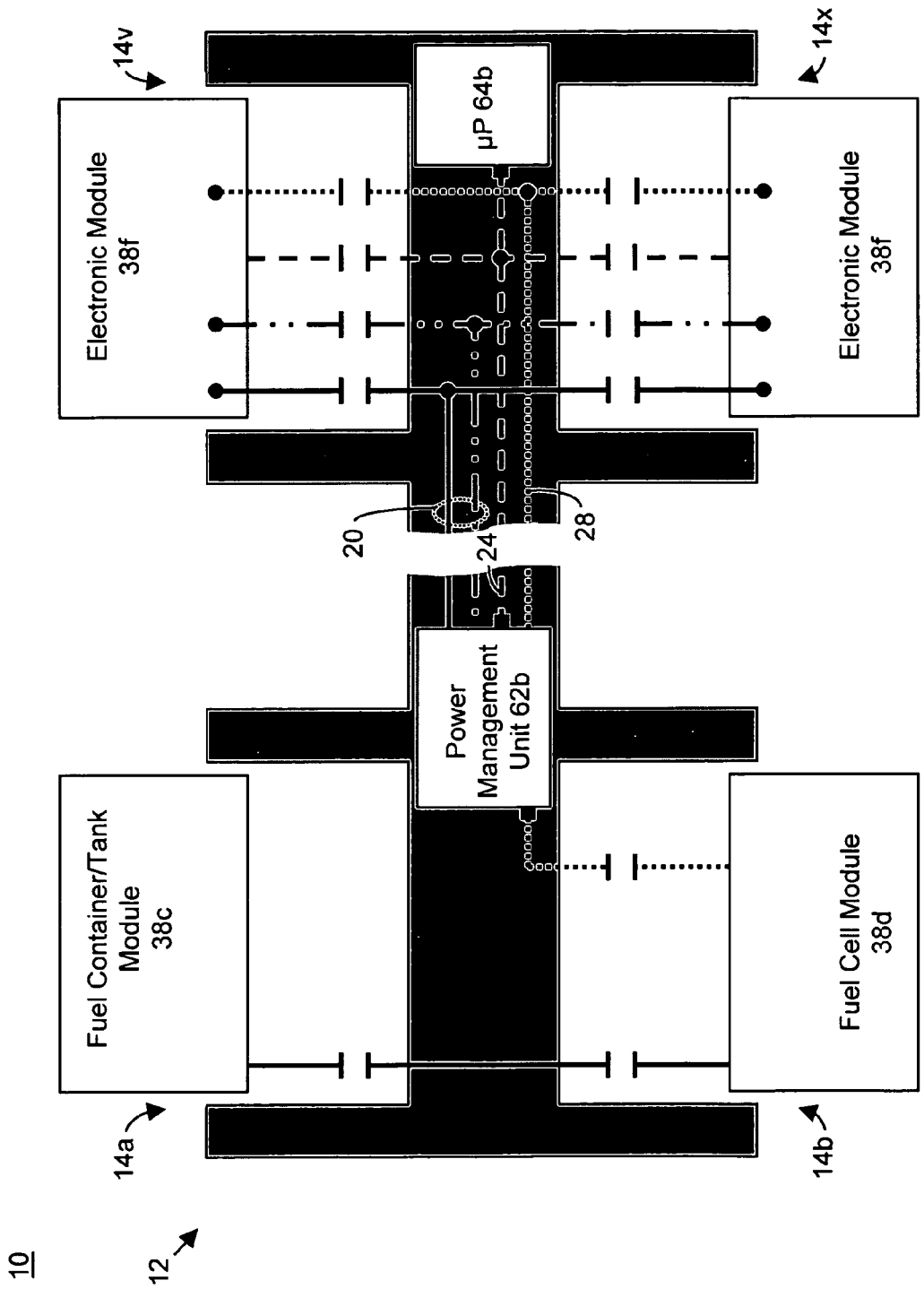
FIGS. 49A-49C are block diagram representations of exemplary fuel cell systems including an integration plane, having a resident power management unit, resident processor and a plurality of module bays wherein one or more of the module bays include non-standard interface, and a plurality of technology modules, having standard and non-standard interfaces, which populate the plurality of module bays of the integration plane, according to exemplary embodiments of an aspect of the present inventions.
Figure 49B:
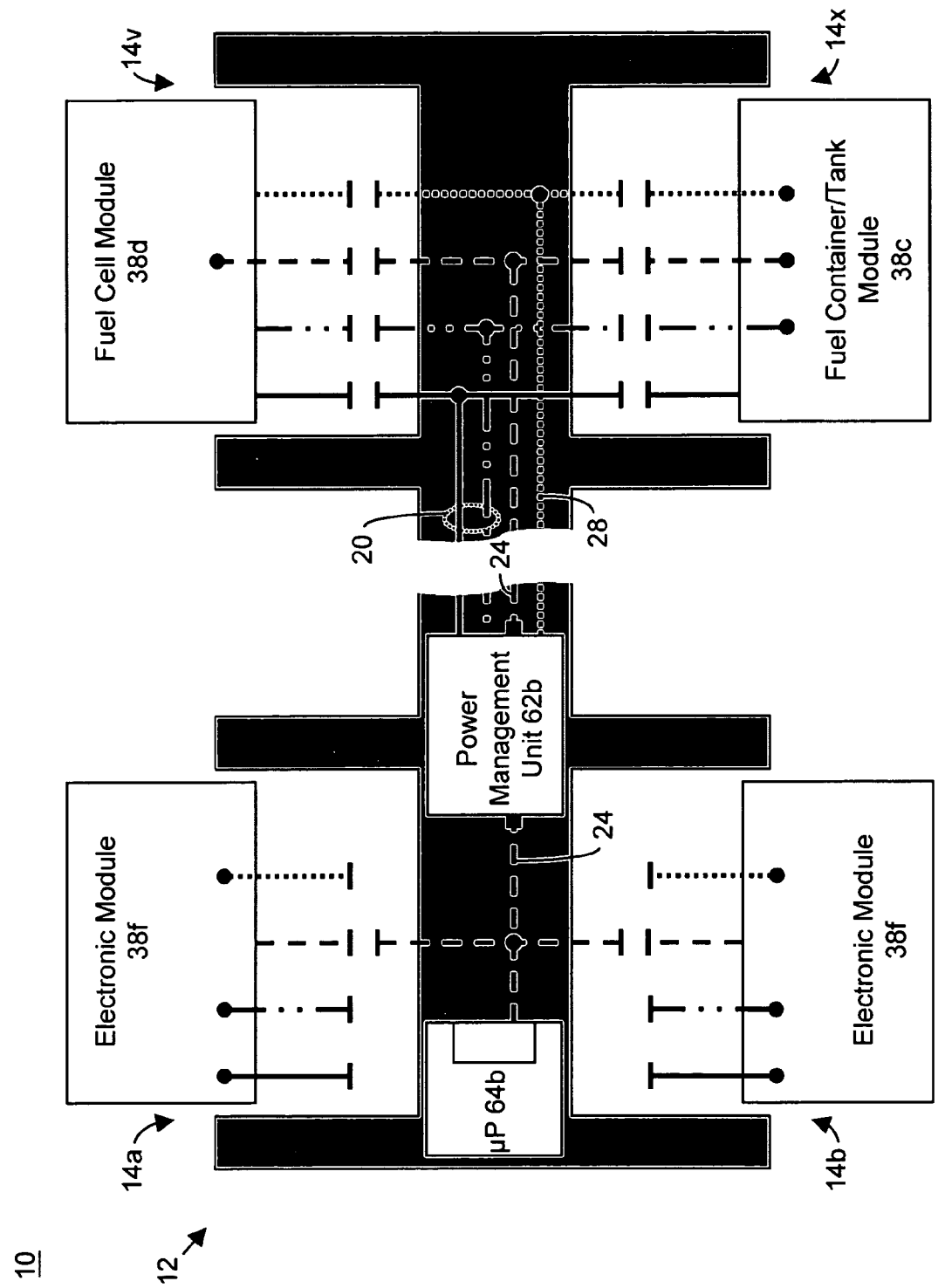
Figure 49C:
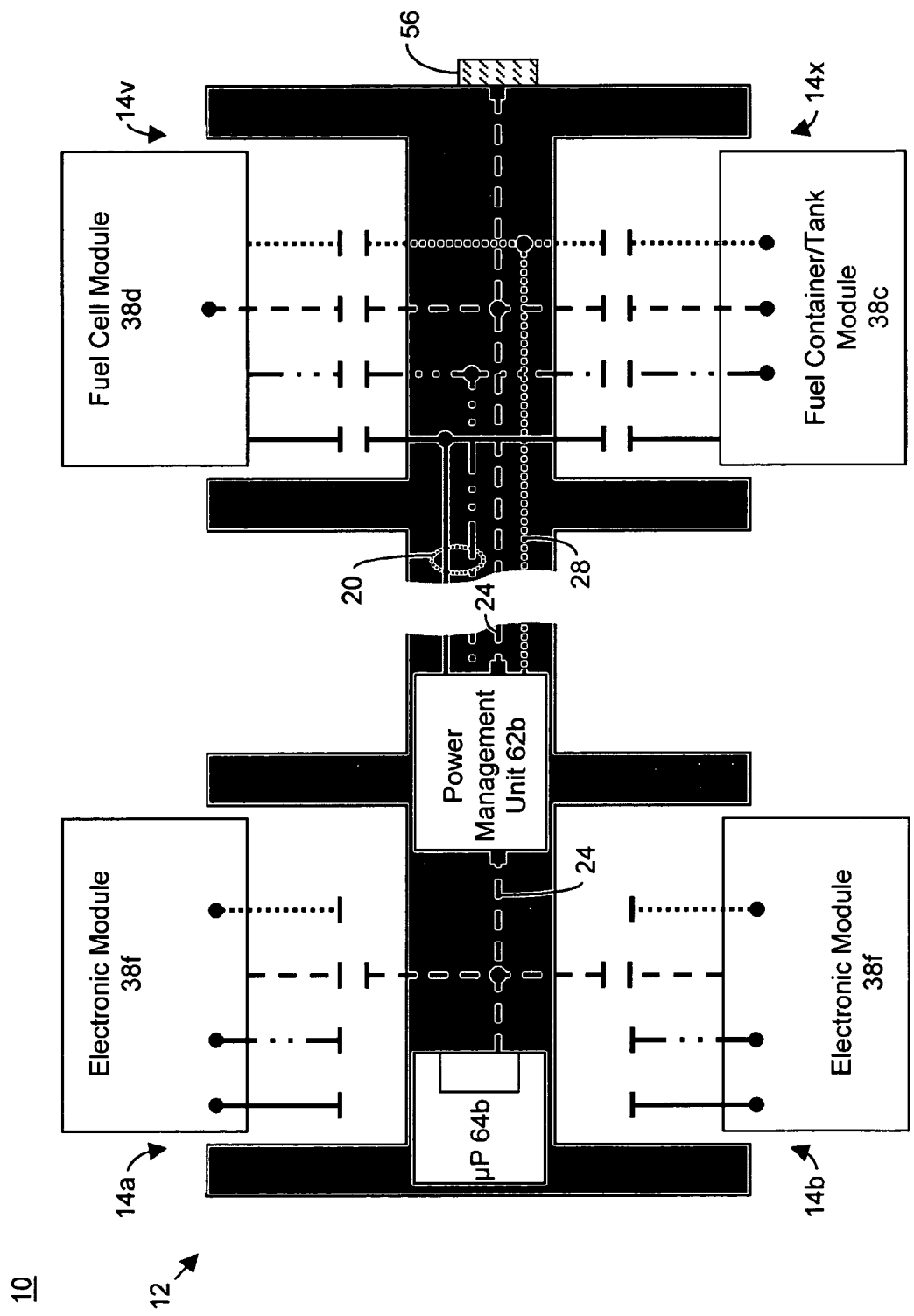
Figure 50:
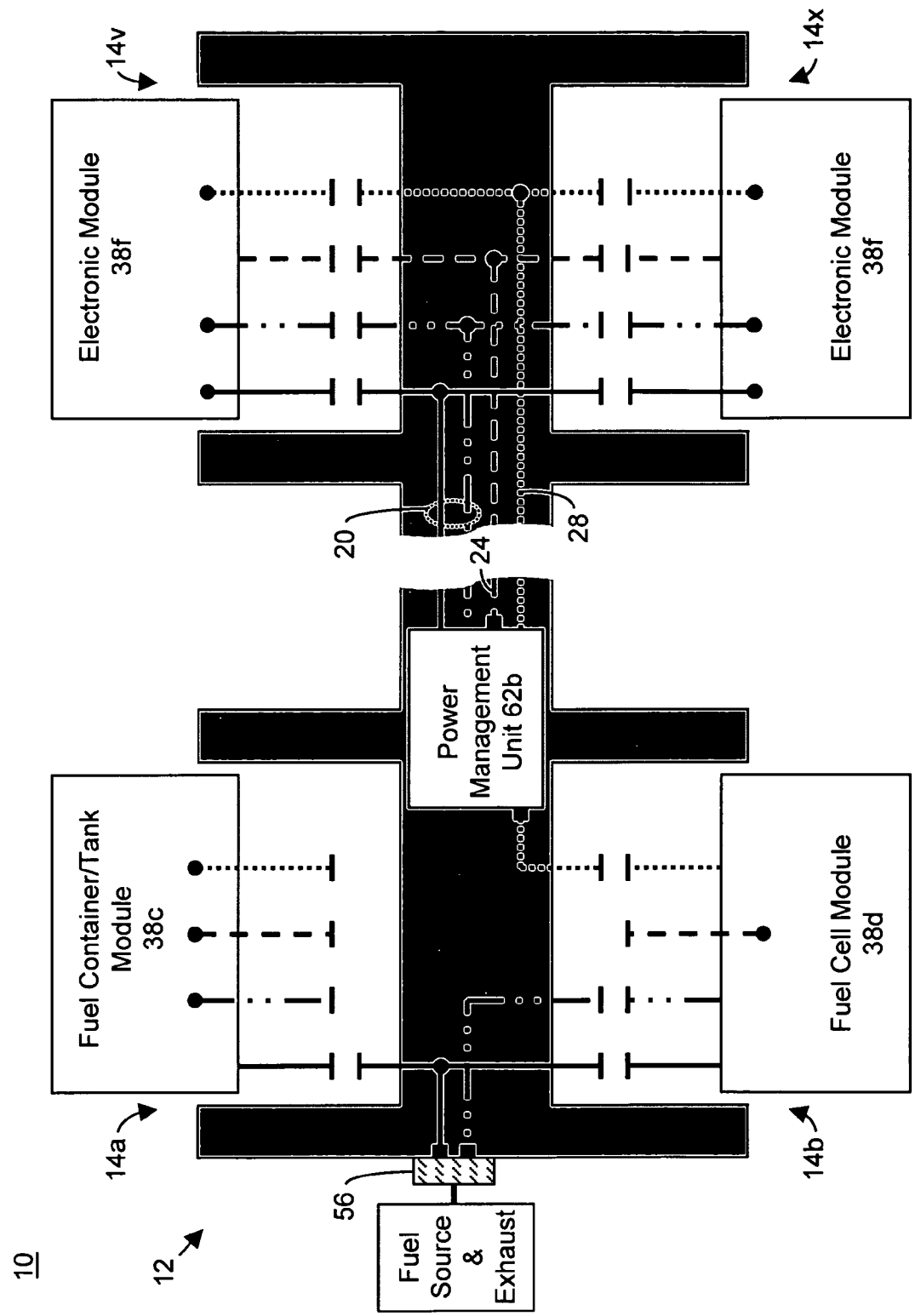
FIG. 50 is a block diagram representation of an exemplary fuel cell system including an integration plane, having an external connector, a resident power management unit and a plurality of module bays wherein one or more of the module bays include non-standard interface, and a plurality of technology modules, having standard interfaces, which populate the plurality of module bays of the integration plane, according to an exemplary embodiment of an aspect of the present inventions.
Figure 51:
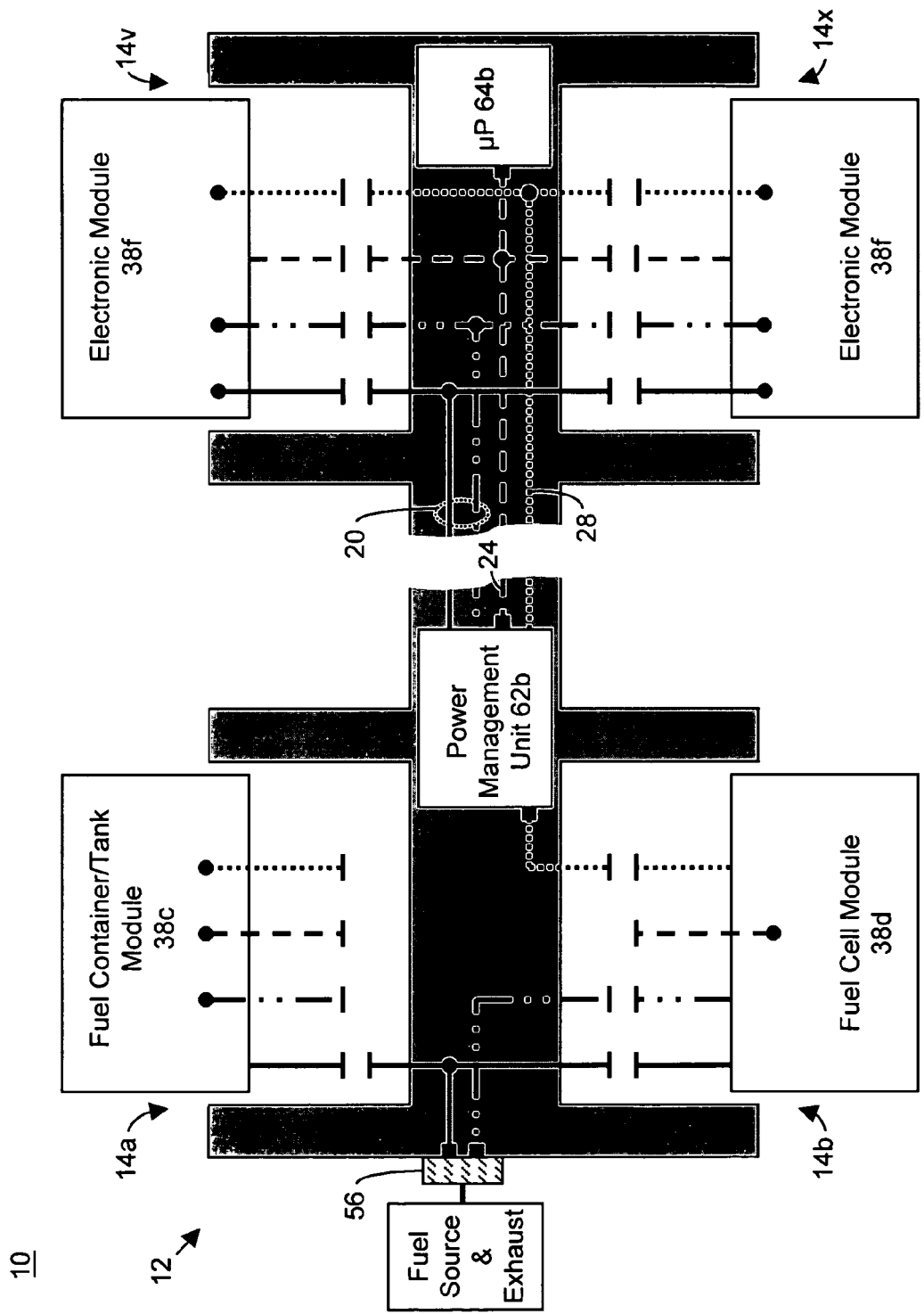
FIG. 51 is a block diagram representation of an exemplary fuel cell system including an integration plane, having an external connector, a resident power management unit, a resident processor, and a plurality of module bays wherein one or more of the module bays include non-standard interface, and a plurality of technology modules, having standard interfaces, which populate the plurality of module bays of the integration plane, according to an exemplary embodiment of an aspect of the present inventions.
Figure 52:
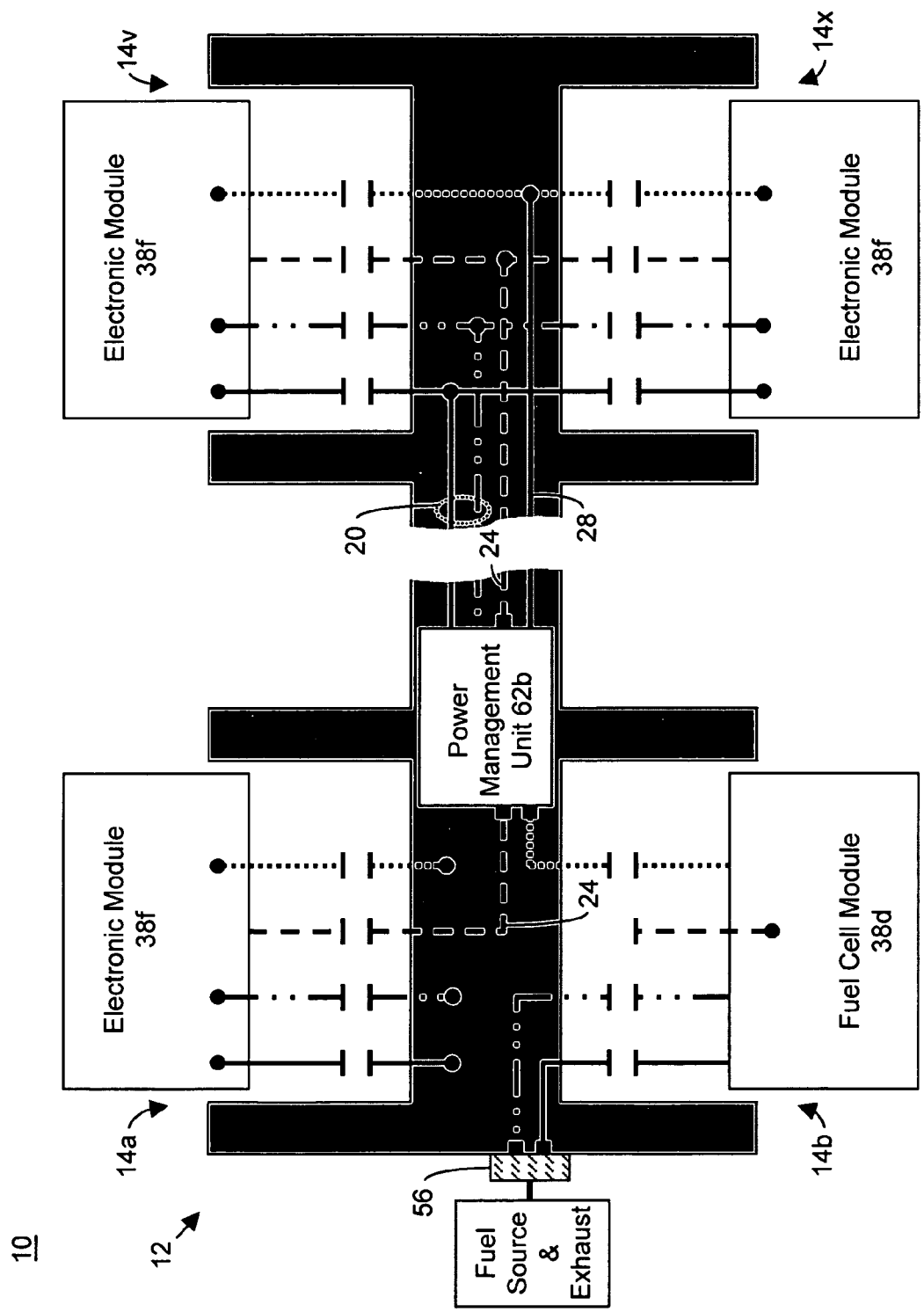
FIG. 52 is a block diagram representation of an exemplary fuel cell system including an integration plane, having an external connector, a resident power management unit, and a plurality of module bays wherein one or more of the module bays include non-standard interface, and a plurality of technology modules, having standard interfaces, which populate the plurality of module bays of the integration plane, according to an exemplary embodiment of an aspect of the present inventions.

As mentioned above, each module bay may include a standard interface which is coupled to fluid, electrical and power management buses, or a unique or non-standard interface, for example, an interface which is designed for a particular technology module, or where one of the fluid, electrical and/or power management interfaces is omitted thereby providing a unique module bay for a particular technology module. For example, with reference to FIG. 43, in one embodiment, modular fuel cell power system 10 includes module bays 14a, 14b, 14v and 14x, which include non-standard interfaces, and module bays 14e and 14f, which include standard interfaces. The technology modules 38 that populate module bays 14 may include standard interfaces 40 (FIG. 43) and/or non-standard interfaces (FIG. 44). The technology modules that include unique interfaces may be, for example, customized to the requirements and/or functionality of a given technology module. For example, the unique interface may omit one of the fluid, power management and/or electrical interfaces and/or may include a non-standard fluid, power management and/or electrical interface. (See, for example, fuel container/tank module 38c in FIG. 44) The unique interface may be specially designed for a particular technology module to facilitate communication with the integration plane, which includes a counterpart or associated specially designed unique interface, to "mate" with the unique interface of the technology module.

Notably, the standard and non-standard interface embodiments may be incorporated with any of the other embodiments and/or inventions described herein. For example, modular fuel cell power system 10 may include integration plane 12 having resident technology unit(s) (for example, resident power management unit 62b and/or resident processor 64b) (see for example, FIGS. 45-52), external connectors 56 (see, for example, FIGS. 43, 44, 49C, 50 and 51), and combinations thereof. For the sake of brevity, such discussions will not be repeated but are incorporated here by reference.

There are many inventions described and illustrated herein. While certain embodiments, features, materials, configurations, attributes and advantages of the inventions have been described and illustrated, it should be understood that many other, as well as different and/or similar embodiments, features, materials, configurations, attributes, structures and advantages of the present inventions that are apparent from the description, illustration and claims (are possible by one skilled in the art after consideration and/or review of this disclosure). As such, the embodiments, features, materials, configurations, attributes, structures and advantages of the inventions described and illustrated herein are not exhaustive and it should be understood that such other, similar, as well as different, embodiments, features, materials, configurations, attributes, structures and advantages of the present inventions are within the scope of the present invention.

For example, although much of the description and illustrations hereof is in the context of a fuel cell power generation, the present inventions may employ any form of power generation, including, for example, solar, hydrocarbon-based (i.e., gas or diesel) and battery. As such, the present inventions are not limited to systems having or employing fuel cell power. Indeed, all forms of power generation are intended to fall within the scope of the present inventions. Moreover, the present inventions may employ multiple forms of power generation (for example, (1) fuel cell and battery, (2) solar and battery, (3) fuel cell and solar, or (4) fuel cell, solar and battery). Such forms of power generation may be deployed in one or more of bays 14 of integration plane 12 and/or one or more external connectors 56.

As mentioned above, electronic module 38f may be any type of electronic or electrical device that interfaces with at least one portion of the electrical bus 24 of integration plane 12. For example, electronic module 38f may include a control unit, sensing unit (for example, temperature, video and/or audio), and/or communication unit having, for example, router circuitry that facilitates communication to, for example, an intranet (private or public) or the internet. Moreover, although not specifically illustrated, electronic module 38f may interface with fluid bus 20 (for example, to implement cooling functions) and/or power management bus 28 (for example, to monitor the power generating functions).

Figure 53F:
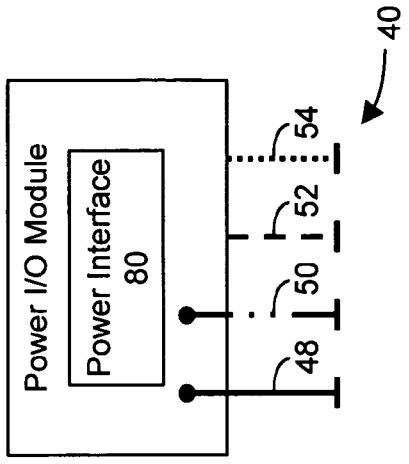
FIG. 53F is a block diagram representation of an exemplary power I/O module including an interface to communicate with the electrical and power management interfaces of a module bay of the integration plane (notably, in this exemplary embodiment, the fluid interface is terminated)
Figure 53E:
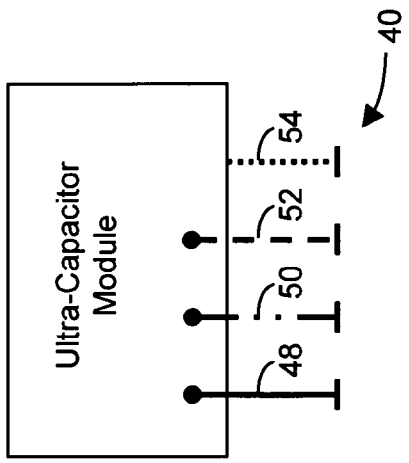
FIG. 53E is a block diagram representation of an exemplary ultra-capacitor module including an interface to communicate with the power management interface of a module bay of the integration plane (notably, in this exemplary embodiment, the fluid and electrical interfaces are terminated)
Figure 53G:
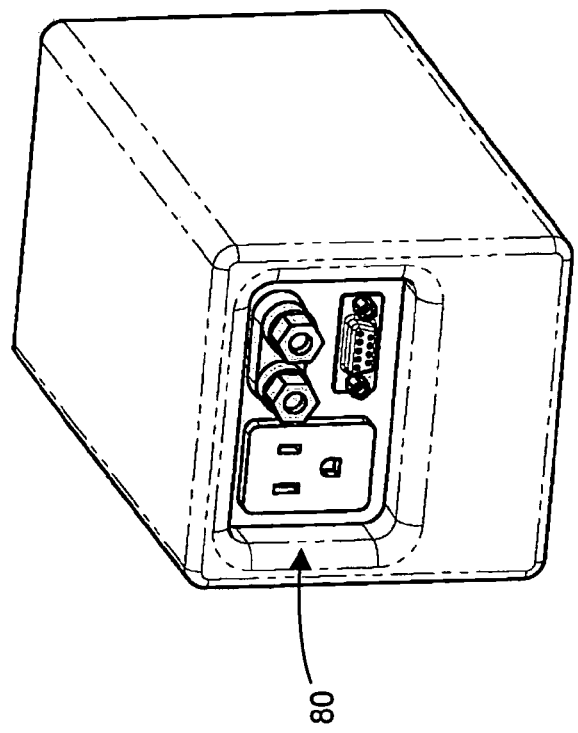
FIG. 53G illustrates an exemplary power I/O module including a power interface to provide and/or receive conditioned electrical power, according to an embodiment of an aspect of the present inventions.

Moreover, as mentioned above, technology module 38 may be any type of technology whether now known or later developed. The modules 38 described and illustrated herein, for example, FIGS. 6A-6G, are exemplary. As stated repeatedly herein, other types of technologies are suitable. For example, the present inventions may employ a reformer/electrolyzer module (see, for example, FIG. 53A), a solar power module (see, for example, FIG. 53B), a first battery power module (see, for example, FIG. 53C), a second battery power module (see, for example, FIG. 53D), an ultra-capacitor module (see, for example, FIG. 53E) and a power I/O module (see, for example, FIG. 53F). Again, technology module 38 may implement, employ and/or deploy any type of technology whether now known or later developed.

Briefly, in one embodiment, the reformer/electrolyzer module (see, FIG. 53A) may provide hydrogen (or other fuel source) to fuel container/tank module 38c and/or fuel cell module 38d. In this embodiment, fuel bus provides for two way communication of fluid/fuel. In this way, a module disposed in a bay 14 and/or a unit (for example, external fuel source 58) connected to, for example, external connector 56 and/or extension mechanism 68 may provide fluid/fuel to one or more modules populating bays in integration plane 12.

The first and second battery power modules (see, FIGS. 53C and 53D, respectively) may provide a source of electrical power and, in certain embodiments, include circuitry to provide for monitoring, managing and/or controlling the operation of the power source. As such, the battery power module may be coupled to certain portions of the electrical bus that permit such monitoring, managing and/or controlling. (See, for example, FIG. 53D).

The power I/O module may receive and/or provide conditioned power (for example, 110V AC or 220V AC). In one embodiment, the power I/O module includes a power interface 80 which is coupled to electrical bus 24 (via, in particular, in one embodiment, power connector 52c) when, for example, installed in module bay 14 and connected to an external connector 66 and/or extension mechanism 68. The power interface 80 includes an interface and/or circuitry to receive conditioned power as well as provide conditioned power. (See, for example, 53G). The power I/O module may also provide power management functions, which are discussed above in connection with, for example, power management module 38e. (See, for example, FIG. 53F wherein the power I/O module is illustrated as being connected to power management interface 46, as well as FIGS. 20B and 20C wherein power management module 38e includes a power interface 80).

Notably, where the power source is a fuel cell based system, it may be advantageous to employ a hydrogen fuel cell electricity generation device capable of supplying electricity for a longer period of time than conventional batteries. Moreover, it may be advantageous to employ a standardized hydride storage cartridge that can readily be provided and secured to a fuel cell system to supply hydrogen for conversion to electricity and to be provided and secured to a hydrogen refill unit to be rapidly refilled with hydrogen. Further it may be advantageous to include a hydrogen or hydride cartridge that provides a relatively accurate readout of its state-of-fill so that a user knows how much energy is available from the cartridge.

In addition, it will be recognized by one skilled in the art in view of this disclosure that a fuel cartridge 100 may be integrated into the integrated modular BSP/MEA/manifold plates and compliant contacts for fuel cells as described in International Publication No. WO02/19451A2, which is incorporated herein by reference. Moreover, the fault tolerant fuel cell network power system of U.S. patent application Ser. No. 10/382,549 filed Mar. 5, 2003 may also be modified in accordance with the teachings of this invention to include fuel cartridge 100 of this invention into the system described therein. For the sake of brevity, those discussions will not be repeated. Indeed, another fuel cell system in which a hydride cartridge and other accessories may be integrated into is described in U.S. patent application Ser. No. 10/402,726 filed Mar. 28, 2003. These U.S. Patent Applications are incorporated herein by reference in their entirety.

Notably, technology modules 38 may perform multiple functions or operations. Under these circumstances, such a technology module may be considered either module or both modules. For example, a technology module may perform one or more functions or operations of a power management module and one or more functions or operations of an electronic module. That is, in this example, the technology module may be a power management module or an electronic module, and/or a power management module and electronic module.

Figure 54:
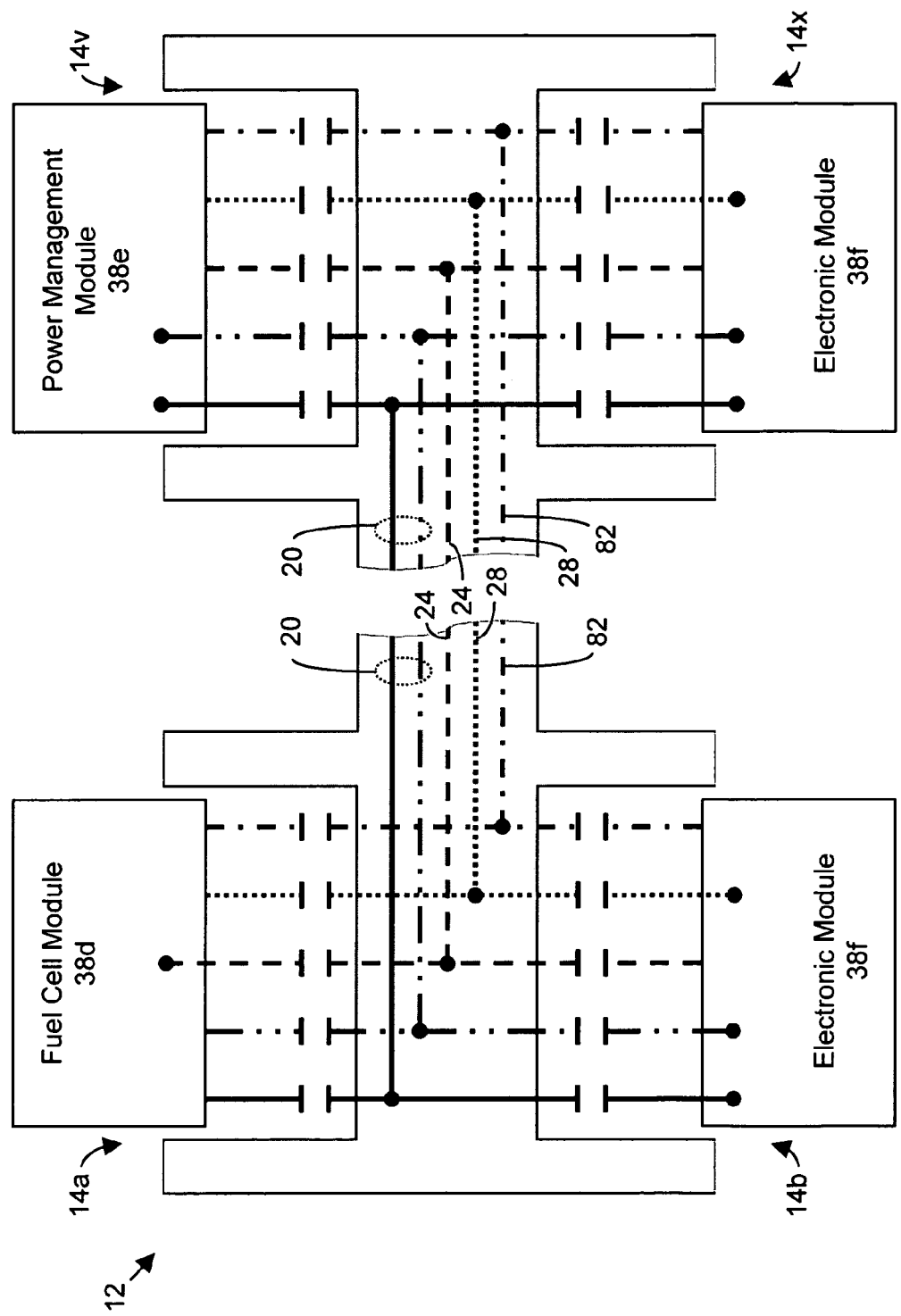
FIG. 54 is a block diagram representation of an exemplary fuel cell system including an integration plane, having a plurality of module bays, and a plurality of technology modules populating the module bays, according to an embodiment of an aspect of the present inventions.

Many modifications may be made to the interface of module bay 14 and/or technology module 38. All such modifications are intended to fall within the scope of the present invention. For example, with reference to FIG. 54, in one embodiment, module bay interface 16 includes an additional connector that is coupled to an additional bus, for example, bus 82 that is employed for temperature compensation, control, adjustment and/or management. In this regard, bus 82 may be employed by one or more modules 38 to provide or implement temperature control, adjustment and/or management techniques. For example, power management module 38e and/or electronics modules 38f may include a fluid (for example, water or other coolant) based temperature adjustment and/or management techniques to adjust, control and/or maintain the temperature of module 38, or portion(s) thereof. Any temperature control, adjustment and/or management technique, and apparatus to implement such technique, whether now known or later developed, is/are intended to fall within the scope of the present inventions.

Notably, bus 82 may be routed to one or more of module bays 14 and may provide a mechanism to eliminate or provide heat from one or more technology modules and/or resident technologies (for example, resident power management unit 62b and/or processor 64b). Any type or form of coolant, system and/or technique, whether now known or later developed, is intended to fall within the scope of the present inventions.

Figure 55A:
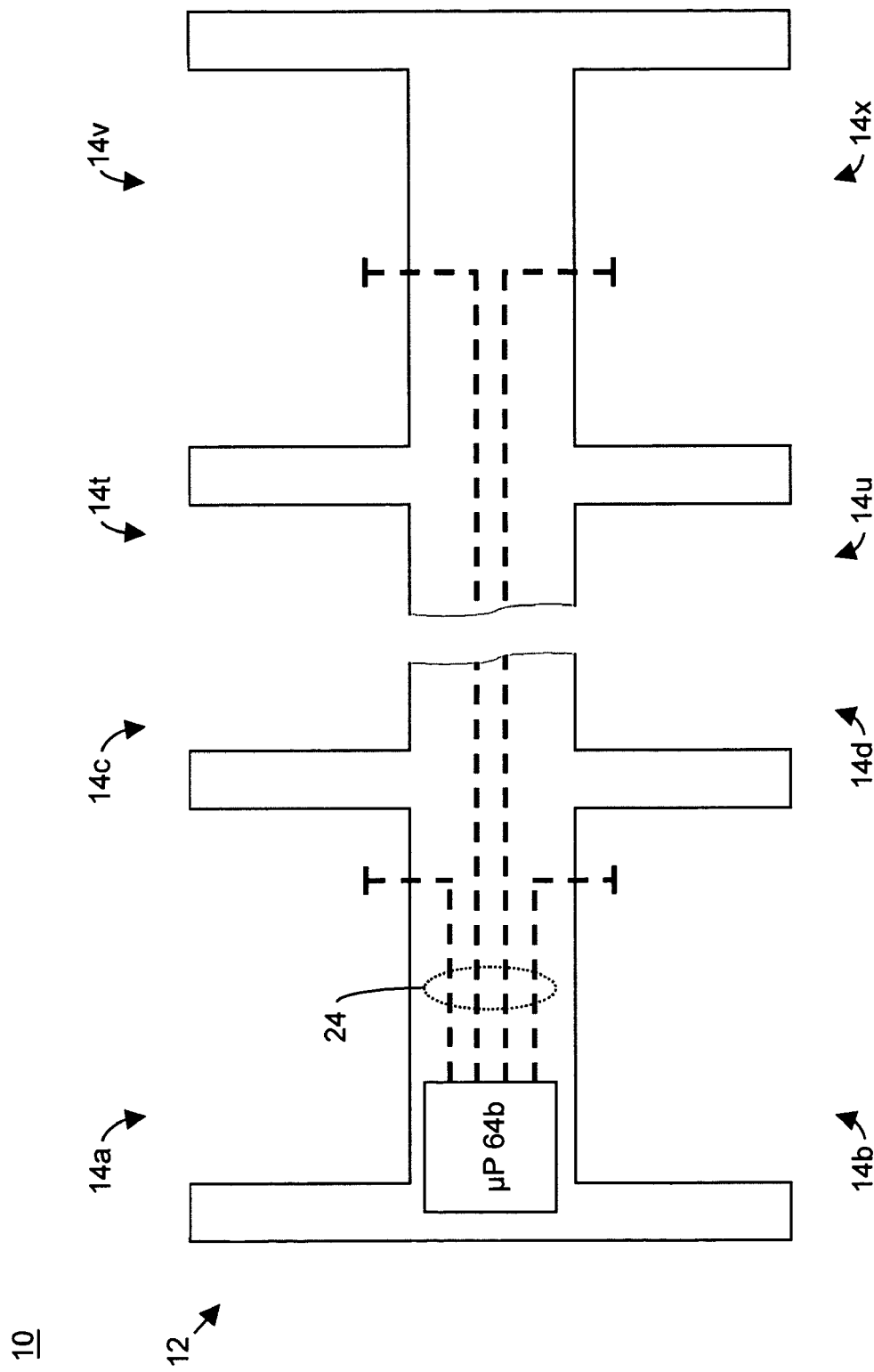
FIGS. 55A and 55B illustrate exemplary electrical buses of the integration plane, wherein each module bay of the integration plane includes a separate bus portion (for example, power, data and/or control), according to exemplary embodiments of the present invention.
Figure 55B:
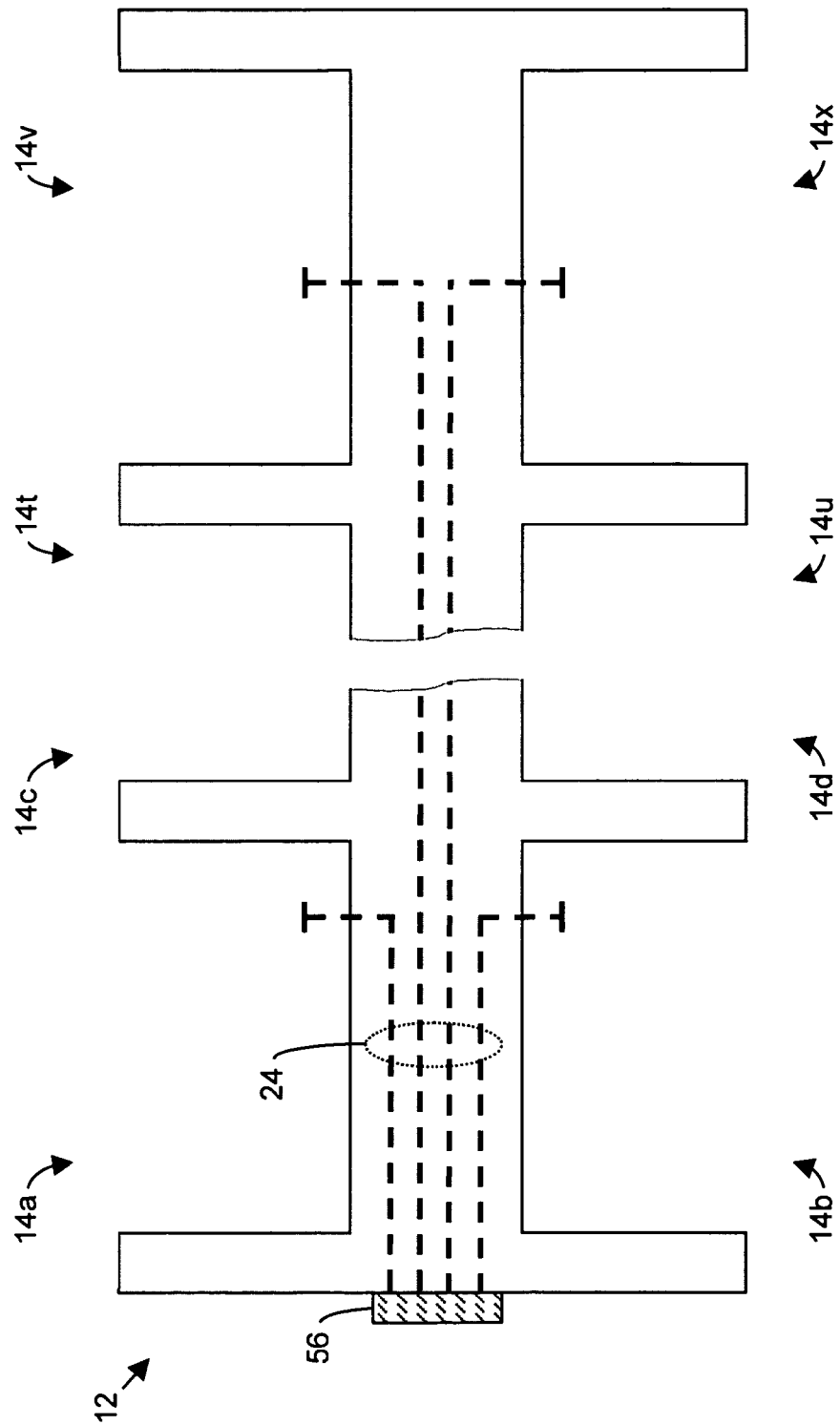

Further, the buses may be configured using any architecture now known or later developed. For example, with reference to FIGS. 55A and 55B, electrical bus 24 may include a plurality of individual dedicated electrical buses that are routed to one or more module bays of the integration plane 12. These electrical buses 24 may include one or more separate bus portions (for example, power, data and/or control).

Moreover, as described above, a user or an operator may access, control and/or manage the functions, operations, or states of integration plane 12 and/or technology modules 38 connected thereto using external connector 56. (See, for example, FIGS. 29 and 31). There are many techniques for a user or an operator to access, control and/or manage such functions, operations, or states, all of which are intended to fall within the scope of the present invention. For example, a user or an operator may access, control and/or manage such functions, operations, or states using an electronic module 38f (directly or remotely, via, for example, mobile communications) as well as using extension mechanism 68 of the embodiment of FIG. 42B.

As mentioned above, non-provisional patent application Ser. No. 11/036,240, filed Jan. 14, 2005, entitled "Fuel Cell Power and Management System, and Technique for Controlling and/or Operating Same", which (as mentioned above) is incorporated by reference herein in its entirety. In this regard, the inventions, embodiments, features, attributes, architectures, configurations, materials, techniques and advantages described and illustrated therein, are hereby incorporated by reference herein. For example, in one embodiment, fuel cartridge module 38b includes electronics having control circuitry to determine, monitor, manage and/or control one or more operating parameters of fuel cartridge module 38b and/or power unit module 38a. The control circuitry may be a combination of discrete components or may be an integrated circuit(s), for example, one or more suitably programmed (whether in situ or prior to deployment) microprocessors, microcontrollers, state machines and/or field programmable gate arrays ("FPGAs"). The control circuitry may receive electrical power from a secondary power source (for example, a rechargeable or non-rechargeable battery).

In one embodiment, cartridge electronics of the fuel cartridge module 38b also includes memory, for example, SRAM, DRAM, ROM, PROM, EPROM and/or EEPROM. In this embodiment, data or information representative of one or more operating parameters and/or microcode may be stored in, for example, an SRAM, DRAM, ROM or EEPROM. The data or information representative of one or more operating parameters may include a current status and/or historical data. It should be noted that the memory may be comprised of discrete component(s) or may reside on or in an integrated circuit that performs other non-memory operations, for example, the control circuitry.

In one embodiment, the memory in the fuel cartridge module 38b may store or retain one or more attributes of the associated fuel cartridge module 38b. For example, cartridge memory may store data that uniquely identifies the associated fuel cartridge (for example, an associated serial number, date of manufacture and/or assembly, data pertaining to the supplier of one or more components of the fuel cartridge, fuel capacity, number of refills (if applicable) and dates thereof, revision or series of electronics/software, and/or type of fuel) and/or more generally identifies the associated fuel cartridge (for example, model number). Moreover, cartridge memory may also include a filling algorithm for the fuel cartridge module 38b. In this way, when the fuel cartridge is connected to integration plane 12 or a refill unit, the cartridge memory may have available the unique and general characteristics (for example, capacity and type of fuel) of the fuel cartridge module 38b to be provided to power unit module 38a, a refill unit (if applicable), a user/operator, and/or an external processor unit 64a (if any), resident processor unit 64b (if any), electronics module 38f (if any) which can manage, control, confirm, verify or ensure proper operation and integration.

As mentioned above, control circuitry in the fuel cartridge module 38b may determine, monitor, manage and/or control one or more operating parameters, for example, the amount of fuel remaining and/or consumed, the rate of fuel consumption, the temperature and pressure of the fuel in the associated fuel vessel, temperature of the exterior of fuel vessel, and the operating status of fuel cartridge module 38b (for example, whether any faults or errors have been registered). For example, the control circuitry may calculate, determine and/or monitor the amount of fuel remaining and/or consumed, as well as the rate of fuel consumption, based on an amount of time fuel cartridge module 38b has been connected to and providing fuel to integration plane 12 and/or power unit module 38a and/or connected to and receiving fuel from refill unit (where fuel cartridge module 38b is a rechargeable type). This status may be periodically updated and/or stored in the memory for access by, for example, power unit module 38a, a refill unit (if applicable), an external processor unit 64a (if any), resident processor unit 64b (if any), and/or electronics module 38f (if any).

In addition to, or in lieu thereof, control circuitry may receive, sample and/or acquire data from sensors (for example, temperature, pressure and/or flow rate type sensors) disposed on or in fuel cartridge module 38b. The control circuitry may employ data from sensors to calculate one or more operating parameters of fuel cartridge module 38b using mathematical relationships and/or modeling. For example, control circuitry may obtain data which is representative of the temperature and pressure of the fuel in the fuel cartridge vessel and, based thereon, calculate/estimate the amount of fuel consumed from and remaining in the fuel cartridge vessel. Indeed, the control circuitry may obtain data which is representative of the flow rate of fluid through a cartridge valve assembly and, using time data, calculate the amount of fuel remaining in the fuel cartridge vessel and amount of time until all fuel is spent from the fuel cartridge module 38b.

The sensors may be discrete elements, such as one or more microelectromechanical ("MEMS") devices, or sensors that are integrated into fuel cartridge module 38b into components thereof (for example, one or more temperature elements integrated into and disposed within the walls of the cartridge vessel. Notably, any type of sensor (for example, MEMS), whether now known or later developed, may be implemented herein.

In one embodiment, the control circuitry may receive instructions and/or data from circuitry external to fuel cartridge module 38b, for example, from a user or an operator via an external device (computer or PDA), and/or from power unit module 38a or a refill unit (if any) (as described in Fuel Cell Power and Management System, and Technique for Controlling and/or Operating Same 38, filed on Jan. 14, 2005 and assigned Ser. No. 11/036,240). In this regard, the control circuitry may be instructed to, for example, determine, measure, sample one or more operating parameters, and thereafter control and/or manage the operation of the fuel cartridge module and/or the power unit module (for example, adjust and/or modify the rate of fuel consumption and/or the temperature of the exterior of the fuel vessel (and indirectly the temperature of the fuel in the fuel vessel) by engaging a cooling unit (if any) disposed on power unit module 38a.

In one embodiment, the control circuitry on fuel cartridge module 38b provides and/or communicates the measured, sampled, sensed and/or determined operating parameter(s) to power unit module 38a, a refill unit (if applicable), an external processor unit 64a (if any), resident processor unit 64b (if any), electronics module 38f (if any), a user or an operator. For example, the control circuitry may determine the state of fill or amount of fuel remaining in the fuel vessel of fuel cartridge module 38b (using any of the techniques described above) and, thereafter, provide data which is representative of that operating parameter to power unit module 38a, a refill unit (if applicable), an external processor unit 64a (if any), resident processor unit 64b (if any), and/or electronics module 38f (if any). In response, power unit module 38a, a refill unit (if applicable), an external processor unit 64a (if any), resident processor unit 64b (if any), and/or electronics module 38f (if any) may adjust one or more of its operating parameters, for example, reduce the rate of power/fuel consumption.

Alternatively, power unit module 38a, a refill unit (if applicable), an external processor unit 64a (if any), resident processor unit 64b (if any), electronics module 38f (if any) and/or an operator or a user may receive data which is representative of the state of fill or amount of fuel remaining in the fuel vessel of fuel cartridge module 38b and, in response thereto, modify or change the operating characteristics of power unit module 38a (directly or remotely), other technology modules 38 (for example, fuel cell module and/or power management module) and/or external or resident technology units. In this way, one or more operating parameters (for example, reduce the fuel consumption and/or electrical power output/generation, or engage a cooling/heating unit to influence the temperature of fuel vessel of fuel cartridge module 38b) may be modified and/or changed.

The modification or change to the operating characteristics of power unit module 38a, other technology modules 38 (for example, fuel cell module and/or power management module) and/or external or resident technology units may be preset, predetermined and/or pre-programmed. In this way, the response is present, predetermined and/or pre-programmed based on the conditions, operating characteristics and/or operating parameters of fuel cartridge module 38b, power unit module 38a, other technology modules 38 (for example, fuel cell module and/or power management module) and/or external or resident technology units. Alternatively, or in addition thereto, instructions defining the modification or change to the operating characteristics may be transmitted or provided by the operator, user or external device (for example, the user determines the appropriate modification or change based on one or more considerations, factors, constraints and/or objectives). Such modifications may be implemented by power unit module 38a (if any), external processor unit 64a (if any), resident processor unit 64b (if any), and/or electronics module 38f (if any).

In another embodiment, the cartridge electronics of fuel cartridge module 38b includes memory to store and/or retain data provided by power unit module 38a (if any), external processor unit 64a (if any), resident processor unit 64b (if any), electronics module 38f (if any), user/operator and/or refill unit (if applicable). In this embodiment, power unit module 38a (if any), external processor unit 64a (if any), resident processor unit 64b (if any), electronics module 38f (if any), user/operator and/or refill unit (if applicable) may, among other things, determine, monitor and/or control one or more operating parameters, for example, the amount of fuel remaining and/or consumed, the rate of fuel consumption and/or the temperature and pressure of the fuel in a fuel vessel of, for example, fuel cartridge module 38b. The power unit module 38a (if any), external processor unit 64a (if any), resident processor unit 64b (if any), electronics module 38f (if any), user/operator and/or refill unit (if applicable) may periodically or intermittently store data which is representative of the one or more operating parameters in the memory of fuel cartridge module 38b. In this way, the status of fuel cartridge module 38b (for example, the amount of fuel remaining) is retained within the memory of fuel cartridge module 38b so that it may be available for recall by power unit module 38a (if any), external processor unit 64a (if any), resident processor unit 64b (if any), electronics module 38f (if any), user/operator and/or refill unit (if applicable).

Notably, the control circuitry in the fuel cartridge module 38b performs or executes routines or programs that implement particular tasks and/or operations described herein. The functionality of the routines or programs may be combined or distributed. Such programming is well known to those skilled in the art, particularly in view of this disclosure. All programming techniques, and implementations thereof, to determine, monitor, manage and/or control one or more operating parameters and/or characteristics of technology modules 38 (for example, power unit module 38a, fuel cartridge module 38b and electronics module 38f), external processor unit 64a, resident processor unit 64b, and/or refill unit, whether now known or later developed, are intended to fall within the scope of the present invention.

The control circuitry in one or more technology modules 38 (for example, power unit module 38a, fuel cartridge module 38b and electronics module 38f), external processor unit 64a, resident processor unit 64b, and/or refill unit may determine, monitor, manage and/or control one or more operating parameters, for example, the amount of fuel remaining and/or consumed, the rate of fuel consumption, the temperature and pressure of the fuel in fuel cartridge module 38*b* and/or fuel container/tank module 38*c*, temperature of the exterior of fuel vessel thereof, and the operating status of fuel cartridge module 38*b* (for example, whether any faults or errors have been registered) and/or the operating status of technology modules 38 (for example, power unit module 38*a*, fuel cartridge module 38*b* and electronics module 38*f*). In one embodiment, the control circuitry may calculate, determine and/or monitor the amount of fuel remaining in fuel in fuel cartridge module 38*b* and/or fuel container/tank module 38*c*, as well as the rate of fuel consumption, using information pertaining to the amount of time fuel in fuel cartridge module 38*b* and/or fuel container/tank module 38*c* is connected to and providing fuel to, for example, a power unit module 38*a* or a power management module 38*e* connected to integration plane 12.

In addition to, or in lieu thereof, control circuitry in one or more technology modules 38 (for example, power unit module 38*a*, fuel cartridge module 38*b* and electronics module 38*f*), external processor unit 64*a*, resident processor unit 64*b*, and/or refill unit may receive, sample and/or acquire data from sensors, as mentioned above. The control circuitry may employ data from the sensors to calculate one or more operating parameters using mathematical relationships and/or modeling. For example, the control circuitry may obtain data which is representative of the temperature and pressure of the fuel in the vessel of fuel cartridge module 38*b* and, based thereon, calculate/estimate the amount of fuel consumed from and/or remaining in the vessel. Indeed, control circuitry 224 may obtain data which is representative of the flow rate of fluid through a valve assembly in fuel cartridge module 38*b* and/or fuel container/tank module 38*c* and, using time data, calculate the amount of fuel remaining in the vessel and amount of time until all fuel is spent from fuel cartridge module 38*b* and/or fuel container/tank module 38*c*.

Notably, as suggested above, control circuitry may be a combination of discrete components or may be an integrated circuit(s), for example, one or more suitably programmed (whether in situ or prior to deployment) microprocessors, microcontrollers, state machines and/or FPGAs.

Further, in one embodiment, one or more technology modules 38 (for example, power unit module 38*a*, fuel cartridge module 38*b* and electronics module 38*f*), external processor unit 64*a*, resident processor unit 64*b*, and/or refill unit also includes memory, for example, SRAM, DRAM, ROM, PROM, EPROM and/or EEPROM. In this way, data or information which is representative of one or more operating parameters and/or microcode (used by the control electronics) may be stored in, for example, an SRAM, DRAM, ROM or EEPROM. The data or information representative of one or more operating parameters may include a current status and/or historical data. It should be noted that memory may be comprised of discrete component(s) or may reside on or in an integrated circuit that performs other non-memory operations, for example, control circuitry.

In one embodiment, control circuitry in one or more technology modules 38 (for example, power unit module 38*a*, fuel cartridge module 38*b* and electronics module 38*f*, external processor unit 64*a*, resident processor unit 64*b*, and/or refill unit may receive instructions and/or data from, for example, a user or an operator. In this regard, the control circuitry may be instructed to, for example, determine one or more operating parameters, and thereafter control and/or manage the operation of fuel cartridge module 38*b* and/or power unit module 38*a* (for example, adjust and/or modify the rate of fuel consumption and/or the temperature of the exterior of fuel vessel (and indirectly the temperature of the fuel in fuel vessel) by engaging a cooling unit disposed on integration plane 12, fuel cartridge module 38*b*, and/or a temperature adjustment module to be disposed in or associated with a module bay 14 of integration plane 12). In this way, the efficiency and/or control of electrical energy generation may be enhanced.

In one embodiment, control circuitry of one or more technology modules 38 (for example, power unit module 38*a*, fuel cartridge module 38*b* and electronics module 38*f*), external processor unit 64*a*, and/or resident processor unit 64*b* provides and/or communicates the measured, sampled, sensed and/or determined operating parameter(s) to a user or an operator. In response, the user or operator may adjust one or more of the operating parameters of one or more modules 38, for example, reduce the amount of power/fuel consumption and/or reduce or adjust the output power of the fuel cell in power unit module 38*a* or fuel cell module 38*d* (if any).

Alternatively, an operator or a user (or external device) may receive data which is representative of the state of fill or amount of fuel remaining in the fuel vessel of fuel cartridge module 38*b* and/or fuel container/tank module 38*c* from the control circuitry (as calculated therein) of one or more technology modules 38 (for example, power unit module 38*a*, fuel cartridge module 38*b* and electronics module 38*f*, external processor unit 64*a*, and/or resident processor unit 64*b* and, in response thereto, instruct one or more modules 38 to modify or change its operating characteristics, for example, reduce the amount of power/fuel consumption and/or reduce and/or electrical power output/generation of the fuel cell in power unit module 38*a* or fuel cell module 38*d* (if any), or engage a cooling or a heating unit to influence the temperature of the fuel vessel (for example, in those instances where the temperature of the fuel during operation may not be suitable and/or optimum). The modification or change to the operating parameters of power unit module 38*a* or fuel cell module 38*d* may be preset, predetermined and/or pre-programmed. The modification or change may also be in accordance with instructions transmitted or provided to control circuitry (for example, the user determines the appropriate modification or change based on one or more considerations, factors, constraints and/or objectives) of one or more technology modules 38 (for example, power unit module 38*a*, fuel cartridge module 38*b* and electronics module 38*f*), external processor unit 64*a*, and/or resident processor unit 64*b*.

The control circuitry of one or more technology modules 38 (for example, power unit module 38*a*, fuel cartridge module 38*b* and electronics module 38*f*), external processor unit 64*a*, and/or resident processor unit 64*b* may also determine, monitor, manage and/or control other characteristics or operations of integration plane 12 and/or modules 38, for example, thermal management, fuel leak detection, fuel purge, over-current protection and/or voltage regulation. For example, the control circuitry may receive information representative of the temperature of one or more elements of power unit module 38*a* (for example, the fuel cell) and in response thereto adjust and/or manage the operation of power unit module 38*a* (for example, adjust the rate of fuel consumption and/or generation of electricity).

The sensors may include fuel leak sensors to provide data of the status of the integrity of the fuel path or fluid bus (i.e., whether a leak is present) to the control circuitry. In response thereto, the control circuitry may alert one or more technology modules 38 (for example, power unit module 38*a*, fuel cartridge module 38*b* and electronics module 38*f*), external processor unit 64*a*, resident processor unit 64*b* and/or the user/operator of the leak (or possible leak) and/or may safely terminate operation of integration plane 12 and/or power unit module 38*a*.

The control circuitry of one or more technology modules 38 (for example, power unit module 38a, fuel cartridge module 38b and electronics module 38f), external processor unit 64a, and/or resident processor unit 64b may also monitor the status of over-current protection and/or voltage regulation to assess the status of the power generation by the fuel cell of power unit module 38a and/or fuel cell module 38c. In one embodiment, the control circuitry may receive information representative of the current consumption and/or voltage levels from sensors that provide information pertaining to the generation of electricity and/or consumption thereof. In response, the control circuitry may appropriately manage and/or control the operation of the fuel cell of power unit module 38a and/or fuel cell module 38c.

Notably, the control circuitry of one or more technology modules 38 (for example, power unit module 38a, fuel cartridge module 38b and electronics module 38f), external processor unit 64a, and/or resident processor unit 64b may perform or execute routines or programs that implement particular tasks and/or operations described herein. The functionality of the routines or programs may be combined or distributed. Such programming is well known to those skilled in the art, particularly in view of this disclosure. All programming techniques, and implementations thereof, to determine, monitor, manage and/or control one or more operating parameters and/or characteristics of technology module 38, whether now known or later developed, are intended to fall within the scope of the present invention.

Each of the aspects of the present invention, and/or embodiments thereof, may be employed alone or in combination with one or more of such aspects and/or embodiments. For the sake of brevity, those permutations and combinations will not be discussed separately herein. As such, the present invention is not limited to any single aspect or embodiment thereof nor to any combinations and/or permutations of such aspects and/or embodiments.

It should be further noted that the term "circuit" may mean, among other things, a single component or a multiplicity of components (whether in integrated circuit form or otherwise), which are active and/or passive, and which are coupled together to provide or perform a desired function. The term "circuitry" may mean, among other things, a circuit (whether integrated or otherwise), a group of such circuits, one or more processors, one or more state machines, one or more processors implementing software, or a combination of one or more circuits (whether integrated or otherwise), one or more state machines, one or more processors, and/or one or more processors implementing software. The term "data" may mean, among other things, a current or voltage signal(s) whether in an analog or a digital form.

What is claimed is:

1. A fuel cell system comprising:
    an integration plane adapted to receive a plurality of differing types of technology modules, comprising,
        a bidirectional fluid bus;
        an electrical bus;
        a plurality of module bays each adapted to receive a said technology module, each said module bay comprising:
            a bidirectional fluid interface coupled to the bidirectional fluid bus;
            an electrical interface coupled to the electrical bus; and wherein:
            the bidirectional fluid interface of each module bay of the plurality of module bays has the same bidirectional interface, and
            the electrical interface of each module bay of the plurality of module bays has the same electrical interface;
    a hydrogen fuel cell stack, coupled to the bidirectional fluid bus of the integration plane, to generate unconditioned electrical power using hydrogen;
    a power management unit, electrically coupled to the hydrogen fuel cell stack, to generate conditioned electrical power using the unconditioned electrical power generated by the hydrogen fuel cell stack and to output the conditioned electrical power to a power management interface; and
    circuitry electrically coupled to at least one of (i) the integration plane, (ii) the hydrogen fuel cell stack and (iii) the power management unit, to monitor and/or control at least one of (i) the integration plane, (ii) the hydrogen fuel cell stack, and (iii) the power management unit.

2. The fuel cell system of claim 1 wherein the circuitry is electrically coupled to an external connector disposed on the integration plane.

3. The fuel cell system of claim 1 further comprising a first said technology module disposed in a module bay of the integration plane, wherein the first technology module includes the circuitry.

4. The fuel cell system of claim 1 wherein the circuitry is resident on the integration plane.

5. The fuel cell system of claim 4 further comprising a user interface having a visual display to provide information which is representative of an operating parameter of at least one of (i) the integration plane, (ii) the hydrogen fuel cell stack and (iii) the power management unit.

6. The fuel cell system of claim 1 further comprising first and second said technology modules, each said technology module comprising a vessel containing hydrogen, wherein:
    the first technology module is disposed in a first module bay of the plurality of module bays of the integration plane and coupled to the bidirectional fluid bus via the bidirectional fluid interface of the first module bay, to provide hydrogen to the fuel cell stack; and
    the second technology module is disposed in a second module bay of the plurality of module bays of the integration plane and coupled to the bidirectional fluid bus via the bidirectional fluid interface of the second module bay, to provide hydrogen to the fuel cell stack.

7. The fuel cell system of claim 6 wherein the first and second technology modules each further comprise a memory to store information which is representative of an amount of hydrogen in the associated vessel of the associated module and wherein the memory is coupled to the electrical bus of the integration plane via the electrical interface of the associated module bay.

8. The fuel cell system of claim 7 further comprising a user interface having a visual display to provide information which is representative of the amount of hydrogen in the vessel of each of the first and the second technology modules.

9. The fuel cell system of claim 7 further comprising a user interface having a visual display to provide information which is representative of the total amount of hydrogen in the vessels of the first and second technology modules.

10. The fuel cell system of claim 7 wherein:
    the hydrogen fuel cell stack is fixed to the integration plane and outputs the unconditioned electrical power on a power management bus; and
    the power management unit is fixed to the integration plane and coupled to the power management bus to receive the unconditioned electrical power.

11. The fuel cell system of claim 1 wherein the hydrogen fuel cell stack comprises a first said technology module which is disposed in a first module bay of the integration plane and to the bidirectional fluid bus of the integration plane via the bidirectional fluid interface of the first module bay.

12. The fuel cell system of claim 1 wherein the hydrogen fuel cell stack is any one of: (i) coupled to the bidirectional fluid bus of the integration plane via an external connector disposed on the integration, plane or (ii) fixed on the integration plane.

13. The fuel cell system of claim 1 wherein:
the hydrogen fuel cell stack outputs the unconditioned electrical power on a power management bus; and
the power management unit is a first said technology module which is disposed in a first module bay of the integration plane and coupled to the power management bus of the integration plane to receive the unconditioned electrical power.

14. The fuel cell system of claim 1 wherein:
the hydrogen fuel cell stack outputs the unconditioned electrical power on a power management bus; and
the power management unit is fixed to the integration plane and coupled to the power management bus to receive the unconditioned electrical power.

15. The fuel cell system of claim 1 further comprising a power management bus coupled between the hydrogen fuel cell stack and the power management unit, wherein:
the hydrogen fuel cell stack is fixed to the integration plane and outputs the unconditioned electrical power on the power management bus; and
power management unit is fixed to the integration plane and coupled to the power management bus to receive the unconditioned electrical power.

16. The fuel cell system of claim 1 wherein the power management unit comprises a DC-DC converter and/or a DC-AC inverter to generate the conditioned electrical power using the unconditioned electrical power.

17. The fuel cell system of claim 1 further comprising first said and second said technology modules, each technology module comprising a vessel containing hydrogen and a memory to store information which is representative of the amount of hydrogen which is in the associated vessel, wherein:
the first technology module is disposed in a first module bay of the plurality of module bays of the integration plane and coupled to:
the bidirectional fluid bus via the bidirectional fluid interface of the first module bay to provide hydrogen to the fuel cell stack; and
he electrical bus of the integration plane via the electrical interface of the first module bay of the integration plane to receive information which is representative of the amount of hydrogen which is in the vessel of the first technology module;
the second technology module is disposed in a second module bay of the plurality of module bays of the integration plane and coupled to:
the bidirectional fluid bus via the bidirectional fluid interface of the second module bay to provide hydrogen to the fuel cell stack; and
the electrical bus of the integration plane via the electrical interface of the second module bay of the integration plane to receive information which is representative of the amount of hydrogen which is in the vessel of the second technology module; and a battery or an ultra-capacitor, coupled to the power management unit, to provide electrical power to the power management unit.

18. The fuel cell system of claim 17 wherein the battery or ultra-capacitor is disposed in a third technology module which is attached to a third module bay of the integration plane.

19. A fuel cell system comprising:
an integration plane adapted to receive a plurality of differing types of technology modules, comprising,
a bidirectional fluid bus;
an electrical bus;
a plurality of module bays each adapted to receive a said technology module, each said module bay comprising:
a bidirectional fluid interface coupled to the bidirectional fluid bus;
an electrical interface coupled to the electrical bus; and wherein:
the bidirectional fluid interface of each module bay of the plurality of module bays has the same bidirectional fluid interface, and
the electrical interface of each module bay of the plurality of module bays has the same electrical interface;
a hydrogen fuel cell stack, coupled to the bidirectional fluid bus of the integration plane, to generate unconditioned electrical power using hydrogen and output the unconditioned electrical power on a power management bus; and
a power management unit, electrically coupled to the hydrogen fuel cell stack via the power management bus, to generate conditioned electrical power using the unconditioned electrical power and to output the conditioned electrical power to a power management interface;
a user interface; and
circuitry electrically coupled to at least one of (i) the hydrogen fuel cell stack, (ii) the power management unit, and (iii) at least one module bay of the plurality of module bays, to monitor and/or control at least one of (i) the hydrogen fuel cell stack, (ii) the power management unit and (iv) a said technology module disposed in the at least one module bay.

20. The fuel cell system of claim 19 wherein the circuitry is electrically coupled to an external connector disposed on the integration plane.

21. The fuel cell system of claim 19 further comprising a first said technology module disposed in a module bay of the integration plane, wherein the first technology module includes the circuitry.

22. The fuel cell system of claim 19 wherein the user interface is fixed to/on the integration plane.

23. The fuel cell system of claim 19 wherein the user interface comprises a visual display to provide information which is representative of an operating parameter of at least one of the integration plane, the hydrogen fuel cell stack and the power management unit.

24. The fuel cell system of claim 19 wherein:
the hydrogen fuel cell stack is a first said technology module which is disposed in a first module bay of the integration plane; and
the first module bay comprises an interface that couples the hydrogen fuel cell stack to the power management bus such that the hydrogen fuel cell stack outputs the unconditioned electrical power on the power management bus.

25. The fuel cell system of claim 19 wherein any one of:
the power management bus is fixed to/on the integration plane; and
the hydrogen fuel cell stack is fixed to/on the integration plane.

26. The fuel cell system of claim 19 wherein:
the power management bus is fixed to/on the integration plane;
the power management unit is a first technology module which is disposed in a first module bay of the integration plane; and
the first module bay comprises an interface that couples the power management unit to the power management bus such that the power management unit receives the unconditioned electrical power from the hydrogen fuel cell stack.

27. The fuel cell system of claim 19 further comprising first and second said technology modules, each technology module comprising a vessel containing hydrogen and a memory to store information which is representative of the amount of hydrogen which is in the associated vessel, wherein:
the first technology module is disposed in a first module bay of the plurality of module bays of the integration plane and coupled to:
the bidirectional fluid bus via the bidirectional fluid interface of the first module bay to provide hydrogen to the fuel cell stack; and
the electrical bus of the integration plane via the electrical interface of the first module bay of the integration plane to receive information which is representative of the amount of hydrogen which is in the vessel of the first technology module;
the second technology module is disposed in a second module bay of the plurality of module bays of the integration plane and coupled to:
the bidirectional fluid bus via the bidirectional fluid interface of the second module bay to provide hydrogen to the fuel cell stack; and
the electrical bus of the integration plane via the electrical interface of the second module bay of the integration plane to receive information which is representative of the amount of hydrogen which is in the vessel of the second technology module.

28. The fuel cell system of claim 27 wherein any one of:
hydrogen fuel cell stack is fixed to/on the integration plane; and
power management unit is fixed to/on the integration plane.

29. The fuel cell system of claim 27 further comprising a user interface having a visual display to provide information which is representative of the amount of hydrogen in the vessel of each of the first and the second technology modules.

30. The fuel cell system of claim 27 further comprising a user interface having a visual display to provide information, which is representative of the total amount of hydrogen in the vessels of the first and second technology modules.

31. The fuel cell system of claim 19 wherein the power management bus is coupled between the hydrogen fuel cell stack and the power management unit.

32. The fuel cell system of claim 19 wherein the power management unit comprises a DC-DC converter and/or a DC-AC inverter to generate the conditioned electrical power using the unconditioned electrical power.

33. The fuel cell system of claim 19 further comprising first and second technology modules, each technology module comprising a vessel containing hydrogen and a memory to store information which is representative of the amount of hydrogen which is in the associated vessel, wherein:
the first technology module is disposed in a first module bay of the plurality of module bays of the integration plane and coupled to:
the bidirectional fluid bus via the bidirectional fluid interface of the first module bay to provide hydrogen to the fuel cell stack; and
the electrical bus of the integration plane via the electrical interface of the first module bay of the integration plane to receive information which is representative of the amount of hydrogen which is in the vessel of the first technology module;
the second technology module is disposed in a second module bay of the plurality of module bays of the integration plane and coupled to:
the bidirectional fluid bus via the bidirectional fluid interface of the second module bay to provide hydrogen to the fuel cell stack; and
the electrical bus of the integration plane via the electrical interface of the second module bay of the integration plane to receive information which is representative of the amount of hydrogen which is in the vessel of the second technology module; and
a battery or an ultra-capacitor, coupled to the power management bus, to provide electrical power on the power management bus.

34. The fuel cell system of claim 33 wherein the battery or ultra-capacitor is in a third technology module that is disposed in a third module bay of the integration plane.

35. A fuel cell system comprising:
an integration plane adapted to receive a plurality of differing types of technology modules, comprising,
a bidirectional fluid bus;
an electrical bus;
a plurality of module bays each adapted to receive a said technology module, each said module bay comprising:
a bidirectional fluid interface coupled to the bidirectional fluid bus;
an electrical interface coupled to the electrical bus; and
wherein (i) the bidirectional fluid interface of each module bay of the plurality of module bays has the same bidirectional fluid interface and (ii) the electrical interface of each module bay of the plurality of module bays has the same electrical interface;
first and second said technology modules, each technology module comprising a vessel containing hydrogen and a memory to store information which is representative of the amount of hydrogen which is in the associated vessel, wherein:
the first technology module is disposed in a first module bay of the plurality of module bays of the integration plane and coupled to:
the bidirectional fluid bus via the bidirectional fluid interface of the first module bay to provide hydrogen to the fuel cell stack; and
the electrical bus of the integration plane via the electrical interface of the first module bay of the integration plane to receive information which is representative of the amount of hydrogen which is in the vessel of the first technology module;
the second technology module is disposed in a second module bay of the plurality of module bays of the integration plane and coupled to:
the bidirectional fluid bus via the bidirectional fluid interface of the second module bay to provide hydrogen to the fuel cell stack; and the electrical bus of the integration plane via the electrical interface of the second module bay of the integration plane to receive information which is representative of the amount of hydrogen which is in the vessel of the second technology module;

a hydrogen fuel cell stack, coupled to the bidirectional fluid bus of the integration plane, to generate unconditioned electrical power using hydrogen and output the unconditioned electrical power on a power management bus;

a power management unit, having a DC-DC converter and/or a DC-AC inverter, to generate the conditioned electrical power using the unconditioned electrical power, electrically coupled to the hydrogen fuel cell stack via the power management bus, to generate conditioned electrical power using the unconditioned electrical power and to output the conditioned electrical power to a power interface; and circuitry electrically coupled to at least one of (i) the hydrogen fuel cell stack, (ii) the power management unit, and (iii) at least one module bay of the plurality of module bays to monitor and/or control at least one of (i) the hydrogen fuel cell stack, (ii) the power management unit and (iii) a said technology module disposed in the at least one module bay.

* * * * *